United States Patent

Bowker et al.

[11] Patent Number: 5,937,557
[45] Date of Patent: Aug. 17, 1999

[54] FINGERPRINT-ACQUISITION APPARATUS FOR ACCESS CONTROL; PERSONAL WEAPON AND OTHER SYSTEMS CONTROLLED THEREBY

[75] Inventors: J. Kent Bowker, Essex, Mass.; Stephen C. Lubard, Woodland Hills, Calif.

[73] Assignee: Areté Associates, Sherman Oaks, Calif.

[21] Appl. No.: 08/991,071

[22] Filed: Dec. 16, 1997

Related U.S. Application Data

[62] Division of application No. 08/382,220, Jan. 31, 1995, Pat. No. 5,812,252.

[51] Int. Cl.$^6$ ............................................. F41A 17/06
[52] U.S. Cl. ........................ 42/70.01; 42/84; 102/472
[58] Field of Search ............... 42/70.01, 66, 70.06, 42/70.08, 70.11, 84; 102/472

[56] References Cited

U.S. PATENT DOCUMENTS

| | | | |
|---|---|---|---|
| 2,993,291 | 7/1961 | Rouby | 42/70.01 |
| 4,467,545 | 8/1984 | Shaw, Jr. | 42/70.01 |
| 4,970,819 | 11/1990 | Mayhak | 42/70.01 |
| 5,301,448 | 4/1994 | Petrick et al. | 42/70.01 |
| 5,303,495 | 4/1994 | Harthcock | 42/70.11 |
| 5,502,915 | 4/1996 | Mendelsohn et al. | 42/70.11 |
| 5,603,179 | 2/1997 | Adams | 42/70.06 |

FOREIGN PATENT DOCUMENTS 3446019  6/1986  Germany ............................. 42/70.11

Primary Examiner—Stephen M. Johnson
Attorney, Agent, or Firm—Ashen & Lippman

[57] ABSTRACT

At a first end of an optic-fiber prism assembly are fiber terminations to contact a relieved surface, e. g. finger (stabilized by a handgrip). In a region where fiber diameter is essentially constant with longitudinal position, light enters the prism, crosses the fibers and enters individual fibers through their sidewalls, lighting the terminations. To allow crosslighting of the assembly, the fiber-optic numerical aperture (NA) is small: preferably not exceeding one-half. Due to fingerprint etc. detail, fractions of light pass along the fibers; at the assembly second end a detector responds with an electrical-signal array based on the surface relief. The signals are processed to check finger etc. identity and applied to control access to a personal weapon, other equipment, facilities, data, or a money service. FTIR ("frustrated total internal reflection") bright- and dark-field versions have various benefits. For use of small, low-cost detectors—and/or internal-mirror versions that light the finger straight-on—the assembly has a separate element, e. g. a high-NA fiber-optic taper with extramural absorption or "EMA" material (no entry light crosses it). For a weapon, a unitary antibypassing module (which matches a weapon port, and must be present) holds part of the access-control and firing systems. Bullets etc. fire only on a special signal from the module.

17 Claims, 8 Drawing Sheets

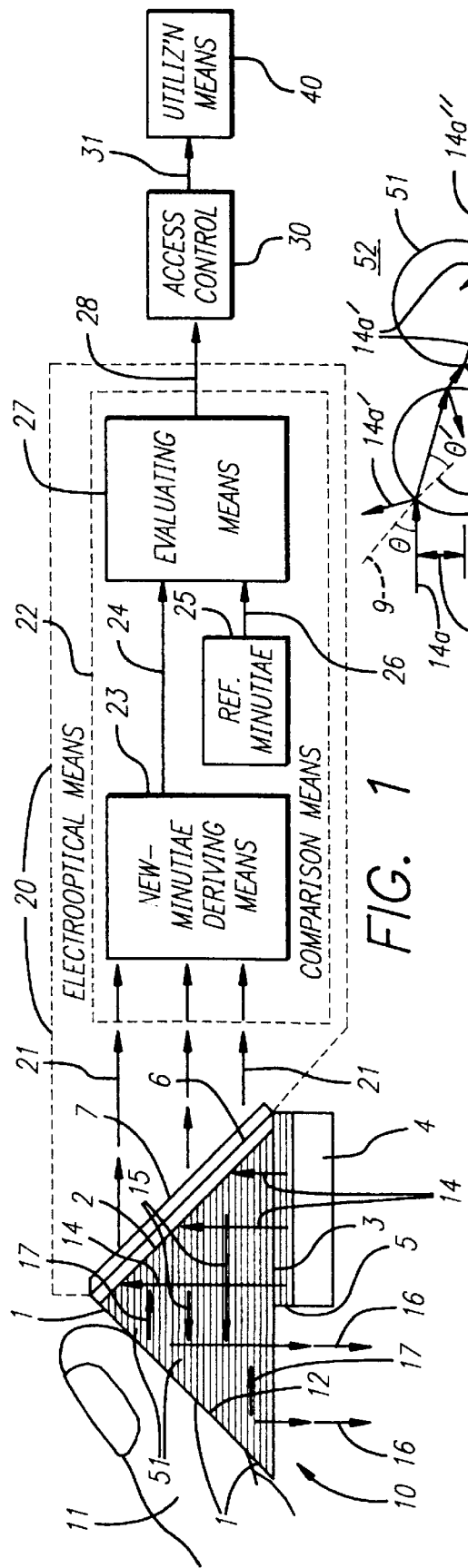
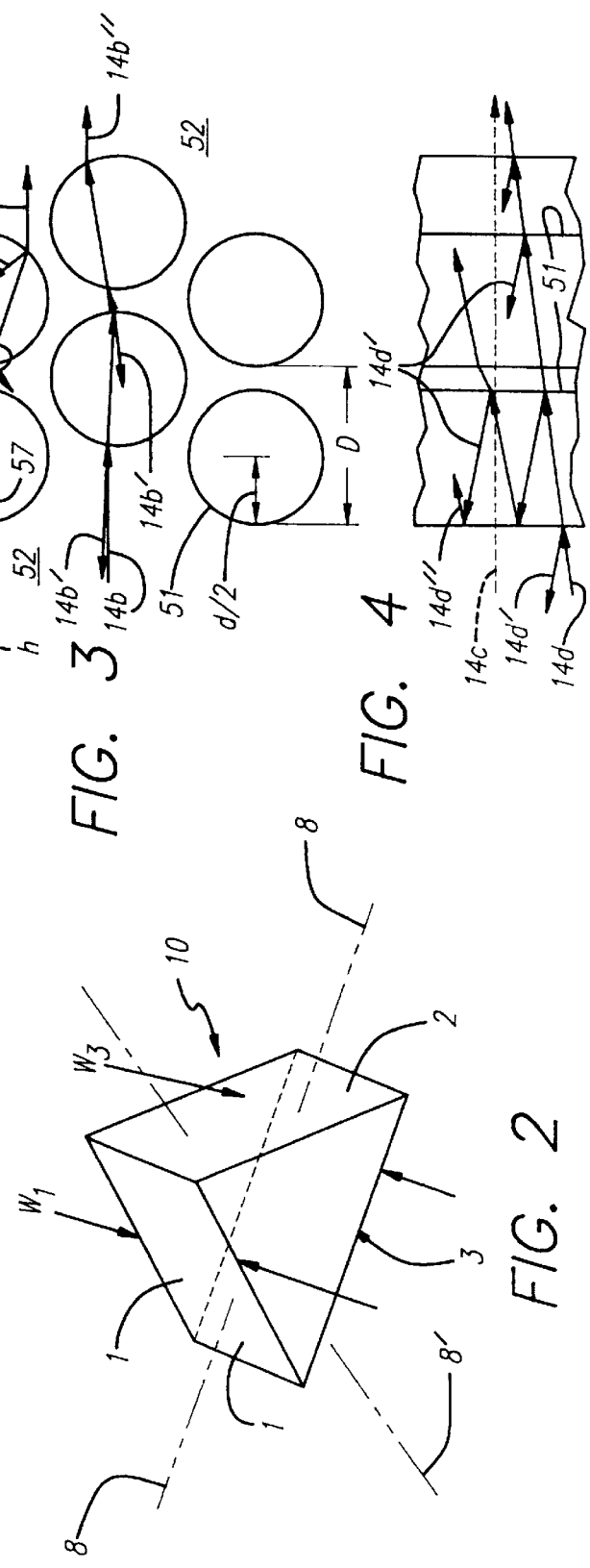

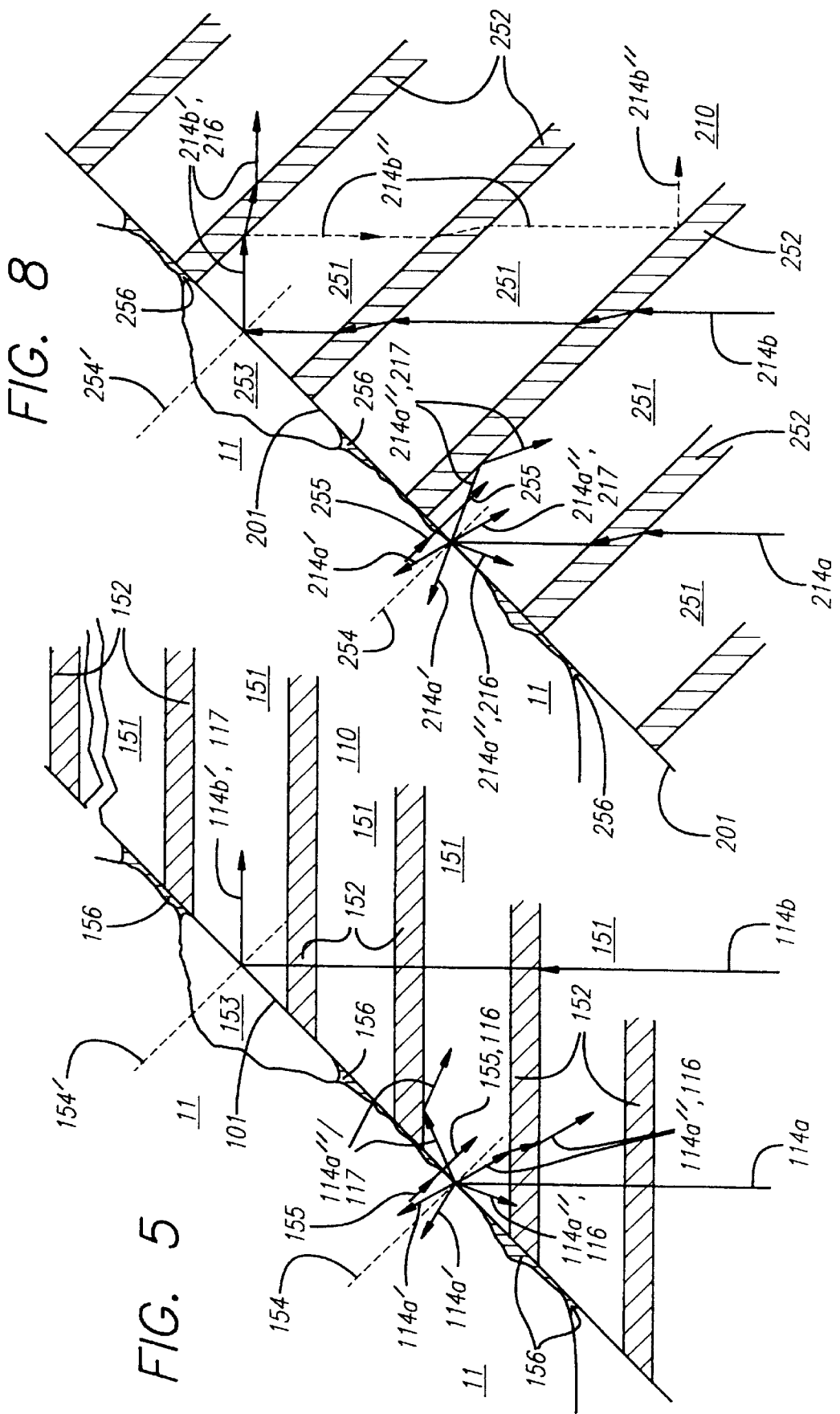

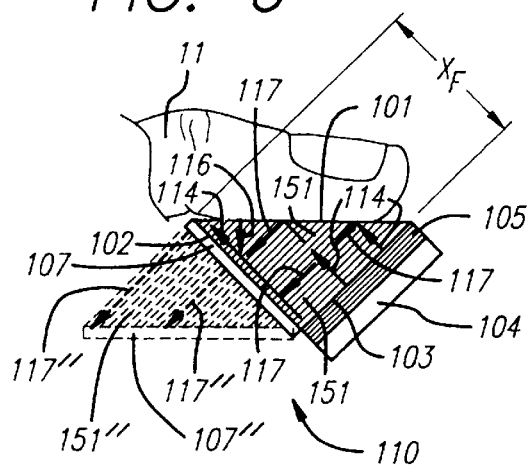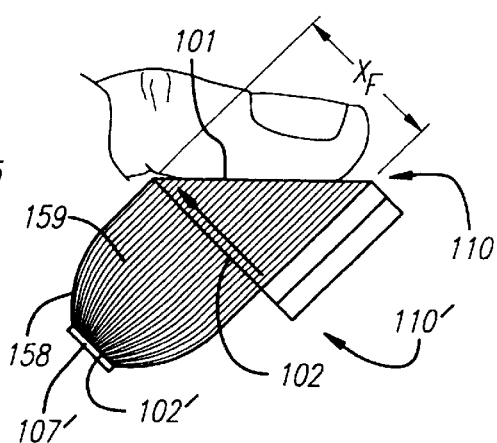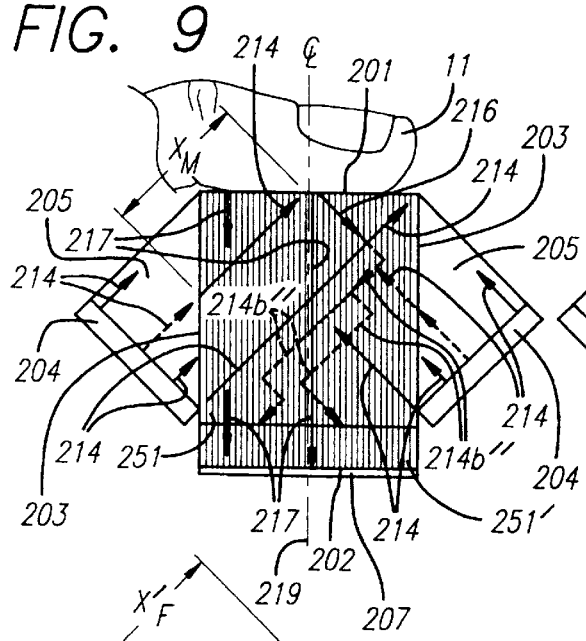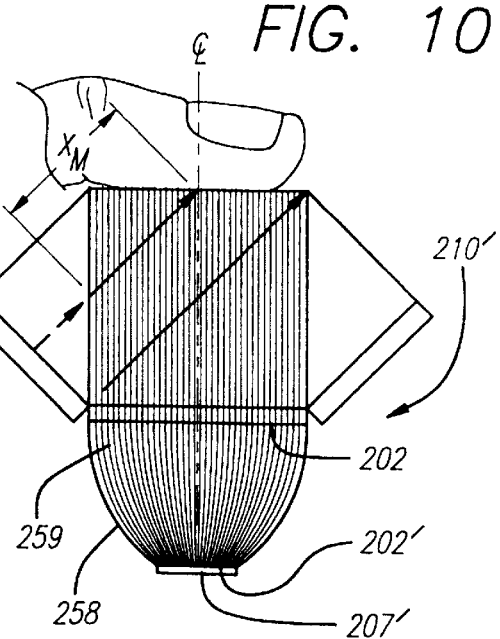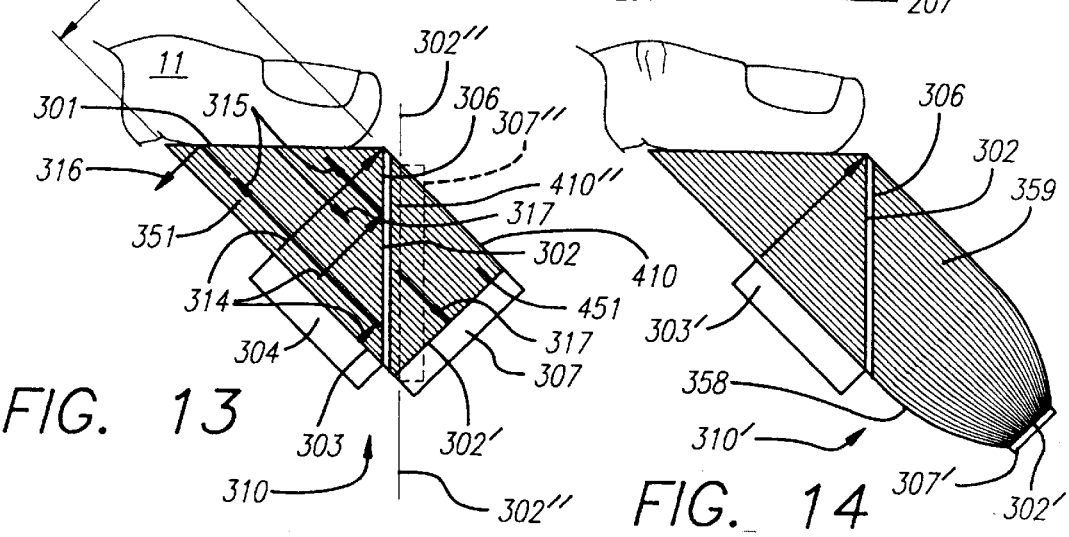

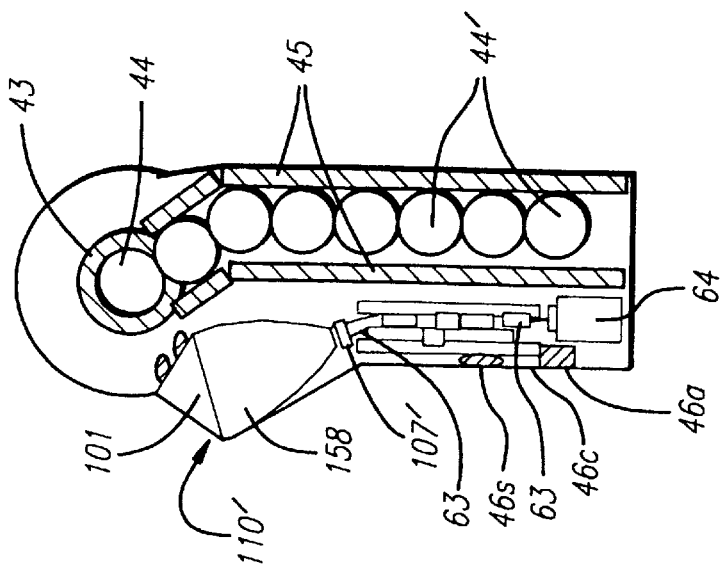
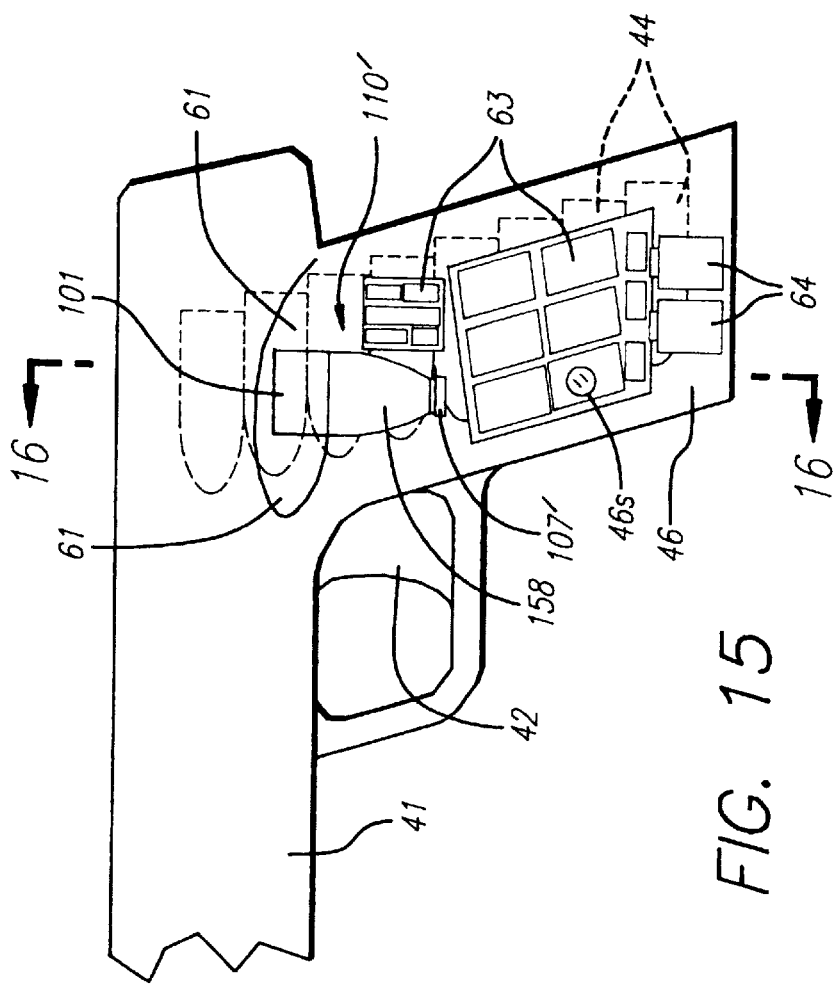

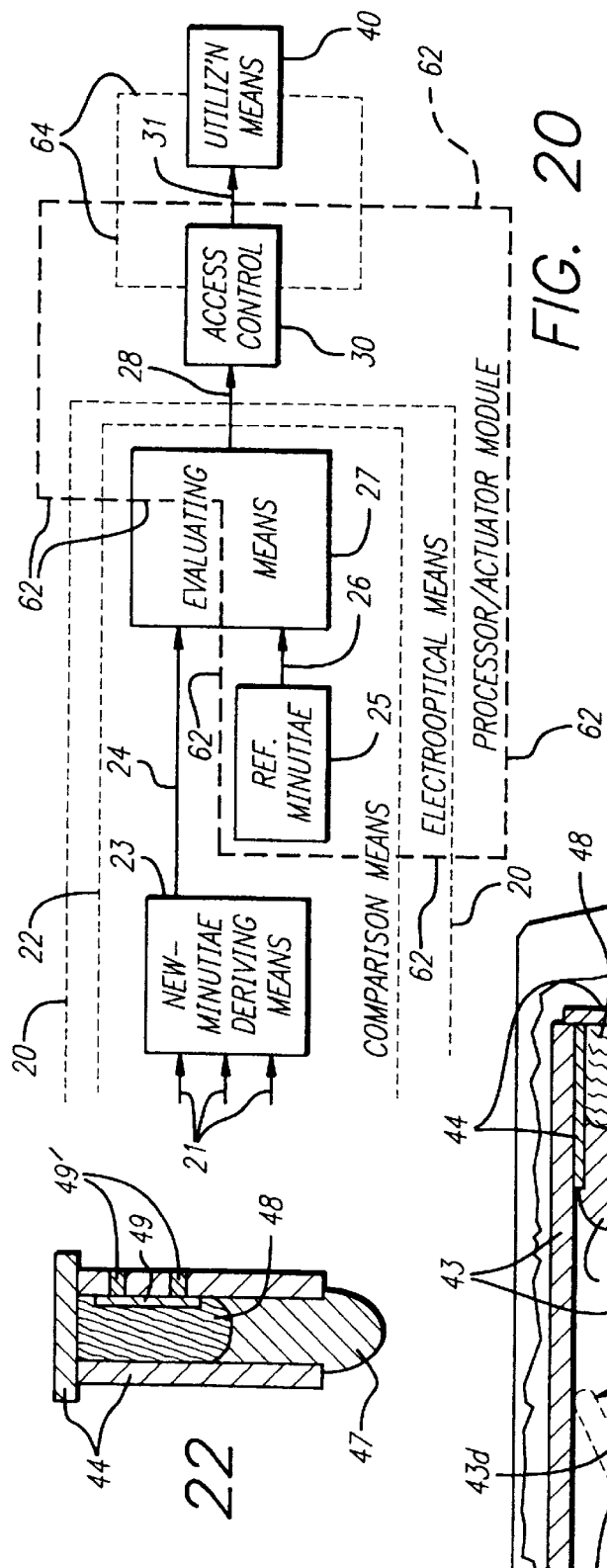

FINGERPRINT-ACQUISITION APPARATUS FOR ACCESS CONTROL; PERSONAL WEAPON AND OTHER SYSTEMS CONTROLLED THEREBY

This is a divisional of application Ser. No. 08/382,220 filed on Jan. 31, 1995 now U.S. Pat. No. 5,812,252.

BACKGROUND

1. Field of the Invention

This invention relates generally to automatic acquisition of fingerprints and other relieved-surface images, for access control—and to systems whose access is controlled by such automatic fingerprint etc. acquisition. The invention relates more particularly to fiber-optic prism systems for such fingerprint acquisition, and to cooperating mechanical and electrical provisions for both enhancing the identity confirmation and deterring circumvention of the identity confirmation.

Systems to which access is controlled in accordance with the present invention include personal weapons, other apparatus, facilities, financial services and information services.

2. Prior Art

Several U.S. patents address the topic of automatic control of hand weapons to deter unauthorized use of such weapons. At least one such patent, U.S. Pat. No. 4,467,545 of Shaw, suggests applying automatic fingerprint analysis to determine whether a prospective user is authorized. Some patents, such as U.S. Pat. No. 4,003,152 to Barker, incidentally propose use of more-transitory phenomena such as voiceprints and brainwaves.

Shaw's presentation is conceptual. The hand-weapon environment imposes formidable constraints of both time consumption and certainty in identification—as well as difficult secondary considerations including size, weight, shock resistance, physical reliability, and cost. As far as is known, no practical apparatus has heretofore been made or even devised that is capable of satisfying these constraints (or even most of them) to accomplish the tasks which the Shaw patent outlines.

Shaw offers the only known prior-art representation of a fingerprint-controlled personal weapon. That representation indicates pictorially that prints are to be taken from one or more of the four fingers other than the thumb—and at the point where these fingers are curled around the handle of the weapon.

It suggests no provision for holding any of the fingers in any sort of reproducible position or orientation, or with any sort of reproducible degree of pressure, against the weapon handle. It also suggests no provision for helping the user to remember (or circumventing the user's failure to remember), during stressful occasions of preparing to operate the weapon, the importance of pressing the fingers with some repeatable amount of firmness and in some particular position and orientation against the sensing surface.

Without any such precautions, success in verifying identity of an authorized user seems very unlikely. These comments are not intended as derogation of the Shaw patent—but rather only to illustrate that much remains to be done, to put his invention into practical use.

Now apart from the hand-weapon context, hundreds of United States patents address the topic of automatic verification of identity through automated acquisition and analysis of body data such as fingerprints, palm prints, or "grasping pressure"—or subdermal information such as blood-vessel or bone structures, transmission characteristics for electrical signals passing along arms, iris prints and even "antibody profiles". Still other hundreds of patents are directed to voiceprint recognition (and its twin field, the extraction of intelligence from speech).

To select from these many proposals a suitable identity-discriminating technology for use in controlling a weapon, it is necessary to take account of the practicalities which come into play. A hand-weapon environment demands, in combination and under adverse field conditions, both (a) near-instantaneous accessibility to input data and (b) a reasonably high level of identification certainty.

It is not clear that any of the above-mentioned body-data types, other than fingerprints and voiceprints, inherently can meet this dual demand—even putting aside the "secondary considerations" enumerated above.

The same is true, though time consumption is not as crucial, in many other practical field environments such as use of cellular telephones, portable computers, public phones, phone credit systems, and vehicles. Still other field systems such as automatic tellers and facility-entry access devices would be amenable to enhancement by ultraminiaturized fingerprint acquisition and verification modules.

Apart from traditional ink methods, the fingerprint-acquisition technology which appears to be most highly elaborated to-date is optical. Nonoptical alternative technologies have been proposed in several patents and if economic may be usable with certain aspects of the present invention and within the scope of certain of the appended claims.

These patents include U.S. Pat. No. 4,353,056 to Tsikos of Siemens, for a direct capacitive fingerprint sensor; U.S. Pat. No. 4,394,773 to Ruell, also of Siemens, for a piezoelectric fingerprint sensor; U.S. Pat. No. 4,526,043 to Bole of AT&T Bell Labs for a capacitive system with fingerprint-force-modulated carrier; and U.S. Pat. No. 4,577,345 to Abramov for an integrated-circuit sensor array overlaid with a pressure-sensitive membrane. (Also U.S. Pat. No. 4,788,593 to Ovshinsky describes a thin-film photosensor array. Some such device may be usable in place of a more-conventional photodetector array in virtually all aspects of the present invention.)

Notwithstanding these inviting alternatives, more-conventional optical techniques—CCD arrays, video etc.—are appealing for having been most widely analyzed and explored heretofore. These range from relatively primitive and direct taking of images by pointing optical devices at fingers, through interposition of transparent media to simply stop the finger, to more-sophisticated systems that set out to collect at the outset information that is—at least in concept—binary (i. e., not gray-scale or multivalued), through application of the principle of frustrated total internal reflection (FTIR).

In the latter category are two main groups of systems. One of these is typified by U.S. Pat. No. 4,728,186 to Eguchi of Fujitsu. Eguchi's FTIR-analogue system uses flat lighting, and evidently does not rely on incident/detected angle relations, but inherently distinguishes fingerprint ridges from fingerprint grooves—based upon the inability of light from grooves to exit toward a detection direction that exceeds the critical angle.

More-conventional FTIR systems are described in, for example, U.S. Pat. Nos. 3,947,128 to Weinberger; 4,783,167 to Schiller; 5,233,404 to Lougheed; and 5,210,588 to Lee of Goldstar (Korea). In all these systems except Eguchi's, light is incident on a solid/air interface from within the solid medium at an angle to the interface normal (perpendicular) that is just slightly greater than a critical angle for total internal reflection for the given solid at an interface with air.

The critical angle is defined by arcsin (1/n), a special case of Snell's Law in which n represents the refractive index of the solid material. Provided that the incident angle exceeds this critical angle and air is on the other side of the boundary surface of the solid, in purest principle all transmission through the interface is prevented (transmission is said to be "frustrated"). The incident light is all reflected back into the solid—substantially none can pass through—hence the term "total internal reflection" or "frustrated total internal reflection".

As is well known, reflection at a smooth surface is said to be "specular": the angle of reflection (the angle toward which the incident light is reflected) equals the angle of incidence. Hence the light which is subject to total internal reflection is geometrically confined—to generally the same extent as the incident light—to leave the interface surface with a distinct directionality.

If some other medium instead of air, however, is juxtaposed against the surface, then the effective critical angle rises to arcsin (n'/n), where n' represents the refractive index of the other medium. Under these circumstances, total internal reflection occurs only if the angle of incidence exceeds this higher critical value. If not, then only some of the light is specularly reflected internally, and the remainder passes through.

Conventional FTIR fingerprint systems take advantage of these relationships by directing incident light to such an interface, from within a solid clear prism or plate, at an angle which is intermediate between the critical angles arcsin (1/n) for air and arcsin (n'/n) for typical biological materials such as skin or flesh, and water. If no finger is present, or if a finger is present but a light ray strikes the surface at a groove of the fingerprint, then the light under consideration is all internally reflected as before.

If instead a light ray strikes the surface at a ridge of a fingerprint, then part of this light passes through the surface and into the material of the finger. As a practical matter the penetration is typically shallow, and in the course of this shallow propagation the light is not reflected specularly by the finger but rather is scattered diffusely.

The directional distribution of the scattered light includes a significant fraction (perhaps as much as half of the scattered light) that is returned through the boundary surface into the solid clear prism or plate, but propagating into a wide directional range—a full hemisphere. Thus only a small fraction of this backscattered light coincidentally travels along the same specular-reflection direction that would be taken, according to total internal reflection, in the absence of the finger or at a fingerprint groove.

The amount of this backscattered light that can be collected at any particular direction varies with the solid angle over which collection is performed. A lens may be used for the collection. If for example an f/1 lens forms a half-size image of a fingerprint on a detector, then considering geometry alone the fraction of backscattered light collected should be less than two percent of a full hemisphere.

This would suggest that less than one percent of the total intensity of light striking a ridge area is backscattered into such a lens. (This theoretical low value is subject to important degradations, as will be seen shortly.)

In one operating mode, light directed toward such a collector at the specular internal-reflection position but in the backscattering case can be distinguished, based upon its lower intensity, from that directed toward the same collector and position in the total-internal-reflection case. This distinction provides one way of distinguishing ridges from grooves, respectively.

From what has been said above, it will be clear that ideally the intensity ratio is on the order of a hundred, and is slightly further enhanced by the fact that some light entering a ridge is absorbed. Such a ratio, for this particular way of distinguishing ridges from grooves, is high enough to fairly characterize the distinction as conceptually binary.

In another operating mode, another way to distinguish ridges from grooves is to exclude collection of any specularly reflected light. The amount of backscattered light that can be collected in directions other than the internal-reflection direction, although weak, is much greater than its background.

As suggested above, for a like collection angle the backscattered light is ideally about one-hundredth of the incident radiation; it may be greater for favorable backscattering angles. In such "other" directions, assuming an ideally smooth surface, in idealized principle no light at all will be collected in the total-internal-reflection case.

Hence a conceptually binary distinction can be obtained for viewing of the backscattered light too, at viewing angles away from the specular-reflection direction. It is accordingly well known that conceptually binary data can be collected from an FTIR system, using either the so-called:

"bright field" case, the first operating mode discussed above, in which air-filled fingerprint grooves provide (through specular total-internal reflection) a bright background or "field" on which to view the dark lines corresponding to ridges; or "dark field" case, the second operating mode discussed above, in which air-filled fingerprint grooves provide (through absence of backscattering) a dark field on which to view the lighter lines corresponding to ridges.

In the two cases light is incident on the finger-contact surface from essentially the same direction; and the interaction between the light, the solid clear prism or plate, and the finger surface relief are essentially the same. What differs is primarily the detector placement and preferably, in a conventional system, the collection-cone angle (related to numerical aperture).

As to placement, in the bright-field case light is collected for the detector along the direction of specular total-internal reflection. In the dark-field case light is collected in some other direction—most commonly, but not necessarily, about the normal to the solid/air interface surface.

The phrase "conceptually binary" has been used in the foregoing to make allowance for departures from ideal FTIR performance which are encountered in actual practice. Neither the supposedly continuous contact of a fingerprint ridge against the glass surface nor the theoretically clean separation of a fingerprint groove from the glass is perfect.

Due to these imperfections, observed intensity—and therefore contrast and signal-to-noise ratio—can depart dramatically from predictions of the simple geometrical theory introduced above. These departures in turn lead to significant preferences as between dark- and bright-field operation.

First, major intensity changes occur when separation is less than the wavelength of the light. In such cases, variations of a tenth of a micron—a significant fraction of a wavelength—can produce major fluctuations in intensity.

Relatively speaking, at fingerprint grooves separations roughly as small as a wavelength are only occasional unless a relatively large amount of liquid, dirt or skin detritus is in the grooves. The situation is different with respect to ridges: some parts of the finger may be contoured so that some ridges unavoidably graze or press against the surface too lightly.

Second and much more importantly, on a microscopic level fingerprint ridges are not continuous. They have myriad tiny gaps, as well as close and imperfect contacts, associated with the fibrous nature of the skin and the presence of sweat glands or pores.

Such grazing and gaps create macroscopic and microscopic pockets of FTIR specular reflection where the simple theory predicts only scattering. Some incident light that should be scattered is instead specularly reflected—or, in a manner of speaking, diverted into specular reflection. The resulting bright spots along a ridge cause the average or apparent intensity of the ridge—when viewed from the bright-field collection position—to rise toward that of the bright groove field.

Resulting intensity in a ridge region, in bright-field operation, is typically far greater than the predicted one percent of the incident light: in adverse cases it can be as high as seventy-five percent. This spurious brightness seriously degrades bright-field contrast.

Contrast C is often defined in terms of maximum and minimum intensities $I_{max}$ and $I_{min}$ as the ratio $$C=(I_{max}-I_{min})/(I_{max}+I_{min}).$$

If $I_{max}$ is the groove intensity, taken as one hundred percent, and $I_{min}$ is the ridge intensity, which is said above to be as high as seventy percent, then the contrast C can fall as low as $(100-75)/(100+75)$, which is one-seventh (0.14).

When viewed as backscatter from a dark-field position, the fibrous and pore-induced ridge gaps create a series of dark spots along the ridges—which on average darkens the ridges from their ideal medium level of brightness. If there is some background level (that is, if the dark field is not perfectly dark) this darkening lowers the effective contrast relative to the dark grooves.

Such a decrease in contrast makes the ridges harder to distinguish from the grooves in the dark-field case too. It is therefore very important to avoid conditions that give rise to a significant background level in the dark-field case—but at least in the dark-field case if such care is taken to avoid significant background the contrast will be good, whereas contrast in the bright-field case is poor intrinsically.

As a result of the various ridge effects, (1) the resulting higher intensity from a ridge, in bright-field work, is closer to the bright groove intensity than is (2) the lower intensity from a ridge, in dark-field work, to the dark groove intensity if reasonable care is exercised. In short, contrast is at least potentially better in the dark-field system.

Grooves too can be troublesome. Their theoretically totally reflected, bright light may also be modulated—that is, subject to partial transmission, and corresponding reduction of reflected intensity in the bright grooves of the bright-field case.

As compared with the previously described effective "diversion" of backscatter into specular reflection (by pores along ridges), this is the converse: "diversion" of potential specular rays into backscatter. This occurs only where the fingerprint grooves are unusually shallow or a relatively large amount of liquid, dirt or skin detritus is in the grooves.

For the dark-field case this same modulation can cause modulation of the degree of darkness in the groove regions. Backscattered intensity increases, but again only where grooves are dirty or very shallow.

All these phenomena, in which both the theoretically reflected and the theoretically backscattered light components are in actuality modulated, occur in both dark- and bright-field operation. Preferences emerge, however, for dark-field operation.

Most often, intensity variations great enough to be troublesome occur in the variably-dark ridge areas of the bright-field case—but not in the relatively darker, or more consistently dark, groove areas of the dark-field case. Consequently the intensity is adequately well controlled in:

groove areas of both systems—bright for bright-field systems and dark for dark-field systems; but ridge areas of dark-field only.

Accordingly dark-field systems are preferred for their higher contrast—ease of distinguishing ridges from grooves.

In addition to this preference based upon consideration of contrast itself, the same preference arises from considering the ratio of signal to noise—an essential consideration for precise measurements. As will be seen, the signal-to-noise ratio SNR is in part controlled by the contrast, so the contrast has an indirect effect as well as the direct one already discussed.

A well-known limitation on measurement precision at low light levels is so-called "shot noise" N—a physically unavoidable detector-signal random variation that is inherently proportional to the square root of the signal level S, thus: $N \sim \sqrt{S}$. To distinguish a ridge from a groove electrooptical-ly, it is necessary to detect a difference signal $$\Delta S = S_{max} - S_{min}.$$

The effective noise N on this signal, however, is not subtractive but combines as the square root of the sum of the squares of the two noise levels, $N \sim \sqrt{N_{max}^2 + N_{min}^2} \sim \sqrt{S_{max} + S_{min}}$. Therefore the signal-to-noise ratio $SNR = \Delta S/N$ is proportional to $$SNR = \Delta S / N \sim (S_{max} - S_{min}) / \sqrt{S_{max} + S_{min}}$$

and this can be written in terms of the contrast C, as previously defined, so:

$$SNR = \Delta S / N \sim \sim C \sqrt{S_{max} + S_{min}}.$$

For purposes of the present discussion, the signals $S_{max}$ and $S_{min}$ may be understood as accumulated over a period of time t in response to the corresponding optical energy flows or intensities $E_{max}$ and $E_{min}$, so that $$SNR = \Delta S / N \sim C \sqrt{(E_{max} + E_{min}) \cdot t}$$

or $$\sim C \sqrt{E_{max} + E_{min}} \cdot \sqrt{t}.$$

This shows that the signal-to-noise ratio SNR is proportional to the contrast. This expression also shows that the signal-to-noise ratio SNR can be improved by raising the light levels E or the exposure time t, or both—but only in proportion to the square root of the exposure time or sum of the light intensities.

In the dark-field case the contrast C is almost always unity, because $E_{min}$, the dark-field intensity at the grooves, is very small. Therefore the signal-to-noise ratio SNR is nearly always optimum in the dark-field case.

In the bright-field case, however, the contrast can be as low as about 1/7, with a proportionately lower signal-to-noise ratio SNR. The only way to make up for this lower contrast is to increase the exposure (that is, the light levels E or time t, or their product) by about $7^2$=forty-nine times.

Low bright-field signal-to-noise ratio thus aggravates the low bright-field contrast. (Other preferences for dark-field use will be seen later for FTIR systems of the present invention.)

Because of these practical factors, real FTIR systems require careful engineering to optimize performance; this has been the experience with prior FTIR-based fingerprint readers for, e. g., countertop or office use. Often additional optical provisions are incorporated to provide a darker dark field, or otherwise improve either contrast or signal-to-noise ratio.

In attempts to adapt such systems for microminiature applications such as mounting in a personal weapon, even more troublesome practical limitations intrude.

A primary obstacle to use of FTIR clear prisms or plates in very close quarters is the need for a focal element such as a lens to image the FTIR data onto a detector array or scanning detector. Unfortunately a lens also has undesirable properties.

One such property is the need for focal distances between the lens and, at one side, the FTIR data or "object"—and at the other side, the image to be placed on the detector array or scanning plane. Focal distances, at both sides of the lens, ordinarily total several times the focal length.

More specifically the distance at the object side of the lens is (1+M)f, where f is the focal length and M the multiple of magnification or reduction. The distance at the image side is (1+1/M)f, for a total of (2+M+1/M)f.

For short-focal-length systems such as those of interest, the focal length roughly equals the transverse-diagonal dimension of the object. For a representative fingerprint, that transverse dimension is perhaps 1½ to 2 cm; thus a minimum optical-train length is about 7 cm.

Further the lens too may be (perhaps particularly for the dark-field case) comparable in diameter to the object transverse diagonal.

To constrain the size and thus particularly the cost of a CCD or like detector array, it is usually desirable to use the lens to reduce (that is, demagnify) the fingerprint image at the detector. In this case the optical train lengthens to very roughly six focal lengths, or over 10 cm—and without greatly lowering the lens diameter.

This property conflicts with the need for extreme compactness, in the context of a personal weapon. While an optical path can be folded to overcome gross length, even this is awkward in a small space—particularly for a high-numerical-aperture or a wide-angle system.

A second undesirable property of a lens system is susceptibility to depth of field and distortion, particularly severe if the lens and object plane are not reasonably parallel and conaxial. Just such geometry is typical in bright-field FTIR devices, in which collection is necessarily accomplished (as explained earlier) off-normal by more than the critical angle vs. air.

Such systems have different magnifications at top and bottom of the fingerprint image, leading to complications in later interpretation of the acquired image. More seriously, the top and bottom of the image are badly out of focus when the center of the image is focused, unless a rather small numerical aperture is used.

This last conflicts somewhat with the state of the art in design of miniature portable apparatus, which is ordinarily directed toward minimizing battery size and maximizing battery life by minimizing lamp power—which is to say, maximizing light-gathering power. Another cure for the depth-of-field problem, but in essence one that is costly enough to validate the seriousness of the problem, is proposed in U.S. Pat. No. 5,109,427 to Yang of Goldstar: here a hologram is used to eliminate image tilt and resulting aberration.

Two prior patents have proposed substitution of a fiber-optic prism for a clear prism as a dark-field FTIR fingerprint collection block in a fingerprint reader: U.S. Pat. No. 4,785,171 and 4,932,776 of Dowling et al., assigned to Fingerprint Technology, Inc. of Pomfret, Conn. (A fiber-optic prism is made from one or usually more fused bundles of optical fibers.) This substitution offers relief in controlling some or all of the lens-system problems discussed above.

It appears from discussions in both these patents that corresponding apparatus has been built and tested, but also that Dowling is confused about what the apparatus in its reflection-based embodiments is doing. Despite careful introductions leading to discussion of the FTIR phenomenon, both texts ignore backscatter and steadfastly declare that the brighter parts of the image are due to skew rays reflected from the fingerprint grooves (in other words, a sort of bright-field operation).

Fingerprint grooves and ridges do look very much alike, and a ridge bifurcation is accompanied by the end of a groove in such a way that it could be mistaken for a groove bifurcation accompanied by the end of a ridge. It is certainly no discredit to the inventor that he was able to pursue these inventions with incomplete understanding of their technical behavior; however, the teachings of the patents are to this extent impaired.

In the first of these patents, Dowling retains a lens—using only the capability of the fiber prism to transfer the initially tilted image to a prism face that is parallel and conaxial to the lens. The lens is spaced away from that prism face in the usual elongated geometry (discussed above), also leaving the system vulnerable to scattering by contamination.

In Dowling '171 this problem is actually made more severe than in most conventional FTIR lens systems, because Dowling injects light into his system at this same output face of his fiber-optic prism. (Light ducted to the finger end of the prism meets a 45° face there, which—wherever exposed to air—specularly deflects the light laterally out of the fibers for dissipation in the fiber structure. Where contacted by finger ridges, some of the light is backscattered into the fibers for return to the entry-and-camera face.) In consequence any light scattered by dirt at that face can proceed directly into his detector lens.

The severity of this problem is minimized in the '171 patent but acknowledged in Dowling's '776 second patent, which teaches use of a fiber-optic taper, integral with the fiber prism, to match the print image to a relatively small CCD array. It also teaches—instead of the spaced-lens configuration with injection and detection at the same end of the fiber-optic element—attaching a CCD array directly to the end of the fiber taper remote from the finger, thus entirely eliminating the lens and associated optical gap.

The fiber core has refractive index 1.62 and the cladding 1.48, yielding against air a moderately high numerical aperture NA=0.66 and critical angle of about 38°. This choice is conventional for obtaining good light-gathering power, although many skilled artisans in this field would prefer a considerably higher numerical aperture.

(For the majority of current applications involving fused-bundle faceplates or image conduits, glasses with numerical apertures of 1.0 and 0.66 are used. Fused-bundle materials are also available with a very few other numerical-aperture values such as 0.95, 0.85 and 0.35; however, 0.95 or 0.85 face-plate material is not always available, and 0.35 is typically run "infrequently due to lack of demand"—see for example "Fiber Optic Faceplate Data", Incom, Inc., Southbridge, Mass.).

Here Dowling sets out to apply the full capabilities of the tapered fiber prism to shorten the optical system, erect the image plane (supplying an image that is merely anamorphic but in uniform focus and free of major aberration), and eliminate or minimize effects of contamination and jarring. Unfortunately, however, Dowling's fiber prism is covered by a CCD at one end and a finger at the other, leaving no suitable entry point for illumination.

Dowling proposes three alternative tactics for confronting this problem. In a first, the light is applied to the opposite side of the finger to be read—which in Dowling's term is thus "transilluminated".

This option appears unsatisfactory by virtue of at least three major drawbacks: bones in the finger degrade the uniformity of illumination, FTIR binary character is impaired or forfeited, and the optical path is longer and more elaborate—with a lamp outside the main housing and past the subject's finger.

As to the third of these points: if the lamp is far from the prism, light and power are wasted; if the lamp is close, new problems arise. The subject must slide a finger into position under the lamp, likely leading to distortion of the finger and thus the print if the finger is pressed against the prism while sliding. Also the subject cannot clearly see either the prism or the finger, which may cause some anxiety in some environments as for instance an automatic-teller machine. Such a system is unsuited for access control of a personal weapon, as the lamp housing would impede rapid grasping of the weapon.

In a second of Dowling's alternatives, small lamps "might be implanted in the face of the image sensor". This option is put forth with suitable tentativeness, as there readily appears no way of either (a) protecting the sensor from fogging by the lamps, or (b) causing light that originates outside any fiber to enter into that fiber—in the sense of being ducted along it to reach the finger end of the prism. This second alternative, not illustrated, would seem to be inoperative.

Dowling's third alternative is to direct the light into the sides of the fiber prism—specifically from the narrower sides of the taper—propagating toward the finger-contacting surface to be illuminated. In particular his illumination is directed into portions of the taper where fiber diameter is changing rapidly with respect to longitudinal position (i. e., the part of the taper that is actually tapered). Dowling teaches that the light should be thus projected into the prism from all four opposed sides (forming in effect a square light source), and at "30° to 45° relative to its major longitudinal axis".

Analysis indicates that this Dowling system will at best work very poorly, and most likely not at all. In particular, the efficiency of light injection in this manner is extremely poor.

Some very small fraction of light rays may possibly be injected into the inflection point, the most strongly tapered region, of the taper section. Through Successive internal reflections in the transition zone (from that angled region to the larger straight segment of the taper), rays so injected may possibly enter the ducted mode of propagation along the fibers and so reach the finger surface.

This process is the reverse of light leakage from a taper—in passage toward the narrower segment—as angles of inclination increase during multiple reflection in the wedged region. Although a significant fraction of light can be lost in such a way, as will be understood the loss is to stray light that then travels in many different directions outside the fiber bundle. Therefore, to use the reverse procedure in the injection process, very high illumination from any given narrow directional cone would be required to effectively illuminate the target finger.

In order to accomplish even this, however, it would be necessary to use a taper that has no absorbing material outside the individual-fiber walls (usually designated "extra-mural absorbing" or "EMA" material). In that case much of the returning backscattered light from fingerprint ridges would correspondingly escape from its fibers at that same inflection region of the taper, and these escaping rays would diffuse into many adjoining fibers and badly fog the image.

Any effort to overcome this problem as by, for instance, using fiber of much higher than usual numerical aperture would be counterproductive in that the injection mechanism described above, marginal at best, would be foreclosed (although this fact may well not be generally known).

Dowling indicates the importance of opposed illumination from all four sides of the taper, and this emphasis possibly flows from empirical observation that such illumination is needed to achieve operation. It is known in prior-art optical systems of various kinds to illuminate from, e. g., two opposed sides of a device to obtain more uniform lighting and thereby enhance performance—but this is a different matter from actually requiring such opposed or bidirectional illumination to make a system work at all.

Again, Dowling's discussion seems to suggest that his apparatus has been made and operated. If so, then it must operate at the very bounds of usability—a power-hungry system as it is working with small tail-end fragments of the input light that almost accidentally make their way to the fingerprint contact; and a low signal-to-noise system due to diffusion of major fractions of the backscattered light along the return path.

Such a system may appear adequate in simple bench tests and might actually be adequate in facility- and vehicle-mounted environments that can supply plentiful lamp power—and can afford either degraded identification certainty or extra analysis time to overcome marginal signal-to-noise. It would not be adequate in the extremely demanding low-power, high-certainty, fast-moving context of a personal weapon.

Dowling proposes only this opposed injection into the actually-tapered portions of the taper, and next to its narrower segments—and only a unitary fiber/prism assembly with 0.66 numerical aperture. He does not suggest any variation of the injection geometry, unitary prism, or numerical-aperture value. In view of the inoperability or near inoperability of the geometry, considered together with Dowling's own inability to explain its operation, the teachings of Dowling '776 while perhaps useful are not readily extended or refined.

Another technique for injecting light into a fused fiber-bundle structure, particularly an image conduit, is called "separate-channel illumination". Separate fibers are brought out of the bundle laterally for this purpose, and a light field is projected into these separate fibers—and carried in separate channels or layers in the direction opposite from the resulting image.

Although this technique may be useful for illuminating objects too close for other types of illumination, it would be inconsistent with the geometries needed for FTIR operation; and also is relatively expensive.

A very great body of patent and other literature relates to the interpretation and particularly comparison of fingerprint data once acquired. These may be performed visually or by automatic processors, such as computers using now-familiar digital electronic microprocessor technology.

Comparisons in most known systems proceed by abstracting, from collected images, details called minutiae. Generally speaking these are ridge terminations and bifurcations, stable scars and other permanent features.

Resort to minutiae has the very important advantage that minutiae and certain of their characteristics are usually invariant with age, weight change, position, and the distortion of a newly collected input image relative to a preexisting master image for comparison. The particularly useful characteristics are in essence topological near-invariants such as the number of ridges—or the approximate angular interval about a pattern center—which separate specified minutiae.

Use of minutiae is also, however, subject to the very important handicap that massive amounts of data handling are needed to in fact successfully abstract these data from a raw fingerprint image. Data processing requirements, in the context of very small automatic equipment such as personal weapons, are accordingly very demanding.

Here the entire algorithmic process of prenormalizing the image information, finding minutiae, determining their selected near-invariant characteristics, and comparing those with the characteristics for a given preexisting master image must all be accomplished within some small fraction of a second. Certain segments of this process may be subject to division into parallel analytical tasks for simultaneous processing, but a circuit providing such parallel processors may unacceptably increase overall system cost.

Portions of the present invention are compatible with making identifications through analysis of minutiae. This will be more clear from later portions of this document, including certain of the appended claims.

Some prior-art documents disclose use of "fingerbeds" or other devices for constraining the finger from which a print is to be read. These devices operate, with greater or lesser degrees of certainty, to control the position of the finger in relation to a sensing surface.

In general, however, relatively little attention has been devoted to constraining the orientation and firmness of finger application to the sensor. This observation has been first introduced above in relation to the Shaw patent, but is to an extent applicable to automatic fingerprint-acquisition devices more generally.

Even when supposed topological invariants such as minutiae are to be determined, such failure to provide reproducible finger orientation—and probably to a lesser extent a reproducible degree of finger pressure—introduces considerable uncertainty into the actual practical process of acquiring prints and thereby into the resulting identification. Although adequate identifications may be obtained using such equipment and methods, generally speaking more time and greater processing complexity is required in overcoming inconsistent input information, for any given degree of certainty.

As to personal-weapon access generally, the art fails to cope with a thief who bypasses ("hot wires") or removes access-control devices, making a weapon work without them.

Further the prior art has failed to provide an optical fingerprint reader module amenable to microminiaturization for access control in highly demanding field applications, particularly including personal weapons—and also encompassing access to use of portable computers and phones.

Public phones, phone credit systems, vehicles, automatic tellers and facility-entry access devices, although not as critical as portable personal equipment in terms of size, time, power, identification certainty, etc. would also be meaningfully enhanced by provision of a microminiaturized reader.

As now seen, prior art has failed to provide solutions to important problems; and important aspects of the technology in the field of the invention are amenable to useful refinement.

SUMMARY OF THE DISCLOSURE

The present invention introduces such refinement, and corrects the failings of the prior art. Before offering a relatively rigorous discussion of the present invention, some informal orientation will be provided here.

1. ORIENTATION

It is to be understood that these first comments are not intended as a statement of the invention. They are simply in the nature of insights that will be helpful in recognizing the underlying character of the prior-art problems discussed above (such insights are considered to be a part of the inventive contribution associated with the present invention)—or in comprehending the underlying principles upon which the invention is based.

The system described in Dowling '776 is inoperative, or marginally operative, for these four main reasons:

(a) Light Should be Injected at a Favorable Place

As a general rule, illumination that is initially outside an optical fiber can be systematically made to pass along the fiber—in the ducted-light, waveguide manner—only by introducing the light through an end of the fiber. If light instead passes into a fiber through a side wall, its entry path is by definition not that of a waveguide-ducted ray, and so in general (that is to say, on average) the major part of this light will find a like exit path nearby and leave the fiber through the side wall.

Only a very marginal, energy-inefficient exception to this general rule is encountered in the case of a fiber-optic taper (or very strongly curved pipe), as discussed in the preceding section. Reliance upon such an inefficient injection mechanism should be avoided, to prevent the associated energy waste, image fogging, signal-to-noise degradation, and haphazard results.

Hence if light is to be injected through a side wall to illuminate a finger or like object in contact with a fiber termination (end), the light should be injected so that it passes through the side wall immediately adjacent to that termination. In other words, to reach the termination the light should not rely on passage ductwise along the fiber, but instead simply should directly strike the termination immediately after passage through the side wall—preferably with no ducting reflections at all along side walls of the fiber.

The Dowling '776 system departs from this requirement.

Analogously if light is to enter a fiber through a side wall for subsequent reflection, at a reflective termination (end), into the ducting-waveguide operation of the fiber, the light should first pass through the side wall immediately adjacent to that reflecting termination. Again, to reach the termination light should not rely on—and preferably should not undergo—passage along the fiber ductwise toward the reflecting termination, but instead simply should directly strike that termination immediately after passage through the side wall. (After that first end-wall reflection, in forms of the present invention the light is generally ducted by multiple side-wall reflections along the fiber toward a finger-contacting termination at the other end of the same fiber.)

(b) Light Should be Injected at a Favorable Angle

Since illumination is to strike each termination immediately upon entry, preferably without ducting reflection along the destination fiber en route, the illumination should first enter each fiber:

at the proper angle for FTIR operation at the termination (or, in some forms of the invention, first the proper angle for reflection at the termination—after which the fiber does duct the light to the finger-contacting surface at the proper angle for FTIR operation); and preferably in an angular relationship with the fiber which is not favorable to direct entry of the rays into a ducting mode.

These two conditions will now be discussed in this same order.

To reach the fiber terminations (other than those few which are at the entry face), illumination necessarily crosses the fiber structure of the prism, and in the process is strongly diffused. Fortunately the initial angle of inclination of the rays relative to the fibers tends to be preserved in propagation of the light.

This operation does require, however, injection of light so that, once within the prism, it is at the proper FTIR angle (or in some geometries a proper relaying-reflection angle). In general, for the reasons explained in the Prior Art section of this document, the proper FTIR angle as defined from the surface normal is just greater than the critical angle.

Consideration of representative examples will clarify this. As the critical angle (off normal) is typically just below forty degrees, injection must be at a steep angle of at least about forty degrees to the normal. A good choice for injection is about forty-five degrees (off normal).

In bright-field FTIR imaging, the totally reflected light is to be coupled into the ducting, waveguide mode of the fibers, which parallel the prism axis. Assuming a right-angle-prism suitable for bright-field operation—with the finger-contacting surface also typically at about forty-five degrees but relative to the prism axis—the addition of these two forty-five-degree angles leads to a total of roughly a right angle between the injection path and the prism axis.

In the case of a squared-off prism suitable for dark-field FTIR imaging, with the finger-contacting surface at right angles to the prism axis, the prism axis and the surface normal are congruent. Therefore the injection should be at about forty-five degrees to the prism axis, and must be greater than the critical angle (about thirty-eight degrees). If the injection is at a shallower angle to the prism axis, no total internal reflection can occur.

(In the case of a relaying end-wall reflection too, the injection is best at about 90° to the prism axis.)

The second condition mentioned above (angular relation unfavorable to ducting) is important not only because injection into a taper is wastefully inefficient, but also for the integrity of a system operating in accordance with the first condition. A direct-crosslit system that allows initially ducting illumination too will yield badly garbled results, for the following reason.

It is possible for ducted illumination to be at a correct FTIR angle, as in certain forms of the present invention—provided that the illumination-carrying fibers are at the correct FTIR angle to the finger-contacting surface. Such operation, however, requires a fiber-to-contact-surface angle that is different from the analogous angle in a system using direct crosslighting to the finger-contacting fiber terminations.

Therefore in a system which allowed both direct-crosslit FTIR-angle illumination and ducted illumination, the finger-contacting surface would necessarily be at an incorrect angle for FTIR operation, relative to one or the other component of illumination. The forms of the invention that employ ducted FTIR input illumination therefore do not use crosslighting that is direct to the finger-contacting terminations, although they do employ crosslighting in another way (direct to a partially reflecting end wall) as will be seen.

The "second condition" here under discussion implies primarily that injection should not be into a region of the optical element where fibers are tapered—or, to state this condition positively, injection should be into a region where fiber diameter is constant with respect to longitudinal position along the fiber. Ideally, injection should be arranged to avoid even very strongly curved regions.

The second condition also has an implication as to systems in which tapers or strongly curved light pipes are used (contrary to the primarily implied condition above). In this case, at least the angle of injection should be kept steep enough, relative to all the changing angles of the fibers within the prism, to preclude entry into ducting.

Dowling's teaching that injection can be accomplished at "30° to 45° relative to [the] major longitudinal axis" is in one sense somewhat ambiguous with respect to some of these requirements, as he appears to be stating the angle outside the prism and does not expressly discuss the angle inside. He does, however, of course make clear that his objective is to achieve initial ducting of the injected light, directly contradictory to the condition stated here.

It is interesting to note that it is the geometry of the present invention which at first glance seems implausible, compared with Dowling's seemingly appealing idea of simply shining the light in at an acute angle along the fibers toward the finger.

(c) The Fiber Prism Should be of a Favorable Material

Because of the multiple reflections and lensing effects encountered by injected light in going across the grain of the complex multicylindrical structure, incoming illumination tends to be strongly diffused; a large fraction can even reverse direction and leave the fiber block through its input face.

This effect is adverse as it amounts to a form of attenuation of the FTIR-usable light. It potentially leaves only a small fraction of incident optical power to reach the center (and in one-side illuminated systems the far side) of the fiber prism, at least in usable form, and so tends to illuminate the finger-contacting face very nonuniformly.

In addition this attenuation effect wastes light, and lamp power—and through massive generation of skew rays will illuminate fiber terminations at incorrect angles for FTIR operation. This process diverts light away from FTIR operation, into image fogging and light loss from the system.

It is believed that in fiber-optic elements made with almost all materials commercially available now, the fogging and light loss would be severe. Generally speaking, fogging would be so severe as to dominate the image data and thereby render virtually impossible any extraction of reliable information about fingerprints or the like.

Part of the present invention is based upon recognition that this type of attenuation and fogging can be minimized by choice of fiber-prism material, and in particular material of suitable numerical aperture—and more specifically that the attenuation length for diffusion across this sort of structure varies, roughly, inversely with the fourth power of the numerical aperture of the material.

In accordance with this recognition, FTIR-usable intensity I at depth x within the prism is roughly related to incident intensity $I_o$ and numerical aperture NA as:

$$I \approx I_o \exp[-2x(NA/2n_{avg})^4/D], \qquad \text{(Eq. 1)}$$

where D is the periodicity of the fiber structure and $n_{avg}$ the average of the refractive indices of fiber cladding and core.

(Derivation of this expression appears in subsection 2[a] of the Detailed Description section.)

From the theory of fiber optics, the numerical aperture of optical-fiber materials increases with the difference between refractive indices of the fiber core and cladding, according to the known relation:

$$(NA)^2 = (n_{core})^2 - (n_{cladding})^2, \quad (Eq.\ 2)$$

and this holds true for a prism made of a fused bundle of optical fibers as well as an unfused bundle or an individual fiber.

The attenuation length $(2n_{avg}/NA)^4 D/2$ establishes the rate at which FTIR-usable intensity falls off with penetration depth, and more specifically equals the distance over which intensity drops to 1/e of an initial value (where e is the base of natural or Naperian logarithms, and 1/e is about three-eighths). Using this very approximate relation, the attenuation length can be estimated at very roughly 2 mm for NA=0.66, or 21 mm for NA=0.35.

In view of this extreme sensitivity, it will now be clear that capability to effectively crosslight a prism depends rigorously upon selection of a material with suitably low numerical aperture. As a fingerprint-acquisition 45° prism itself should be roughly 15 to 20 mm across, or in an alternative geometry some 10½ mm, the difference between the above-mentioned values (for attenuation to about three-eighths of initially incident intensity) is significant.

Calculations using Eq. 1 have been used to define preferable low numerical-aperture values, needed for marginal operation at the bounds of practicality—and also to define more highly preferred very low values needed for more-optimum operation. These values will be presented shortly, in the portion of this section which is more formal; and will be discussed in the Detailed Description section.

(Eq. 1 is only very roughly correct. In particular, for reasons detailed later, Eq. 1 deviates from accuracy at penetration depths greater than a very few [perhaps only about two] attenuation lengths. Nevertheless Eq. 1 is entirely adequate for comparisons of performance at different numerical-aperture values, and also for general discussion of considerations affecting system performance.)

The desired range of low numerical-aperture values is not the same for all configurations or definable in the abstract, but rather depends on both the illumination geometry and the prism size. As pointed out above, the numerical aperture controls the ability of the system to inject FTIR-usable light into the prism at various depths.

In a practical miniaturized portable apparatus for field use, lamp power must be strictly minimized. On the other hand the intensity of the optical signals reaching the detector should not be too small, as they must compete with waste light reaching the detector, added to ambient scattered light—sources which may collectively be called optical "fog".

If the optical signals are too small, they are buried in this "fog"—or the resulting electrical signals are swamped by associated electrooptical noise, particularly the shot noise discussed earlier.

In any event this small-signal side of the problem cannot necessarily be circumvented even by increasing lamp power, as the diffusion type of attenuation under discussion not only robs the system of light needed for the FTIR process but also diverts that light into image fogging. Any effort to compensate by raising the overall light level may only make the matter worse, by saturating the detector and so precluding all measurements.

In other words, the type of attenuation which arises from diffusion not only impairs the signal level but also threatens the underlying operation of the system. These results of excessive attenuation can be escaped only by confronting the numerical-aperture requirements described here.

With a favorable steep-angle, wide-face illumination that is opposed or bidirectional, i. e. projected into a rectangular-ended dark-field prism from sources at two opposite sides, as will be seen the different geometry rather coincidentally leads to low-numerical-aperture selection that is the same as in the unidirectionally lit 45° bright-field prism. Path lengthening due to off-axis angle just compensates for the shorter distance to the midplane; when power to a single lamp in the 45° prism geometry is shared between two opposed lamps in the rectangular geometry, the resulting choice of low numerical aperture comes out the same. Nevertheless, as shown in the Detailed Description section of this document, the opposed lighting does confer a striking advantage in illumination uniformity.

FTIR-usable light intensity at the prism center is the resultant of the two usable intensities from the two sources—more specifically, two overlapped intensity distributions, exponentially falling from opposite directions as set forth earlier in Eq. 1. Even a prism illuminated from both sides—possible with the squared-off dark-field configuration—requires effective incident-light diffusion from each side, at least to the midplane. For this situation the applicable form of Eq. 1 is two overlapping exponential functions, tailing off in opposite directions from both entry faces:

$$I \approx I_o \{\exp[-2x(NA)^4/k] + \exp[-2(x_F - x)(NA)^4/k]\}, \quad (Eq.\ 3)$$

where $x_F$ is the distance to the far side of the prism means.

As will be seen from later detailed discussion, effective illumination even in this opposed-lighting case is infeasible at Dowling's indicated numerical aperture of NA=0.66: only the tiniest fraction of incident energy can propagate—maintaining the original input angle or direction—even halfway across the fiber prism.

Almost as important as the overall attenuation value is the strong nonuniformity of attenuation as between the edges and midplane of the prism—further complicating image interpretation. At NA=0.66 even for opposed lighting such nonuniformity would amount to a factor of about five thousand between the extreme values, or about ±99.98% of the median value.

With proper choice of low numerical aperture, however, effective illumination is very easily provided. The result is astonishingly high FTIR-usable intensity at the midplane and uniformity across the full breadth of the prism means. For example, in the opposed-lighting case such intensity may vary, across the entire prism means, by a factor on the order of only about 1.4, or about ±15% of a median value.

Actually Dowling's NA choice is in keeping with usual concerns for light-gathering power and signal-to-noise ratio—and in particular ducting ability—in optical systems, leading to fibers of high numerical aperture (high index differential). Conventional wisdom in the art thus teaches away from the necessary conditions of the geometry of the present invention.

In addition, at least the injection segment of the prism should be free of extramural-absorption material.

(d) If a Taper is Used, it Should be a Separate Element from the Prism

Whereas the prism should be given a low numerical aperture to minimize the diffusion-created attenuation, and should be free of EMA material, two opposite considerations apply to the taper.

First is its primary function of ducting light through a path that is tapered, preferably tapered rather tightly. This function tests the ability of the taper to constrain light within its waveguiding boundaries.

Light rays passing along an individual tapered fiber (and so along a tapered fiber bundle), from the broad end toward the narrow end, encounter increasing angles of reflection which are more severe than the environment of alternating increasing and decreasing angles in a moderately curved but untapered fiber. These changing reflection angles lead to leakage and interfiber crosstalk.

Ability of a fiber (or bundle) to minimize such signal loss is best enhanced by use of a high numerical aperture. To prevent crosstalk, in recognition that even a high NA will not entirely retain the light, those rays that do escape should be stopped by extramural absorption.

The second consideration calling for use of high numerical aperture is the effective degrading of optical energy flow, through a reducing taper, by the square of the demagnification. In practical cases this can amount to loss of more than three-quarters of the input energy, as follows.

The capability of a fiber-optic prism or taper to accept light flux is proportional to the solid angle of the effective acceptance cone of the element, and this solid angle is in turn proportional to the square of the half angle of the cone, just outside the glass. The half angle, expressed in radians, is very nearly (in air) the numerical aperture NA—so that energy flow overall goes as the square $NA^2$ of the numerical aperture. (More exactly the half angle is the arcsin of the numerical aperture, and the energy flow is proportional to $\arcsin^2[NA]$; but this is roughly $NA^2$.)

A taper of numerical aperture $NA_{taper}=0.66$ and reduction M=2 to 4, however, passes light from its broad segment to its narrow segment only as if its numerical aperture had an effective value of $NA'_{taper}=NA_{taper}/M=0.33$ to 0.17 respectively. This reduction in effective numerical aperture is inherent in the geometry of a taper.

Although the numerical aperture $NA_{taper}$ is the same at both ends of a taper, rays that enter the taper within its actual $NA_{taper}$-established cone but outside its effective $NA'_{taper}$-established cone will fall outside the actual $NA_{taper}$-established cone at the narrow, exit end. (Along the way from entrance to exit ends, these rays escape from the ducting mode and preferably are trapped by EMA material if provided; if not trapped they can leave the taper laterally as leakage, or in adverse cases fog the image at the narrow end.)

Energy flow is therefore proportional to the effective value $NA'_{taper}{}^2=(NA_{taper}/M)^2=0.17$ to 0.027 respectively. The roughly comparable flow through a straight fiber-optic prism of numerical aperture $NA_{prism}=0.35$ is $NA_{prism}{}^2=0.17$. (The values are not precisely comparable since numerical aperture relates to acceptance angle against air, not the acceptance angle as between the two glasses.)

Within this approximation, the taper of actual numerical aperture $NA_{taper}=0.66$ therefore transmits nearly all the light from the prism of $NA_{prism}=0.35$ if it is a two-times reducing taper (M=2)—but only $(NA'_{taper}/NA_{prism})^2=0.027/0.17=0.22$, twenty-two percent, of the light from the prism if it is a four-times reducing taper (M=4). The transmission is at an intermediate value of about twenty-eight percent for a three-times reducing taper (M=3).

Hence an even higher numerical aperture than the value 0.66 used by Dowling would be preferable for the taper. To match a prism of $NA_{prism}=0.35$, the taper should have numerical aperture of $NA_{taper}=NA_{prism}\cdot M=1.05$ if it is a three-times taper (M=3), or an even higher value $NA_{taper}=1.4$ if it is a four-times taper (M=4).

Since the prism and taper thus have diametrically conflicting design requirements for practice of the present invention, they are best fabricated as separate elements. As will shortly be seen, a dual-element construction is also amenable to incorporation in an entirely novel and effective illumination configuration—even if neither of the elements is a taper.

2. MORE-FORMAL DISCUSSION

Now with these four preliminary observations in mind this discussion will proceed to a perhaps more-formal summary. The invention has several independent aspects or facets.

(a) A First Aspect of the Invention

In preferred embodiments of a first of these aspects, the present invention is apparatus for acquiring surface-relief data from a relieved surface such as a finger.

The apparatus includes prism means formed from optical fibers. (A fused bundle of fibers is much preferred to unfused fibers, as the latter—with their high-index-differential boundaries between glass and air—attenuate crosslighting much more rapidly.) The prism means in turn include a first end and a second end.

As will be seen, the phrase "prism means" is primarily used to encompass important embodiments of the invention in which two or more fiber-optic optical elements in series are included in the optical assembly.

The first end comprises terminations of the fibers for contact with the relieved surface. The second end comprises opposite terminations of the same or corresponding fibers.

By "corresponding fibers" here is meant fibers of a second element that may be in series, as mentioned just above. Such a fiber receives light from the fibers in the first element.

A "corresponding fiber" typically is only very roughly aligned with any of the fibers in the first element, so that in practice the light from each fiber in the first element may pass into several fibers of the second—and each fiber of the second element typically receives light from several fibers of the first. These effects somewhat degrade image resolution, but can be made inconsequential by using prism materials in which the fiber spacing is sufficiently finer than the fingerprint ridge spacing.

The second end of the prism means is for passage of light traveling along the fibers from the first end.

Preferred apparatus according to the first aspect of the invention also includes means for projecting light across the fibers in a region where fiber diameter is substantially constant with respect to longitudinal position, for lighting the first-end terminations. For breadth and generality in discussing the invention, these means will be called the "light-projecting means" or simply "projecting means".

Even though the projected light crosses the fibers and is "for illuminating" their first-end terminations, in some forms of the invention as will be seen it does not necessarily illuminate them directly or immediately upon fiber entry.

A light fraction that is dependent (i. e., whose magnitude is dependent) on contact between the relieved surface and each illuminated first-end termination is ducted from that termination along its fiber. (By "its fiber" is meant the fiber which is terminated by the termination.)

The present invention enables such passage of light, to and from the finger-contacting end of the prism means, to proceed successfully according to the well-known principles of FTIR introduced earlier in this document—despite use of fiber-optic prism means.

In addition the apparatus includes some means for receiving—at the prism-means second end—each light fraction from the first end, and in response forming an electrical signal which is characteristic of the surface relief. Such means accordingly have an electrooptical character; here too for generality and breadth these means will be called simply the "electrooptical means".

The foregoing may be a description or definition of the first aspect of the present invention in its broadest or most general terms. Even in such general or broad forms, however, as can now be seen the invention resolves the previously outlined problems of the prior art.

In particular, because the light is injected in a region of the prism means where fiber diameter is substantially constant with longitudinal position—rather than in the changing-diameter region of a taper—this invention avoids the severe inefficiency (and at least marginal inoperability) of the Dowling '776 system.

By avoiding injection into a tapered region, the present system enables illumination to reach crosswise, without being ducted through the fibers, to the fibers whose terminations are to be lighted. In fact the light can directly reach either (1) those terminations or (2) certain other terminations which reflect light directly along the fibers toward those finger-contacting terminations.

This is a far more systematic, controlled, efficient optical-energy coupling arrangement. Furthermore, because of the selection of an untapered region for light injection, the light can be projected crosswise into the prism directly toward the optical-interaction points (or directly toward reflection sites whence it is in turn projected directly longitudinally toward the optical-interaction points). In consequence, essentially all the light which reaches the first-end terminations can satisfy FTIR requirements.

This invention accordingly avoids the catch-as-catch-can energy usage which can result (as for example in Dowling '776) from illumination that is haphazard with respect to the relationships of frustrated total internal reflection.

Although the invention thus provides very significant advances relative to the prior art, nevertheless for greatest enjoyment of the benefits of the invention it is preferably practiced in conjunction with certain other features or characteristics which enhance its benefits. Among these are, to begin with, three main preferred embodiments: a bright-field configuration and two dark-field configurations.

(i) A bright-field embodiment of the first aspect—In the bright-field FTIR apparatus, the projecting means include some means for projecting light to enter individual fibers, through their respective side walls, immediately adjacent to their respective terminations.

Each termination, at the first end, is oriented, relative to the projected light and also relative to a longitudinal direction of its fiber, so that the light at that termination is:

reflected at that termination into and along its fiber toward the electrooptical means, if the relieved surface is out of contact with that termination; and instead in large part—or at least fractionally—scattered by the relieved surface out of the corresponding fiber, if the relieved surface is in contact with that fiber termination.

These will be recognized as the geometrical conditions for bright-field detection.

Within this first embodiment it is preferred that the projecting means direct the light into the prism means at an angle, relative to an axis of the prism means, which is greater than twice the critical angle for the fiber cores against air. For purposes of all the appended claims, the critical angle is defined as the minimum angle off-normal for total internal reflection.

For an element in which the fibers are straight and untapered, the phrase "axis of the prism means" denotes an axis parallel to the common longitudinal direction of the fibers. If the element is a taper, ordinarily the fibers are straight along some line—perhaps most usually the centerline—and this line is the prism-means axis. In other cases, those skilled in the art will understand what definition effectuates the purposes of the invention.

It is preferred that the critical angle for the fiber cores against air be roughly forty degrees, and that the first end of the prism means lies at an inclination angle of roughly forty-five degrees to the prism axis—and that the projecting means direct the light into the prism means at an angle to the axis of approximately ninety degrees.

Preferably the prism means, at least in a region where the light crosses the fibers, have a numerical aperture NA that satisfies this maximum condition:

$$NA \leq 2n_{avg}(D/x_F)^{1/4}, \qquad \text{(Eq. 4)}$$

where $n_{avg}$≡average of core and cladding refractive indices in that region of the prism means;

D≡periodicity of the fiber structure in that same region; and $x_F$≡illumination-path distance across the prism means in that region, and the conventional notation $(D/x_F)^{1/4}$ means the fourth root of the ratio $D/x_F$.

Also preferably the prism means, at least in a region where the light crosses the fibers, has a numerical aperture that does not exceed about one-half. The significance of this value and of Eq. 4 will be clear from detailed discussion later in this document.

In addition it is preferred that the prism means include at least two separately fabricated optical elements secured together along a partially reflecting interface: a first one of the elements preferably includes a fiber-optic prism that includes the first end and that is crossed by the light from the projecting means. A second one of the elements preferably comprises a fiber-optic taper that includes the second end.

In this last-mentioned case, more specifically it is preferred that the fiber-optic taper include extramural-absorption material, and have a numerical aperture greater than one-half—but that the prism have a numerical aperture not exceeding one-half, as above.

(ii) One dark-field embodiment of the first aspect—Now turning to a second preferred embodiment of the first aspect of the invention, that embodiment is a dark-field FTIR apparatus in which the projecting means comprise means for projecting light to enter individual fibers, through their respective side walls, immediately adjacent to their respective terminations at the first end.

In this case, however, each termination at the first end is oriented, relative to the projected light and also relative to a longitudinal direction of its fiber, so that the light at that termination is:

reflected at that termination out of its fiber, if the relieved surface is out of contact with that termination; and fractionally scattered by the relieved surface into and along its fiber toward the electrooptical means, if the relieved surface is in contact with the fiber termination.

These are the geometrical conditions for dark-field detection, and are the converse of the bright-field conditions described above for the first embodiment.

In this second embodiment—still referring to the first "aspect" of the invention—as in the first embodiment it is preferable that the critical angle be roughly forty degrees. Here, however, it is also preferred that the first end of the prism means lie at an inclination angle of roughly ninety degrees to the central axis.

It is further preferable that the light from the light-receiving face of the prism means be incident at an angle greater than roughly forty-five degrees to the central axis, but less than the first-end inclination angle. (For effective FTIR operation the angle of incidence relative to the axis should be, as noted earlier, less than the value of the critical angle against skin.)

In this second embodiment it is preferable that the prism-means numerical aperture be small enough that projected light which crosses the entire prism means have at least roughly one tenth the entering intensity, at least in a region adjacent to the first end. Also applicable to this second embodiment are the preferred relation set forth in Eq. 4, the maximum numerical-aperture value of one-half, and the two-element construction mentioned above for the first embodiment.

Especially preferable in use of this second embodiment is an opposed illumination system. In this case the projecting means comprise at least two generally opposed light sources for projecting light from opposite sides of the prism means.

Each of these opposed sources satisfies the condition, stated earlier for the general case of the first aspect of the invention, that the light crosses the fibers where fiber diameter is substantially constant with respect to longitudinal position, and enters individual fibers through side walls of the fibers, for illuminating the first-end terminations.

In this system light from the projecting means enters the prism means at each side with a respective initial intensity, and some of this projected light from each side crosses the entire prism means.

At least where the light crosses the fibers, preferably the prism-means numerical aperture is small enough that projected light which crosses the entire prism means, from each side, has at least one hundredth of the respective initial intensity.

Alternatively, at least in a region where the light crosses the fibers, the numerical aperture satisfies a modified form of Eq. (4), $$NA \leq 2n_{avg}(D/x_M)^{1/4}, \quad \text{(Eq. 5)}$$

where $x_M$=illumination-path distance across the prism means to the prism midplane, in the same region.

Use of such an opposed-lighting second embodiment, with the same overall lamp power as in a unidirectionally lit first embodiment, favorably reduces variation of lighting intensity across the fingerprint. (Merely as an example, at NA=0.35 the variation across a 17½ mm prism may fall from a factor of about 2.3, for unidirectional lighting, to about 1.4—which is to say, from about ±40% to about ±15% of a median value. Even under unidirectional lighting, however, using the present invention the intensity variation is within a range that is readily minimized by other means as will be shown.)

Applying Eqs. 4 and 5, approximations to the illumination distribution across the prism means can be easily calculated for various illumination geometries, prism widths and numerical-aperture values. Representative results appear in the Detailed Description section.

Generally in this dark-field embodiment of the first aspect of the invention it is highly preferable that the prism means comprise a section having extramural-absorption material. Such a section should be placed between (1) a region where the light crosses the fibers and (2) the electrooptical means.

It is further preferable that this EMA-material section have a numerical aperture which is substantially the same as numerical aperture of the region where the light crosses the fibers. These EMA-section preferences relate to control of a form of stray light that is peculiar to this embodiment of the invention, and will be detailed later in this document.

(iii) Another dark-field embodiment of the first aspect— Now a third preferred embodiment of the first aspect of the invention is a dark-field FTIR apparatus in which the prism means include at least two separately fabricated fiber-optic optical elements secured together along a partially reflecting interface. A first one of these elements includes a prism that in turn includes the first end, and that is crossed by the light from the projecting means; and a second one of the elements includes the second end.

In this embodiment the projecting means comprise means for projecting light into the prism to enter individual fibers, through their respective side walls, immediately adjacent to the partially reflecting interface. This interface is not at the finger-contacting terminations, but rather at the opposite end of the prism.

The partially reflecting interface does, however, redirect some of the light from the projecting means to pass along the individual fibers within the prism toward their respective terminations at the first end. Upon reaching each termination at the first end, this redirected light is reflected by the termination out of the corresponding fiber, if the relieved surface is out of contact with that termination; and fractionally scattered by the relieved surface back into the first prism and along the corresponding fiber, if the relieved surface is in contact with that fiber termination.

Once again the conditions described are a form of dark-field geometry, but the illumination in this case is incident on the finger-contacting terminations by ducting along and within the fibers, rather than directly by crosslighting. The crosslighting remains an important part of this system, however, for initially injecting the illumination into the volume of the prism for redirection, by the internal reflector, into the fibers.

As to the light which is fractionally scattered from the finger-contacting surface back into and along the corresponding fiber: this light passes fractionally through the partially reflecting interface and the second element to the electrooptical means.

This dual-optical-element embodiment using an internal reflector, like the other embodiments discussed above, resolves very elegantly the problems of the prior art. Nevertheless it is preferably practiced in a way that further optimizes its performance.

It is advantageous, though not necessary, that the second element include a fiber-optic taper—preferably with EMA material, and preferably with numerical aperture greater than one-half—but yet that the prism have numerical aperture not exceeding one-half. Other preferences as to use of a taper, in other embodiments of the first aspect of the invention as well as this embodiment, are taken up in the next subsection.

(iv) General preferences as to the first aspect of the invention—All three embodiments described above can reliably and efficiently provide high-signal-to-noise, essentially binary FTIR data and thereby resolve important problems unad-dressed by the prior art. Nonetheless it is preferred that the invention be practiced in conjunction with still other features and characteristics which enhance its benefits and confer still other advantages:

Tapered fibers—It is advantageous that the second end of the prism means be different in cross-section from the first end, and that the fibers be tapered to different cross-sections at the second end from that at the first end. By means of this arrangement the first end of the prism means is sized for contact with the surface (the finger or other subject relieved surface), and the second end is sized for contact with the electrooptical means.

This preferred system is particularly helpful where the cost of electrooptical means—such as, for example, detector arrays—increases steeply with area. For this case the second end of the prism means is smaller in cross-section than the first, and the fibers are tapered to smaller cross-sections at the second end than at the first. Thereby the prism means demagnify the surface-relief scattering pattern for application to the electrooptical means. The side face has approximately the same, larger width as the cross-section of the first end of the prism means.

The fiber tapering in such a system ordinarily is localized to one (at least) segment of the prism means. In accordance with the general condition—stated above for the first aspect of the invention—that the light be injected at a point where fiber diameter is constant with longitudinal position, the projecting means here direct light into a segment of the prism means other than that one segment.

When design is not sensitive to electrooptical-means cost, the space and weight which are required by a taper can be saved; all three above-described embodiments of the invention are amenable to this arrangement. In this regard, the internal-reflector form of the invention is not limited to use with tapers, but rather can be practiced with an additional short straight fiber-prism segment on the electroopticalmeans side of the reflector.

Low numerical aperture—In the general unidirectionallighting case it is also preferable that the prism-means numerical aperture, at least in a region between the end face and side face, be small enough that projected light which crosses the entire prism means have at least roughly one tenth of the initial intensity. Alternatively the condition of Eq. 4 may be applied. These relationships may be expected to define the limit or margin of advisable or sound operation; they correspond to injection of illumination to a depth of roughly two attenuation lengths.

For operation more solidly within a reliable and easily engineered manner, with ample illumination but betterconstrained lamp power, preferably the prism-means numerical aperture is small enough that projected light which crosses the entire prism means have at least roughly three-eighths of the initial intensity. Alternatively the numerical aperture satisfies this condition:

$$NA \leq 2n_{avg}(D/2x_F)^{1/4}, \quad (Eq. 6)$$

where the variables are defined as in Eq. 4. Both alternative statements, appearing in this paragraph, of preferable relationships correspond to injection of illumination to a depth of roughly one attenuation length.

Finger stabilization—In addition it is beneficial for full enjoyment of the advantages of the invention to include some means for stabilizing the human subject's finger against the first end of the prism means. Preferably these stabilizing means include a handgrip for firm grasping by the human subject's hand—in such a way that this firm grasping braces a particular finger against the first end of the prism means.

For best stabilization it is preferred, because of the mechanics of the human hand, that the particular finger be the subject's thumb. Of course different stabilizing geometry can be used to accommodate other fingers when appropriate—as for example if the prospective user has no thumb.

Preferably the stabilizing means include some means for orienting the finger on the first end of the prism means within a relatively narrow range of finger positions. For this purpose it is preferred that the handgrip include some means for orienting the hand, in relation to the first end of the prism means, within a relatively narrow range of hand positions.

By virtue of this arrangement, orientation of the hand by the handgrip inherently constrains the orientation of the finger, on the first end of the prism means, within the relatively narrow range of finger positions. This orientation of the hand and finger in turn also inherently tends to constrain each user to exercise a relatively consistent degree of pressure or firmness in applying the finger (thumb) to the prism surface.

Even a modest constraint of finger orientation and firmness in this fashion can produce important advances in data-processing time or certainty of identity confirmation, or both. Thus the invention resolves ambiguities left unaddressed by Shaw as to fingerprint control of weapons in particular, and not adequately addressed heretofore in the fingerprint field generally.

Processing of received light—Other very important groups of preferences in use of the above-described invention relate to use of the light that is collected at the second end of the prism means. As mentioned earlier the present invention is amenable to use with the electrooptical means comprising an optical-detector array, leading to electronic processing of the image acquired as an array of pixels.

In fact the invention represents a major advance in such detector-array systems, since it permits affixing of the array directly to the second end of the prism means successfully—that is to say, with full realization of near-binary FTIR performance, and without degradation of optical efficiency or signal-to-noise relations such as seen in the prior art.

Thus in a preferred form of the invention the electrooptical means include an electrooptical detector array. The array receives, at the second end of the prism means, the light fractionally directed into the fibers at the first end.

In response the detector array provides a corresponding array of electrical signals, which are characteristic of the surface relief. In this case the previously mentioned "electrical signal which is characteristic of the surface relief" encompasses the array of electrical signals introduced here.

Processing of resulting electrical signals—In this case preferably the electrooptical means include some means for comparison of the electrical-signal array with data for a particular specified relieved surface—a master or reference fingerprint etc. for comparison. These comparison means generate at least one comparison-result signal which is characteristic of the results of the comparison; and the previously mentioned signal which is characteristic of the relieved surface under test further includes this comparisonresult signal.

When the system is to use known minutiae data for the particular specified relieved surface, the means for comparison include some means for deriving new minutiae data, for the relieved surface under test, from the first-mentioned electrical-signal array. The means for comparison also include some means for evaluating the new minutiae data—relative to the minutiae data for the particular specified relieved surface. Both the minutiae-deriving and the minutiae-evaluating means are electronic processor means.

Preferably the deriving means comprise some means for preprocessing the electrical-signal array to obtain a direction map which is characteristic of such relieved surface. For breadth and generality again, these means will be called the "preprocessing means".

The preprocessing means preferably include some means for applying a filtering algorithm to the electrical-signal array, to create the direction map. For this algorithm it is preferred to use fast Fourier transform detection, or a mean-gradient filter, or a projective Radon transform; most highly preferred is the mean-gradient filter.

In addition, preferably the deriving means comprise means for applying a tuned filter, oriented in accordance with the direction map, to the electrical-signal array to obtain a filtered image. In essence such a filter can make use of already known information about fingerprints—such as the typical range of their spacing, for example—to remove image noise and so enhance the ridge-and-groove patterns.

The deriving means preferably further include means for enhancing binary character of the filtered image. Typically these provide some form of thresholding, but other techniques are equivalent.

It is preferable that in addition the deriving means include means for applying a center and an axis of the direction map to determine coordinates of the relieved-surface details. Advantageously the deriving means also include some means for using the axis of the relieved surface to control the means for comparison—in particular to restrain the influence, upon fingerprint properties that should be topologically invariant and so upon identity-verification results, of grip-induced distortion of the finger as it engages the image-acquisition surface.

(b) Second through Fifth Aspects of the Invention

All of the foregoing summary of the invention has been presented in terms of the first main facet or aspect of the invention. In a second such facet, the invention is related to the first—but this form of the invention is not necessarily limited to injection of light into a region where fiber diameter is substantially constant along the fibers.

In this second aspect of the invention, however, the numerical aperture is constrained to not exceed the value found from Eq. 4 or Eq. 5—depending on whether illumination is projected through one side face or more than one.

In a third of its facets or aspects, the invention is related to the second aspect—but the numerical aperture, rather than being defined by Eq. 4 or 5, does not exceed one-half.

In a fourth of its facets or aspects, the invention is related to the second aspect—but the numerical aperture, rather than being defined by Eq. 4 or 5, is defined more stringently by Eq. 6—which is similar to Eq. 4 but has an inserted factor of 2 in the denominator of the fourth-rooted function—or by Eq. 5 with a factor of 2 similarly inserted.

In a fifth of its facets or aspects, the invention is related to the third aspect, but the numerical aperture is defined more stringently as not exceeding 0.42.

(c) A Sixth Aspect of the Invention

In a sixth of its facets or aspects, the invention is apparatus for acquiring surface-relief data from a relieved surface such as a finger.

The apparatus includes a prism which is formed from a bundle of optical fibers. This prism in turn includes:

an optical data-input end for contact with the relieved surface at the fiber terminations,
at least one side face for receiving light into the prism means, and
a partially reflecting surface for redirecting light received through the side face to illuminate the data-input end.

The optical data-input end includes terminations of fibers of the bundle. The redirected light illuminates these fiber terminations at the data-input end.

In addition the apparatus includes some means for receiving light that passes through the partially reflecting surface from the illuminated fiber terminations, and in response providing at least one signal which is characteristic of the surface relief.

The foregoing may represent a description or definition of the sixth aspect of the invention in its broadest or most general terms. Even as so couched, however, this sixth aspect of the invention resolves the problems of the prior art, by providing a simple and elegant light-injection system that illuminates a finger applied to a fiber-optic prism—without any of the marginal operation or related deficiencies of the prior art.

Nevertheless to optimize its performance this sixth aspect of the invention is preferably practiced in conjunction with certain advantageous characteristics or features.

(i) Light-projecting means—For example it is preferred that the apparatus further include some means for projecting light into the light-receiving face of the prism.

These "light-projecting means" function so that the light crosses part of the bundle to enter individual fibers, through their respective side walls immediately adjacent to the partially reflecting surface. The light so entering the fibers is partially redirected by that surface toward the data-input end of the prism, for illuminating the terminations at the data-input end of the prism.

(ii) Return of relieved-surface scattered light through the partial reflector—Another preference is that light reaching each data-input-end termination, depending on contact between that termination and such relieved surface, can be at least fractionally passed from that termination back into and along the corresponding fiber.

This light, fractionally passed back into and along the corresponding fiber, in turn passes fractionally through the partially reflecting interface and the second optical element to the light-receiving means.

(iii) Second optical element—In this preferred case the apparatus also includes an optical element formed from another bundle of optical fibers, secured to the prism along the partially reflecting surface and including an optical data-output end for passage of light traveling along the fibers from the data-input end and through the partially reflecting interface to the light-receiving means.

Such a second element, interposed between the partial reflector and the light-receiving means, simplifies isolation of the light receiver from the light being injected by reflection at the partial reflector. The partial reflector is used in two stages of the apparatus operation—injection, and backscatter return to the receiver—and those skilled in the art will appreciate the potential for crosstalk, particularly leakage of the injection light to the receiver thus bypassing the data-input end of the prism.

The second element, however, at least in principle is not strictly necessary as crosstalk may perhaps be avoided through other techniques such as polarization control of the injected light and just behind the partial reflector. If so, then the receiver could be applied directly to the back of the latter polarization-control point.

(d) A Seventh Aspect of the Invention

In a seventh aspect or facet, the invention is apparatus for acquiring and using surface-relief data, from a relieved surface such as a finger, for controlling access to facilities, equipment, a financial service or information.

This apparatus includes in its entirety the first aspect of the invention—in other words, the above-discussed apparatus for acquiring surface-relief data from a relieved surface such as a finger. Here, however, the electrooptical means have enlarged functions.

In this case they not only receive at the second end of the prism means the light fractionally directed into the fibers at the first end, and process the received light to determine identity of the relieved surface, but in addition the electrooptical means apply the determined identity to control access to the facilities, equipment, financial service or information.

(e) An Eighth Aspect of the Invention

In still an eighth of its major aspects, the invention is a secured system subject to access control based upon surface-relief data from a relieved surface such as a finger.

This system includes utilization means, susceptible to misuse in the absence of a particular relieved surface that is related to an authorized user. These utilization means are a facility, an apparatus, some means for providing a financial service, or some means for providing information.

In addition this system of the eighth aspect of the invention includes in its entirety the data-acquiring-and-using apparatus according to the seventh aspect of the invention, as set forth just above. Here the electrooptical means apply the determined identity to control access to the utilization means which are part of this system.

(f) A Ninth Aspect of the Invention

In yet a ninth of its major aspects the invention is a personal weapon, subject to access control based upon surface-relief data from a human user's finger. The weapon may be a common firearm that includes means for discharging a bullet—which bullet requires an enabling impact for detonation. Upon detonation of course a bullet flies to a target, transmitting energy to the target and thereby typically kills, disables, stuns, wounds, frightens, or otherwise influences an adversary.

More generally the weapon does not necessarily fire bullets, but includes some means for discharging some energy-transmitting agency to influence an adversary. The agency-discharging means require enablement for their operation.

As will be understood this agency may take any of a very great variety of forms, including but by no means limited to a laser beam, electrically charged barb, poison-carrying dart (in addition to the momentum-associated energy needed for injection, poison for present purposes may be taken as representing a form of chemical energy), grenade, gas canister, soft block for crowd-control purposes, and so forth.

In addition the weapon of this ninth aspect of the invention includes in its entirety the data-acquiring-and-using apparatus according to the seventh aspect of the invention, as described earlier. Here the electrooptical means apply the determined identity to control enablement of the agency-discharging means.

The foregoing may be a description or definition of the ninth aspect of the present invention in its most general or broad terms. Even in such broad general form, however, as can now be seen the invention resolves previously outlined problems of the prior art.

In particular the invention as thus broadly couched provides a practical, operable, and reliable means of ensuring that a personal weapon can be available for use by an authorized user exclusively.

Although the invention thus provides very significant advances relative to the prior art, nevertheless for greatest enjoyment of the benefits of the invention it is preferably practiced in conjunction with certain other features or characteristics which enhance its benefits.

(i) Finger bracing—For example, it is preferred that the weapon further include a handgrip for firm grasping by the human subject's hand to support the weapon. In this case a particular finger is braced against the first end of the prism means by the firm grasping; further preferences in this regard have been described above in connection with the first aspect of the invention.

(ii) Unitary module—Another preference is that at least a part of the discharging means and at least a part of the electronic means be physically formed together as a substantially unitary electronic module. Although of course no such module can absolutely prevent corruption or other circumvention of a security system by a determined and skillful technician, formation of key components in unitary form does deter unauthorized bypassing of the fingerprint-data access control.

For this purpose preferably the substantially unitary electronic module includes a unitary integrated-circuit chip carrying both a part of the discharging means and a part of the electronic means. Manufacture of integrated circuits at present requires relatively very expensive equipment that is accordingly available in only a relatively small number of facilities.

This intrinsic hedge against high-technology manufacturers may be enhanced by deliberate design of the module to require the most advanced and costly equipment. For example the chip and its available space may be designed to require the highest degree of available microminiaturization, advantageously in conjunction with extraordinary operating speed or other technology-pushing demands.

Preferably too the module includes a shape that matches and is required by an electronic-module receptacle of the weapon. This shape includes electrodes for contacting elements of the weapon to effect the discharging; and preferably this shape includes complicated contours to discourage the great majority of would-be tamperers.

(iii) Controlled-impulse discharge—Moreover it is preferable that the "at least a part" of the discharging means include some means for providing a-specifically controlled electrical impulse to effect the discharging. Accordingly the energy-discharging agency is manufactured to respond exclusively to the specifically controlled electrical impulse.

Special attention should be devoted to defeating efforts to bypass the access-control system in the case of relatively conventional energy-discharging means such as bullets, because bullets carry within themselves the means for their own propulsion. A hammer detonator, in the weapon, controlled by an optoelectronic module is vulnerable to bypass of the electronics, unless special measures are taken.

Accordingly it is preferable to provide a bullet having therein a charge of explosive powder and an electrical detonator to ignite the explosive charge. The detonator in each bullet is manufactured to respond exclusively to the specifically controlled electrical impulse—which is to say, the detonator is manufactured so as isolate the charge against other impulses, including for example a relatively high voltage applied willy-nilly in an attempt to fire the weapon.

Preferably the detonator is manufactured to respond exclusively to an electrical impulse whose duration or voltage is in a relatively narrow range, or having a particular waveform—or preferably to an impulse characterized by all three of these control parameters.

(g) A Tenth Aspect of the Invention

In a tenth of its major aspects or facets, the invention is a personal weapon subject to access control based upon surface-relief data from a human user's finger. The weapon includes some means for discharging an energy-transmitting agency to influence an adversary. The agency-discharging means require enablement for their operation.

The weapon also includes some means for developing an electronic signal representing a determination of whether a human user's fingerprint data which are presented to the weapon are a particular authorized user's fingerprint data, and for applying the electronic signal to control enablement of the agency-discharging means.

At least a part of the discharging means and at least a part of the developing-and-applying means are physically formed together as a substantially unitary electronic module to deter unauthorized bypassing of the fingerprint-data enablement control.

Refinements as discussed above for the ninth aspect of the invention are applicable here as well.

(h) An Eleventh Aspect of the Invention

In an eleventh major facet or aspect, the invention is a personal weapon subject to access control based upon surface-relief data from a human user's finger. The weapon includes means for discharging an energy-transmitting agency to influence an adversary.

In this aspect of the invention, the agency-discharging means are manufactured to respond exclusively to a specifically controlled electrical impulse. The weapon also includes some means for developing an electronic signal representing a determination of whether a human user's fingerprint data which are presented to the weapon are a particular authorized user's fingerprint data—and for also applying the electronic signal to control enablement of the agency-discharging means.

The discharging means include means for providing a specifically controlled electrical impulse to actuate the energy-transmitting agency. In one preferred form of the invention, the energy-discharging agency is a bullet having therein a charge of explosive powder and an electrical detonator to ignite the explosive charge; and the detonator is manufactured to respond exclusively to the specifically controlled electrical impulse.

Preferred characteristics for such an impulse have been set forth earlier. The developing-and-applying means preferably include a crosslit optic-fiber prism with numerical aperture not exceeding one-half, for collecting fingerprint data by frustrated total internal reflection.

(i) A Twelfth Aspect of the Invention

In a twelfth major facet or aspect as in the eleventh, the invention is a personal weapon subject to access control based upon surface-relief data from a human user's finger and the weapon includes means for discharging an energy-transmitting agency to influence an adversary.

Also as in the preceding aspect the weapon includes some means for developing an electronic signal representing a determination of whether a human user's fingerprint data which are presented to the weapon are a particular authorized user's fingerprint data—and for also applying the electronic signal to control enablement of the agency-discharging means.

This twelfth aspect of the invention also includes some means providing entry to working parts of the weapon; and second means for applying the electronic signal to control enablement of these entry-providing means. In addition the weapon in this case includes some means for determining when entry to working parts of the weapon is gained without operation of the second means.

This aspect of the invention further has some means for substantially permanently disabling the weapon when entry to working parts of the weapon is gained without operation of the second means. These disabling means are responsive to the entry-determining means.

All of the foregoing operational principles and advantages of the present invention will be more fully appreciated upon consideration of the following detailed description, with reference to the appended drawings, of which:

BRIEF DESCRIPTION OF THE DRAWINGS

FIG. 1 is a generalized block diagram of a preferred embodiment of the invention, also showing in a general way the operation of a representative fiber prism;

FIG. 2 is an isometric or perspective drawing of the FIG. 1 prism;

FIG. 3 is a diagram, showing very fine detail but not to scale, representing the process of fiber-prism crosslighting in cross-section—the plane of the drawing being normal to the fiber axes and thus the prism axis;

FIG. 4 is a like diagram in axial section, aligned on the page with FIG. 3 for coordinated discussion;

FIGS. 5, 8 and 11, which relate to three different crosslit fiber-prism configurations, are drawn with a common orientation and size of the receiving surface—and with a common orientation and size of a representative thumb or other relieved surface—to show on a fair comparative basis the commonality between the three configurations and in particular to show that the main difference between them is in orientation of the fibers in the prism means.

FIGS. 6, 7, 9, 10, 13 and 14 relate to six different forms of the above-mentioned three crosslit fiber-prism configurations, and are drawn with the finger-receiving surface at a common orientation and size—particularly to show on a comparative basis how the illumination path lengths turn out (somewhat coincidentally) to be the same in all six configurations; and also to show the significant differences in overall system size;

FIG. 5 is a diagram, like FIG. 4, of bright-field FTIR image generation in a preferred embodiment with a crosslit fiber prism;

FIG. 6 is a diagram, not to scale, of a bright-field FTIR fiber-prism optical module that is a preferred embodiment for implementing the FIG. 5 process;

FIG. 7 is a like diagram of a preferred embodiment that is a similar optical module but with a taper;

FIG. 8 is a diagram like FIGS. 4 and 5, but showing dark-field FTIR image generation in a preferred embodiment with a crosslit fiber prism;

FIG. 9 is a diagram like FIG. 6, but showing a dark-field module with a rectangular prism, another preferred embodiment for implementing the FIG. 8 process;

FIG. 10 is a like diagram of a preferred embodiment that is a similar optical module but with a taper;

FIG. 11 is a diagram like FIGS. 3 through 5, and FIG. 8, but showing dark-field image generation in a preferred embodiment with axial lighting at the subject;

FIG. 12 is a like diagram showing a crosslit intermediate reflector that is a preferred embodiment for use in conjunction with the FIG. 11 system;

FIG. 13 is a diagram like FIGS. 6 and 9, but showing a dark-field module with intermediate reflector, another preferred embodiment for implementing the processes of FIGS. 10 and 11;

FIG. 14 is a like diagram of a preferred embodiment that is a similar optical module but with a taper;

FIG. 15 is a left elevation of a personal weapon according to a preferred embodiment of the invention, with portions of the case drawn broken away to show schematically the internal mechanical layout, and exemplarily having a taper and a detector array as in FIG. 7;

FIG. 16 is a rear elevation of a variant of the FIG. 15 embodiment, mostly in section taken along the line 16—16 of FIG. 15;

FIG. 19 is a partial mechanical layout, showing very schematically a preferred embodiment that is an alternative for a portion of the FIG. 15 mechanical layout, this alternative having a unitary processor/actuator module;

FIG. 20 is a partial block diagram like portions of FIG. 1 but including a variant of construction that corresponds to the FIG. 19 alternative;

FIG. 21 is a very schematic elevation of a unitary data-processor and projectile-actuator module that is a preferred embodiment particularly for the weapon of FIG. 15 as modified by FIGS. 19 and 20;

FIG. 22 is a very schematic longitudinal section of a projectile device, with integral detonator, that is a preferred embodiment for use with the weapon of FIGS. 19 through 21;

DETAILED DESCRIPTION OF THE PREFERRED EMBODIMENTS

Figure 11:
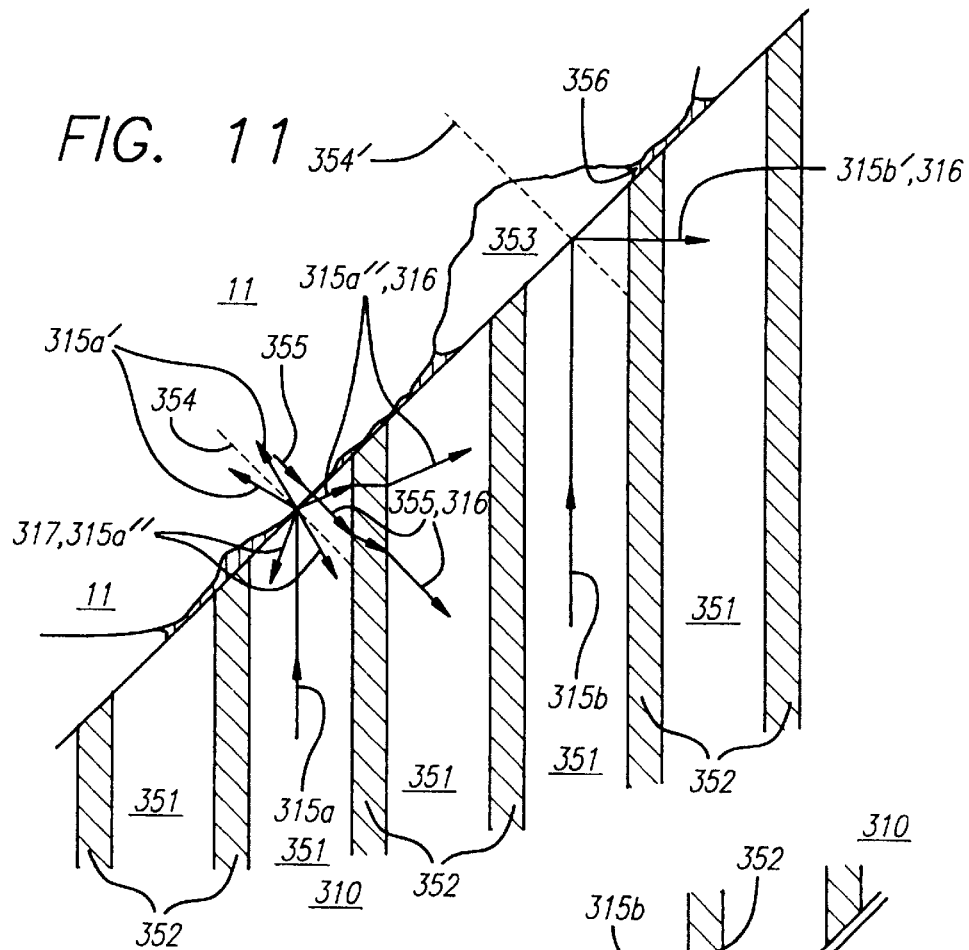

1. OVERALL SYSTEM (a) Relieved-surface Image Acquisition and Verification for Security As shown in FIG. 1, preferred forms of the invention include a fiber-optic prism 10 for contact with a relieved surface such as a finger 11, to provide an image of its relieved surface (also designated 11) to electrooptical means 20. In this form of the invention the previously mentioned "prism means" comprise a unitary prism 10 as shown.

The electrooptical means 20 actuate access-control means 30, to either enable operation of utilization means 40 if appropriate authorization is embodied in the received image, or maintain the utilization means disabled otherwise. For reasons explained in section 4(a) below, the apparatus preferably accommodates collection of surface information from a thumb 11, although in principle other fingers can be used instead.

The prism 10 includes a first end 1 for contacting the thumb 11, and second end 2 for transferring the image to the electrooptical means. The prism 10 also includes a side face 3 for receiving light, preferably infrared light, to illuminate the thumb 11; the width dimension of this side face 3 runs in and out of the FIG. 1 plane, but appears in FIG. 2.

For optimum operation, as suggested by FIG. 2, the width of the side face 3—that is, the distance $w_3$ in the drawing—is the same as the width $w_1$ of the first end 1. This condition departs from the geometry in Dowling. If preferred, in this and the other embodiments described below, the side face 3 can be made wider than the first end 1, but the extra width serves little purpose.

Associated with the prism 10 are a light source 4, and a fiber-optic spacer element or other diffuser 5 to somewhat equalize the illumination at the near and far sides of the prism 10. In the embodiment of FIG. 1, for reasons that will shortly appear, the spacer 5 should also be a polarization filter if the source 4 does not inherently provide polarized light.

Light rays 14 from the source 4 pass through the optional spacer 5 and cross varying fractions of the prism thickness, as shown, to reach the second end 2 of the prism. In so doing, the light must cross optical fibers 51, preferably fused, which make up the prism 10 and define the prism axis 8 (FIG. 2). The light 14 passes into the prism 10 at a steep angle—as understood from FIGS. 1 and 2 a right angle—to the axis 8.

Accordingly the light 14 is not ducted along the fibers 15 in reaching the second end 2 of the prism. In particular this light must cross through the side wall of each fiber to reach the termination of that fiber which contacts the second end 2.

Hatching used in the drawings to represent the fibers is only illustrative, since the fibers are essentially microscopic. They are preferably spaced at some one hundred or two hundred to the millimeter.

In the embodiment of FIG. 1, light reaching the second end 2 of the prism 10 encounters a partial reflector 6 that is formed on the end 2. The reflector 6 is in essence a half-silvered mirror, but the exact fractions of light which are reflected and transmitted are subject to design choice and not necessarily half.

A portion of the incoming light 14 reaching the reflector 6 is redirected to form rays 15 ducted along the fibers 15 toward the thumb 11. The remainder of the incoming light 14 passes through the partial reflector 6.

In the exemplary FIG. 1 embodiment, such light traversing the reflector 6 strikes a detector 7—part of the electrooptical means 20 mentioned above—held behind the reflector 6. For reasons that will become clear momentarily, stringent measures must be taken to minimize this effect.

The reflected and ducted rays 15 flood essentially all the fibers 51 of the prism, and with relatively uniform intensity, to illuminate terminations of the fibers 51 at the first end 1 of the prism 10 and so illuminate the thumbprint or other relieved surface 11. By virtue of FTIR relationships described earlier—and detailed in section 2(d) below—this illumination either is reflected (at thumbprint grooves) out of the prism as exit rays 16 or is transmitted through some of the fiber terminations into the relieved surface 11 (at thumbprint ridges).

The relieved surface 11, and the mass of living tissue (or other material) within or behind that surface, is slightly translucent and acts as a scattering medium—diffusing and redirecting the incident light 15 in all directions though not uniformly. A small fraction, perhaps on the order of one thirtieth, of the light fraction transmitted into this medium is partially scattered as rays 17 back into and along the same fibers 51 which brought the illumination 15.

The latter, backscattered light 17 thus exists only in certain fibers that are in effect selected by the geometry of the thumb or other relieved surface 11. These rays 17, and the pattern of their occurrence in some fibers 51 but not others, accordingly constitute the optical data or information signal which is collected from the thumb etc. 11.

Upon reaching (for the second time) the partial reflector 6, some of the light 17 passes through the reflector to reach the previously mentioned detector 7. Most of the remaining light (not shown) is wasted in reflection back toward the entry face 3.

Optical data 17 which reach the detector 7 cause the detector to generate corresponding electrical data signals 21, which are processed in later stages of the electrooptical means 20. The optical signals 17, backscattered from the thumb, as pointed out above are much weaker than the illumination 15 incident on the thumb—and weaker still than the previously mentioned light 14 first reaching the reflector 6 directly from the source 4.

Therefore the fraction of illumination light 14 which passes through the reflector 6 and reaches the detector 7 can readily overwhelm the fraction of the optical data 17 which likewise passes through the reflector 6 to the detector 7. It is for this reason that measures are required to minimize such direct passage of initial illumination 14 to the detector 7.

These measures preferably include orienting the polarization filter 5 to substantially exclude from the system light 14 that cannot be reflected toward the thumb 11, and providing another polarization filter (not shown) between the reflector 6 and detector 7. This concern is peculiar to embodiments in which a detector is close behind the reflector 6—namely, the FIG. 1 embodiment and a variant form of the FIG. 14 embodiment, discussed in section 2(d) below.

Advantageously a multilayer interference coating of dielectric materials can be substituted for the partial reflector 6 and second polarization filter (not shown) discussed above. Such an interference coating is particularly effective in reflecting light that is polarized in one orientation but rejecting light polarized at right angles to that orientation.

For this purpose, known systems for controlling the light that passes through a 45° prism in a polarizing beam splitter are suitable for use with the fiber-optic prisms of the present invention. Generally such a system takes the form of a quarter-wave resonant reflective multilayer dielectric stack, which can be coated on the 45° face of a fiber-optic prism. This sort of system is designed for use with monochromatic (or, more precisely, narrow-spectral-band) light, such as radiates from the diode illuminators preferred for the present invention.

Because the diffusion of the light passing normal to the fiber axes is in a plane normal to the fibers, and there is no or little scattering into other oblique planes, polarization parallel to the fibers is preserved. Unfortunately in this orientation the "p" wave is transmitted.

In the other orientation the "s" wave in commercially available films is 98% reflected if it has not been greatly dispersed, and less so if the direction of the ray is not in the direction of the initial collimation. The leakage of the illuminating beam into the detector will then exceed two percent—roughly equal to the light (of the opposite polarization) that is scattered back from the contacting ridges, collected by the fibers and transmitted through the polarizing films.

Higher contrast will require the use of further polarizing films, or an offset fiber-optic plate with EMA as shown in FIG. 14 to separate the components by direction as well as polarization.

Within the electrooptical means 20, electrical signals 21 proceed to comparison means 22, which preferably take the form of a programmed digital processor. The comparison means accordingly comprise means for performing the various comparison functions, and these function-performing means are themselves modules of the program, with corresponding physical portions of the processor that execute the program modules.

Major modules of the electrooptical means as shown include:

new-minutiae deriving means 23, which analyze the electrical signals 21 to determine and transmit minutiae 24 (but in a topologically near-invariant form, as will be detailed in subsection 5 of this Detailed Description) for the subject thumb 11;

storage 25 and supply 26 of reference minutiae for the thumb of a person who is authorized to have access to the utilization means 40 (and, if desired, specific people who are to be denied access); and evaluating means 27 for comparison of the newly derived minutiae 24 against the reference minutiae 26 to generate a "go/no-go" output signal 28 or, if it is preferred, a more-elaborate actuating output signal 28, to an access-control device 30.

The latter device 30 generates a control signal 31 which is of suitable physical character for enabling operation of the utilization means 40. For example, for some applications a mechanical signal 31 may be required.

(b) Applications of the System

The utilization-means block 40 represents any of a wide variety of applications of an access-control signal 31 such as the present invention generates. One focus of the present document is upon use of the invention in, or as, a personal weapon; however, the invention is equally applicable to other apparatus, facilities, financial services and information services.

The invention is particularly suited to field applications that are extremely demanding in terms of overall microminiaturization and low weight, very short decision time with very high certainty and reliability, and low power. Personal weaponry is an application which is particularly sensitive to several of these criteria, but close behind are other portable personal devices such as cellular phones and so-called "notebook" computers.

Use of the invention to control access to public phones, automatic teller machines, and vehicle-usage access—even though much less critical in terms of weight and power—all benefit significantly from the amenability of the present invention to miniaturization without compromise of decision time, certainty, and reliability. In some uses, such as telephonic and in-person credit systems, the apparatus of the present invention does not necessarily actuate a device to automatically grant e. g. credit, but can instead provide a visible, audible etc. signal to a human operator who then actuates any necessary devices.

Any or all of these means for utilizing the access-control signal 31 of the present invention are represented by the utilization means 40.

2. OPTICS (a) Crosslighting an FTIR Fiber Prism

A mechanism for cross-fiber transmission and cylindrical diffusion is not generally recognized. FIGS. 3 and 4 illustrate the basis of the effect, showing the elements in a fused-fiber-optic material highly magnified.

The drawings show a few relatively high-index fibers 51—or fiber cores—in a lower-index-matrix medium. Such a medium is the result of fusing a bundle of clad optical fibers, in which the fiber cores 51 have higher index than the cladding.

The cladding has merged together to form the matrix 52, leaving only the original cores 51 to distinguish the positions of the original fibers. In such fused plates of the material, the periodicity D of the structure is typically six to eight micrometers—just slightly less than the full diameter of the original fibers, as a small amount of the original diameter has gone into filling the hexagonal-closest-packing gaps between fibers. This document uses the word "fibers" in referring to the original cores in this fused structure as it will be understood that they are all that remains, in discrete form, of the original fibers.

FIGS. 3 and 4 show light rays 14a–d traversing the material. With respect to the radial plane of FIG. 3 (normal to the fiber/prism axis), the rays passing through the material are refracted by the fibers 51, focusing and defocusing as they pass from one fiber to another. Because the indices are different at each interface there arise a very small fraction of reflected rays 14a', 14b', 14d' etc. which tend to be diffusive—but only as seen in the normal plane of FIG. 3. As will be seen in the following description, the very small fraction so reflected depends upon the ratio of refractive indices across each boundary.

In the axial plane of FIG. 4 the rays are not so deflected and diffused but instead preserve their angle of rise or descent, through both backward-directed reflections 14a', 14b', 14d' and forward reflections 14d". Thus the effect is of a diffusion-like spread primarily in one plane and angular preservation in the other.

As an example, consider a very wide slab of material with cylindrical fibers, and a plane-wave input 14a as described above and with a given polarization relative to the fiber axes.

The wave 14a would produce at the initially struck fiber a partially reflected ray 14a' at twice the initial angle θ, i.e. 2θ, relative to the wave initial direction—and a partially refracted ray at an angle θ which can be found from the initial angle θ using Snell's Law. The initial angle θ can be expressed in terms of the incidence height h and fiber radius d/2 (the diameter d is slightly smaller than the periodicity D) as arctan (2h/d).

Some simple observations about propagation within this structure can be made—using the entry height h and angle θ of a ray 14a relative to an initially encountered fiber. If the angle θ of incidence exceeds 45°, the resulting fraction of light is directed forward—that is, toward the right in FIGS. 3 and 4.

This 45° condition holds only for heights h in the range ±½d sin (45°), which is to say approximately ±0.7d. At the outset, then, the component returned rearward in the very first reflection 14a" arises from roughly only seventy percent of the total structure (assuming for the moment that the fibers are closely spaced in the matrix, so that the periodicity D is roughly equal to the fiber diameter d). Therefore this rearward-returned component arises from only about that same percentage, roughly seventy percent, of the total light flux.

Almost all of even this seventy percent, moreover, is refracted forward—the exact fraction depending upon the angle θ of incidence relative to the normal 9, as is well known, and thus upon the offset h of the point of incidence from the fiber center 57. Near the centerline most of the light passes into the fiber and forward.

These initial results may be seen as encouraging, since they suggest that transmitting light across a fiber prism is the general condition and may not be a hopeless task: much more than thirty percent, in fact almost all, of the light will pass forward through the first row of fibers. On the other hand, it is important to recognize that this is only the first in a monumentally large number of interface events.

The small amounts reflected backward cumulate quickly, and complicating effects rapidly set in: focusing effects change the angles, as is seen by the continuation of the traced waves 14a, 14b through the material and into the next fiber cores.

In the resulting continuation paths, as suggested in FIG. 3 the rays may go through upward or downward excursions, or both, and depending upon numerical aperture may have a rough forward course as a result. From study of such drawings it can be gleaned that the beam undergoes a slow continuous expansion in the plane of FIG. 3 and the light diffusion slowly tends to become isotropic in the plane.

Ultimately edge conditions define much of the effects of the diffusion, and a rigorous ray trace through the forest of fibers is required to make an accurate evaluation. Regularity of the fiber structure can be assumed for purposes of such calculation, although this condition is not met in actual practice.

Nevertheless such a calculation is quite extensive, and beyond the scope of this document; exact analysis of the behavior of an incident ray 14a is complicated. It requires taking into account the distance across the entire structure (from left to right with respect to FIGS. 3 and 4), the length of the entire structure (from top to bottom with respect to FIG. 4), and the entry position and orientation relative to the entire structure—as well as the diagrammed height h and angle θ of each ray 14a relative to an initially encountered fiber. Each reflection/refraction requires computation of not only directions but also fractions of the incident ray.

These fractions depend upon polarization as well as geometry, the reflectivities for different polarized components being given by:

$$R_{para} = \tan(\theta - \theta')/\tan(\theta + \theta')$$

$$R_{perp} = -\sin(\theta - \theta')/\sin(\theta + \theta'), \quad \text{(Eq. 7)}$$

in which θ as in the foregoing discussion is the angle of incidence and θ' the angle of refraction at the interfaces. Ordinarily θ≅θ' and the reflections are small.

To complete the analysis it is necessary to employ advanced mathematical techniques (ray traces, statistical analysis, and/or calculus) to evaluate the effects of these expressions over the entire wave propagating through the entire structure, to find the backward directed component for each reflection/refraction event.

Because forward and backward events act differently on light components having the parallel and perpendicular polarizations, the diffusion tends to become polarized. The complete analytical effort must also take into account the fact that in subsequent events what is back and what is forward is also hard to define—in view of the focal effects and changing angles already mentioned.

Such an effort is not needed for practice of the invention, and as noted above is beyond the scope of the present disclosure, whose purpose is to enable practice of the invention by technicians, programmers and others of like ordinary skill in the art. Considering all these complexities, careful application of a reasonable approximation is justifiable.

Such an approximation has been developed as part of the conception of the present invention, but it will be understood that the utility of the invention in no way depends upon the correctness or accuracy of this approximation. The model used to approximate crosslighting penetration is a one-dimensional model that ignores the cylindrical cross-section of the fiber (in effect, disregarding the off-center rays that are a considerable fraction of all rays, and that give rise to much of the complexity introduced above).

A simple expression for the loss at each such transition from fiber to fiber is the well known expression for reflection due to difference of refractive indices, at normal incidence:

$$r = (n_{core} - n_{cladding})^2 / (n_{core} + n_{cladding})^2. \quad \text{(Eq. 8)}$$

If the mean thickness or distance between interfaces is D/2, and the reflective loss is regarded as a fractional attenuation α per unit length, this attenuation α per unit length can be set equal to simply the reflection loss of Eq. 8 divided by that thickness D/2, $$\alpha = r/½D \text{ or } 2r/D. \quad \text{(Eq. 9)}$$

This expression can be used in turn as the basis for a model of the attenuation that is an exponential decay, $\exp(-x\alpha)$, where $\alpha$ is the same attenuation per unit length—often called an "attenuation coefficient".

(Once again the derivation of this expression requires advanced mathematics, but understanding and practice of the invention can proceed on the basis of the resulting expressions stated, without the intervening derivation step. For those who may be interested, however, the change in transmitted flux I is $dI/dx=-r/\frac{1}{2}D$; and integration of this expression yields the flux I as a function of x: $I=I_o e^{-x\alpha}$, or in somewhat more easily read notation $I=I_o \exp[-x\alpha]$, where $\alpha=2r/D$.)

Although this approximation ignores the cylindrical character of the fibers, and fails to take into account the secondary back-reflections of previously reflected light, it is reasonably accurate for on-center rays in one transition—and in particular is consistent with the observed effects of transmission through the fibers of the present invention.

Eq. 9 serves not to give an exact expression of the flux but better to describe the basis of the diffusion over a distance which is short in terms of the diffuse-transmission characteristics of the material—in particular, perhaps over a small range of about two attenuation lengths—after which the other influences become more important. Since the amount of back-reflection varies with depth of penetration, the true relation is probably not a simple exponential.

As an example, if only a tenth of the initial illumination entering side face 3 (FIG. 1) were to reach a given distance into the prism, then only one tenth of the flux propagating backward from this depth would actually directly leave the material. The other nine tenths would continue to be reflected about inside the prism, with some fraction leaving the material due to multiple effects, and the remainder only eventually dying away on account of the intrinsic optical absorption of the materials.

Consequently, until reaching a penetration depth from which the light cannot escape, a generally consistent exponential decrease is expected. From that depth forward into the prism, the rate of decrease may itself change—and the change in flux eventually depends more on intrinsic absorption of the glasses and the outward leakage from all the sides of the prism.

Eqs. 8 and 9 can be used to develop another simplified expression that shows how to optimize performance of a crosslit prism. Such an expression advantageously relates the refractive indices to the numerical aperture NA of the fiber bundle, using Eq. 2—rewritten thus:

$$(NA)^2 = (n_{core})^2 - (n_{cladding})^2 \quad \text{(Eq. 2')}$$
$$= (n_{core} - n_{cladding})(n_{core} + n_{cladding})$$
$$= (n_{core} - n_{cladding}) \cdot 2n_{avg.}$$

where $n_{avg.}$ is the average of the two index values. Solving this for the index difference $n_{core}-n_{cladding}$ yields:

$$n_{core}-n_{cladding}=(NA)^2/2n_{avg.} \quad \text{(Eq. 10)}$$

Eq. 10, giving the index difference in terms of numerical aperture and average index, can be related to the expression given earlier for the reflection, Eq. 8, if Eq. 8 is similarly rewritten in terms of the average index $n_{avg}$:

$$r=(n_{core}-n_{cladding})^2/(2n_{avg.})^2, \quad \text{(Eq. 11)}$$

and then Eq. 10 is inserted into Eq. 11, $$r = ([NA]^2/2n_{avg.})^2/(2n_{avg.})^2 \quad \text{(Eq. 12)}$$
$$= (NA/2n_{avg.})^4$$

This allows rewriting the attenuation-coefficient expression of Eq. 9 in turn as—

$$\alpha=2(NA/2n_{avg.})^4/D, \quad \text{(Eq. 13)}$$

so that the light flux at each depth x goes as $\exp(-x\alpha)$ or $$\exp(-2x \, (NA/2n_{avg.})^4/D)$$

which will be recognized as the function in Eq. 1. Moreover, setting this expression equal to $1/e$—which is equivalent to setting the accumulated attenuation equal to unity, $x\alpha=1$, in Eq. 13—yields an expression for required numerical aperture NA to make any given penetration distance x be exactly one attenuation length, $$x\alpha=1$$
$$2x(NA/2n_{avg.})^4/D=1$$
$$NA=2n_{avg}(D/2x)^{1/4}. \quad \text{(Eq. 14)}$$

To obtain this degree of penetration or better, at a distance $x_F$ along the illumination path needed to reach the far side of the prism, the condition on numerical aperture becomes instead $$NA \leq 2n_{avg}(D/2x_F)^{1/4},$$

which is Eq. 6. In principle this expression could be used to select a fiber-optic material providing ideal tradeoff of penetration depth against ducting ability and light-gathering power—if materials offering a moderately continuous selection of numerical apertures were available.

Perhaps in the future such selection may become possible, particularly as inventions such as the present one enhance the market for low-numerical-aperture materials. No such selection is available now, as the most popular materials have numerical apertures NA=0.66, 0.85, 1.0 and higher.

One material commonly on the market does have a low-NA value of 0.35, and as luck would have it this is amply low for the condition described algebraically above. This fact is shown by Table 1, which compares $1/e$ attenuation lengths for some available materials—the attenuation length L being found from Eq. 14 for a given combination of glasses as:

$$L=1/\alpha=D(2n_{avg.}/NA)^4/2. \quad \text{(Eq. 15)}$$

In Table 1, r represents the reflection at each interface as before. Cladding index is not always readily available from manufacturers, but in Table 1 is taken to be the same for all

TABLE 1 attenuation lengths for available materials,
calculated using 8-micron, center-to-center spacing

| NA | core index | cladding index | average index | r | L = 1/α (mm) |
|---|---|---|---|---|---|
| 1 | 1.819 |  | 1.67 | 0.008 | 0.5 |
| 0.66 | 1.657 | 1.52 | 1.589 | 0.0019 | 2.15 |
| 0.35 | 1.56 |  | 1.54 | 0.0002 | 23.7 | three glasses. The attenuation length L=23.7 mm shown for NA=0.35 agrees reasonably well with a value of 20.2 mm observed in development of the present invention. Since the rough calculation ignores off-center rays subject to angled scattering, for which reflection will be greater, the lower observed attenuation length (higher attenuation coefficient α) makes sense.

For reasons explained earlier, extension of the foregoing analysis beyond perhaps about two or a few attenuation lengths is subject to progressively increasing error. To obtain some indication of the limits of practical operation for various values of numerical aperture, some calculations have been carried to two attenuation lengths—that is, intensity dropping to $1/e^2$.

A $1/e^2$ intensity drop, over the length of the illumination path to the far side of a unidirectionally lit prism or to the midplane of a prism with opposed lighting, is regarded as a limit of practical operation. It corresponds to intensity variation of nearly ninety percent (of the incident intensity) across the prism for a unidirectional-lighting system and seventy-five percent for opposed.

These calculations have explored the numerical-aperture requirements for both $1/e$ and $1/e^2$, and for prisms of various widths—and also the numerical-aperture performance for the two commercially available materials whose numerical apertures are either relevant in terms of prior art or introduced as part of the present invention.

If a thumb is to be placed on a prism 10 as shown in FIG. 1, with the long axis of the thumb in the plane of the drawing, then the length (also in the drawing plane) of the first end 1 of the prism 10 mist be some fifteen to twenty millimeters—or a nominal value of 17½.

It is possible, however, to operate a system with the thumb axis (not shown) running in and out of the plane of the drawing—and in this case the length of the first end 1 can approach roughly 10 mm. Table 2 shows the results of these calculations.

The number of attenuation lengths, more than nine, shown in the top line of the table for NA=0.66 is probably far beyond the quantitative applicability of the algebraic expressions used in preparing the table, but does serve to suggest qualitatively that the numerical aperture of 0.66 used in the Dowling devices is much too high for satisfactory operation.

The bottom line of the table conversely indicates that a numerical aperture of 0.35 can illuminate a 17½ mm prism

TABLE 2

Numerical aperture required for $1/e$ and $1/e^2$ performance in prisms of various widths, and performance for commercially available numerical apertures, calculated using 7-micron center-to-center spacing

| raw width of prism (mm) | NA | number of atten'n lengths along path | intensity variation: minimum intensity as a fraction of maximum | |
|---|---|---|---|---|
| | | | unidir'l | opposed |
| 17½ | 0.66 | 9¼ | 0.0001 | 0.0002 |
| 20 | 0.42 | 2 | 0.14 | 0.27 |
| 17½ | 0.44 | | | |
| 15 | 0.46 | | | |
| 10.6 | 0.50 | | | |
| 20 | 0.36 | 1 | 0.37 | 0.65 |
| 17½ | 0.37 | | | |
| 15 | 0.38 | | | |
| 10.6 | 0.42 | | | |
| 17½ | 0.35 | 0.8 | 0.43 | 0.73 | within the reach of less than one attenuation length. On the other hand, numerical aperture of 0.35 is far too low for good ducting, and this fact in turn leads to a need for caution in configurations that require ducting: as suggested in the Summary section earlier, use of separate elements for tapers or curved light pipes resolves this concern.

The three emphasized values of numerical aperture in Table 2 have been used in defining various preferred embodiments of the invention, as expressed in the earlier Summary section and in certain of the appended claims. The foregoing analysis together with Table 2 illustrates the nature of the criticality of these values.

As Table 2 shows, optical-fiber prism materials with numerical aperture up to about 0.5, were they available commercially now, would correspond to an operationally marginal selection of material; and materials with numerical aperture of 0.36 to 0.42—or more generally speaking about 0.4—might be seen as providing an ideal tradeoff between ducting ability and amenability to crosslighting. Tighter ranges may be stated, based on the tabulation, for prisms of specific width.

The illumination-path lengths used implicitly in calculating the variations given above are not equal to the prism widths. They will be discussed in the subsections that follow.

Overall nonuniformity of illumination across the finger-contacting face of the prism is suggested in Table 2 by stating the minimum intensity as a fraction of the maximum intensity. As will be understood, the nonuniformity variation can also be stated as the difference between the maximum and minimum values, as a fraction of the maximum—thus yielding for example values of 0.9998 and 0.27 at top and bottom of the right-hand column.

Still another possible notation is to state the excursion above and below a median value, as a percentage of that median—yielding for example values of ±0.4999/0.4999 or ±100% at the top of the right-hand column and a very modest value of ±0.135/0.865 or ±16% at the bottom. Table 3 states the overall variation according to this third notation, and also displays the fractions of incident intensity from each side that should be observed at various distances across the prism first end 1—and corresponding distances for a prism with opposed lighting, to be discussed shortly.

In the opposed-lighting case, incident intensity is assumed to be half that from a single lamp in the unidirectional case. Also for the opposed-lighting case only the quarter- and half-way points are tabulated, since the pattern is symmetrical—the three-quarter and "full" points are the same as the zero and quarter points respectively.

As shown by the column just to right of the "NA" figures, light reaching an entry face from the lamp on the opposite side of the prism contributes to intensity next to the entry face quite significantly (%50=18% for NA=0.35). Thus the tailing-off intensities beyond the midplane are not at all negligible, and help very substantially to even out the overall lighting.

Table 3 directly shows how smoothly (as well as how minimally) intensity can be made to vary across the prism face, with suitable choice of numerical aperture. It also directly shows how abruptly (as well as how greatly) intensity varies with a poor choice: even in the more-favorable opposed-illumination case for NA=0.66, intensity falls to less than $^{0.01}\!/_{0.5}$, or in other words less than 2% of the initial intensity from each side, before the quarter-width point is reached.

Using Eqs. 1 and 3 the illumination distribution across the prism means can be easily calculated for other prism widths and numerical-aperture values.

Other aspects of fiber-prism crosslighting that merit attention are the illuminating devices and their use.

TABLE 3

Illumination variation for a 17 1/2 mm prism,
calculated using 7-micron center-to-center spacing

| 45-degree prism, light from just one side | | | | | | | rectangular prism, light fr. BOTH sides | | | |
|---|---|---|---|---|---|---|---|---|---|---|
| frac. full-prism width | | | | | var'n ± | | frac. full wid. | | | var'n ± |
| 0 | 1/4 | 1/2 | 3/4 | full | % | NA | 0 | 1/4 | 1/2 | % |
| 1 | 0.10 | 0.01 | 0.00 | 0.00 | 100 | | 0.66 | 0.50 | 0.00 | 0.00 | 100 |
| 1 | 0.61 | 0.37 | 0.22 | 0.14 | 76 | | 0.44 | 0.51 | 0.21 | 0.14 | 58 |
| 1 | 0.78 | 0.61 | 0.47 | 0.37 | 46 | | 0.37 | 0.57 | 0.41 | 0.37 | 21 |
| 1 | 0.81 | 0.66 | 0.54 | 0.43 | 39 | | 0.35 | 0.59 | 0.47 | 0.43 | 16 |

High-brightness light-emitting diodes (LEDs) appear to be the best choice in the present market: operating at 2 V, 80 mA a four-element array is inexpensive and provides more than an adequate exposure in one sixtieth of a second. Such an array can be flashed from a 750 μF capacitor providing a 16 mW-sec pulse.

Near-infrared units are available, making operation of the device invisible. GaAlAs LEDs may be best, operating at 820 nm (where a CCD provides quantum efficiency of forty percent), and providing continuous-wave radiant power at 1 mW. Other choices are GaAs LEDs, which radiate efficiently at 900 and 940 nm, though at 940 a CCD's quantum efficiency is only seven and a half percent.

Some of the prism configurations introduced in this document are subject to illumination hot-spotting near the side face of the prism means from which illumination enters. This problem is reduced by use of opposed lighting, as shown in Tables 2 and 3.

Irregular illumination can also be addressed adequately by concentrating the light—even by concentrating the lamps—directed toward the far side of the prism means; or by providing a spacer 5 as already mentioned; or both. A spacer can be of fiber-optic prism material similar to that used in the prism means, or can be some other type of diffusing spacer.

Noncontinuous geometry of LEDs in a representative array may leave the system susceptible to a small amount of ripple in the lighting intensity. This does not appear to cause any problem.

More interesting are moire patterns or other two- or three-dimensional interference effects apparently resulting from beats between the internal structure of the fiber-optic prism means (with a period of about 0.19 to 0.2 mm) and the finger-ridge structure (period of roughly 0.3 to 0.4 mm). Subtle banding can result, but this too is adequately minimized by use of a fiber-optic spacer 5 so that the prism does not effectively form a sharp end at the illumination face 3.

Typically banding and ripple effects are slightly more significant in the bright-field than in the dark-field case, because the data-processing system can misinterpret as ridges the intensity structure in the modulated bright area. This effective additional noise term forms still another basis—one that is peculiar to fiber-optic-prism systems—for preferring dark-field operation.

(b) Bright-field Systems

As FIG. 5 suggests, the diameters of the fibers 151 in a fiber-optic prism FTIR system are preferably smaller than the ridge spacing. Actually the fibers should be even smaller than the drawing indicates, in relation to the ridges, but this drawing suffices to illustrate the principles of operation of the FTIR fiber-optic prism of the present invention.

As mentioned before, the fibers 151 were originally individual cores of discrete optical fibers, and the matrix 152 was originally discrete individual cladding, formed as annular cylinders, of those discrete fibers. In the fused material the refractive indices of the fibers and matrix are about 1.56 to 1.58, and 1.52, respectively.

A thumb 11 or other relieved surface of interest is pressed against the first-end glass surface 101 of the prism means 110, so that thumbprint ridge areas contact some of the fiber 151 terminations—for instance at one normal 154 to the glass surface 101—while cavities 153 are formed between the thumb 11 and glass 101 by thumbprint groove areas elsewhere, as at another normal 154'.

The refractive index of the thumb skin and flesh is typically about 1.41, defining a critical angle of 68° against the fibers (index 1.56) of the prism. Within a fingerprint-groove cavity 153, air is present—and its index of 1.0 defines a critical angle of about 41° against the fibers.

Small quantities of liquids such as water, oils and sweat are usually found in fingerprint structures, and particularly in and near the areas of contact between fingerprint ridge and glass surface. Drops 156 of these materials have refractive indices generally different from those of both the skin and the glass—for instance 1.33 for water, defining a critical angle of 61° against the fibers—and they participate in optical interactions at the surface.

Thus the critical angles for the thumb 11 ridges and liquids 156 associated with them exceed 45°, whereas the critical angle for the thumb 11 grooves 153 is less than 45°.

Representative light rays 114a and 114b both strike the glass surface 101 from within the prism means 110. One of these rays 114a reaches a fingerprint ridge region at one normal 154, and the other ray 114b reaches a groove region at another normal 154'.

Both rays strike the surface 101 at approximately 45° to the respective normals 154, 154'—less than the critical angle for ridges and their associated liquids, but greater than that for grooves. A ray 114a which strikes the ridge region accordingly is not subject to total internal reflection, although in general it can partially reflect (not shown) from the surface—and it partially passes through the surface and into the material of the finger (and associated liquids).

Some of this transmitted light is promptly scattered as rays 114a' passing further into the thumb 11. Next, some of these rays 114a' in turn after penetrating some distance are rescattered or redirected along ray paths 155. For simplicity of the drawing, only one generation of such a rescattered or redirected ray is illustrated, but in general actually multiple generations of such events occur—which is to say, some of the light bounces about within the thumb 11 extensively.

A relatively small number of the redirected (or reradiated) rays 155 in turn may reenter the prism as shown. The single reentrant ray 155 shown in FIG. 5 is drawn at too steep an angle to be ducted along the fiber 151, and so represents light 155, 116 that is ejected laterally across the fibers and thus wasted from the system: this is what happens to most of those few redirected rays that reenter the prism.

It is important to notice that the direction of the fibers 151—oriented at 45° to the surface normals 154, 154' and at right angles to the incident rays 114a, 114b—first enters into the discussion only at this point. (To be slightly more precise, the fibers 151 as drawn are at −45°, not +45°, to the normals; however, this choice in itself is only an arbitrary one relating to the preparation of the drawing, as exchanging the axes of the fibers and incident rays corresponds to merely viewing the same apparatus from the opposite side.)

The reason the reentrant ray 155 cannot be ducted along the fiber 151 in FIG. 5 is that in this drawing the orientation of the fibers 151 has been chosen to exclude such rays. In other words, there is nothing inherently unductable about the ray 155 itself, apart from its relative orientation with respect to the fiber 151.

(As mentioned earlier, FIGS. 5, 8 and 11 have been drawn with substantially the same finger, glass surface, and input rays as FIG. 5—and with mutually corresponding sets of reference numerals 11, '01, '14a, '14b etc., except for the prefix "1", "2" or "3" identifying the three configurations respectively. Only the fiber 151 orientations vary. The purpose of preparing the drawings in this way is to facilitate comparison of the FTIR relationships in the three cases.)

A statistically small number of other reentrant backscattered rays (not shown), however, do fall within the acceptance cone of an adjacent fiber 151 oriented as shown, and are ducted to the detector. In a bright-field system such as under consideration here, such statistically occurring rays decrease the contrast between ridges and grooves—and for purposes of the present discussion may be regarded as one source of optical "noise" or background.

Similarly other rays 114a" are scattered directly (that is, not as reentrant rays 155) from the thumb 11 back into the fiber. Most of these too are at an angle that is excessively steep for ducting along the fiber—and these also are ejected laterally, representing light 114a", 116 that is wasted from the system.

Some relatively few of the directly scattered rays 114a" are at a sufficiently shallow angle to be accepted by an adjacent fiber 151 oriented as shown, and so are ducted as reflected rays 114a", 117 to the detector as shown. In this bright-field system these statistically occurring rays represent a second source of optical "noise".

Reflection from the surface at ridges can be minimized, if desired, by polarization control at the light source. In the abstract this can be significant, for any such reflection passes directly into the fibers—forming a third and potentially large source of optical noise.

For present purposes, however, such polarization control is probably unnecessary: because the index differences are small, the amount of residual reflection at the contact surface is small. Even at a thirty-degree azimuth the reflection is only six percent for the s-wave (polarization aligned with the surface) at water, and 1.3 percent at skin.

Reflection of the p-wave (polarization perpendicular to the surface) is even less, 1.6 and 0.2 percent. All these numbers are small, so the use of polarized light would not appreciably change the contrast—which is probably reduced more by air in the fibrous skin of the ridges.

A ray 114b which strikes the groove region is subject to total internal reflection and accordingly may form an entirely reflected ray 114b', 117 traveling back into the adjacent fiber 151. This ray, traveling in its respective fiber from its surface normal 154', represents the desired optical signal.

In other words it may be helpful to regard these rays as data, namely the information that a groove is present adjacent to that particular fiber—a light-carrying fiber. (Of course as a matter of semantics it is also reasonable to regard the wasted rays too as "data", because the resulting dark pixels convey the information that a ridge is adjacent to the corresponding dark fiber. Merely for purposes of definiteness in this discussion, it is useful to identify only the rays 117 traveling toward the detector as the data.)

It is these rays 114b', 117 which the fibers in FIG. 5 have been oriented to collect. The grooves in this system thus appear bright, and the ridges dark.

Although the data in this case may be most naturally seen as information that a groove is present, traditionally it is the ridges that are regarded as the "structure" of interest. The grooves are perceived as merely the "background" or "field" against which this structure appears—hence the nomenclature "bright-field system".

In the nature of the FTIR process, many more entirely-reflected data rays 114b', 117 will occur than the previously discussed ridge-modulation or optical-"noise" rays 114a", 117 that are collected only statistically. Accordingly the optical signal and resulting electrical signals will be much stronger than the optical "noise" that is due to statistical acceptance of direct and indirect backscatter.

Now backing off from the microscopic view of FIG. 5 to the macroscopic picture in FIG. 6, a suitable prism means for bright-field operation may be as shown a unitary 90°/45° prism 110. The thumb 11 is applied to the hypotenuse 101, and the fibers 151 run parallel to one of the short legs—also identifiable as the light-entry side face 103.

In the width dimension, running in and out of the plane of FIG. 6, the prism 110 is simply rectangular—just as shown in FIG. 2 for the FIG. 1 unit, but with a fiber axis 8' (FIG. 2) running at 45° to the axis 8 of the FIG. 1 prism. Therefore, analogously to the relation described for the FIG. 1 prism, in that out-of-plane dimension the side face 103 is at least as wide as the first end 101 of the prism 110.

FIG. 6 is essentially keyed to FIG. 5, the input light 114 from the source 104 passing through the spacer 105 and side face 103 and across varying widths of the prism, and through the fiber walls to directly illuminate the fiber terminations at the thumb-contacting surface 101. Resulting optical signals 117 are ducted along the fibers to the detector 107, which is secured to the output face or "second end" 102 of the prism.

Waste light 116 is mostly dissipated isotropically. Some slight fogging of the image at the detector 107, however, does result as suggested in the drawing by the orientation of the waste-ray arrow 116.

The crosslighting distances vary from extremely short, for light originating in the upper right end of the angled source 104, to a maximum length of $x_F$ for the lower left end of the source. These illumination path distances can be seen directly in the drawing as the lengths of the three arrows 114 crossing the fiber structure 151.

From the 90°/45° geometry of the prism it follows that the maximum illumination path distance equals the length of the thumb-contacting hypotenuse 101 divided by the square root of two—or in algebraic form $x_F = L_T/\sqrt{2}$.

The configuration of FIG. 6, as can be seen by comparing it with the adjacent drawings at substantially the same scale, is advantageously very compact. It does, however, have some minor drawbacks.

One of these is that the illumination 114a striking the prism near its left end is very close to the detector 107, so that waste light 116 from that region (i. e., particularly scattered light from thumbprint ridges) is likely to form a flare or strong fogging at the detector 107 in that area. This effect cannot be reduced by simply lowering the lamp intensity, as this would reduce the thumb illumination too, and thereby its specular reflection—the signal from the grooves—in the same region.

Another minor drawback is that the length of the thumb, applied along the hypotenuse 101 of the prism, appears foreshortened by the factor $\sqrt{2}$ at the detector 107. This anamor-phism is very easily compensated in firmware of the new-minutiae deriving means 23 (FIG. 1), but at the modest time penalty of an additional processing step.

Both these drawbacks can be eliminated by fabricating the prism in the form of a parallelogram, as indicated in the phantom line, with extended fibers 151" carrying the signal 117" to a longer detector 107" that is parallel to the input face 101. This configuration, however, has its own drawbacks in some sacrifice of compactness, and more importantly in the added cost of the larger detector 107".

Nevertheless the alternative configuration 151"-117"-107" may have merit in event of various possible favorable developments in detectors: this is detailed in section 3 below.

Some motivation arises to save cost by somehow using a smaller detector 107. One way to accomplish this is with a taper 158 (FIG. 7)—transferring the thumbprint image from the output end 102 of the prism to a much smaller detector 107' on the smaller output face 102' of the taper.

In this case the "prism means" comprise the prism and taper considered together. As the drawings show, the prism section in the compound structure of FIG. 7 is substantially identical to that in the unitary-prism case of FIG. 6; thus the illumination-path lengths mentioned earlier are the same.

To avoid severe fogging of the image in such a device, it is important to use a taper 158 that is properly designed to adequately preserve ducting of the signal rays, particularly through the most strongly curved region of the fibers 159. This condition calls for a fiber structure of relatively high numerical aperture, or use of EMA material in the prism, or advisably both.

Therefore—since the prism requires low numerical aperture and absence of EMA material—as mentioned earlier the taper must be fabricated separately from the prism. Another reason for use of a separate prism now is that the materials conventionally used in making low-NA fiber optics are not amenable to the drawing techniques used to make tapers.

It may be possible to compensate the previously mentioned anamorphic mapping within the prism section, by suitable design of the taper. This would likely require a special and very expensive process for fabrication of an anamorphic taper with e. g. 1:3.5 demagnification in one dimension and 1:4.9 in the other—or a tilted end section as is shown in FIG. 6 and a tilted detector 107".

Use of a bright-field system has some intuitive appeal, in collecting and analyzing the relatively intense light that internally reflects toward the detector at untouched portions of the prism face, producing a bright line on the detector corresponding to the locations of grooves in the thumbprint. Such a system produces a fixed upper white level.

As mentioned above in the Prior Art section, unfortunately in practice the dark level, corresponding to ridges, varies greatly along the ridge lines—from essentially black in some spots to a modulation as high as seventy-five percent (of the white level). The contrast $$(I_{max}-I_{min})/(I_{max}+I_{min})$$

commonly ranges from the previously calculated value of about one-seventh to nearly unity.

The undesirably-higher "dark" level in most regions of the ridge lines, arising from fibrous gaps and discontinuous hard contact as described at length earlier, severely detracts from the overall appeal of bright-field systems. Resolving this difficulty would make the compact and simple configurations of FIGS. 6 and 7 very favorable.

Unfortunately, some effective techniques relate to preconditioning of the skin. This is not an appealing prospect for an application that involves emergency field use of miniaturized personal apparatus.

Possibly instead, in a device that is never called upon to do anything but verify a fingerprint match with a specific authorized individual, some settings of the optical or data-processing system could be optimized for reading of skin quality which is characteristic of that individual's skin. Although a good print might not be obtained from another individual, this would not matter greatly as that other individual should be refused access anyway.

(c) Dark-field Rectangular-prism Systems

In FIG. 8 the illumination and thumb geometry is exactly the same as in FIG. 5, discussed earlier. Therefore the input illumination 214a, 214b and resultant generation of directly and indirectly scattered rays 214a', 214a", 255, at the ridge normal 254, and generation of reflected rays 214b', 214b" at the groove normal 254', are all just as assumed for the bright-field apparatus.

In this system, however, the fibers 252 are at a different angle to the surface 201—or in other words the prism surface 201 is cut at a different angle to the fibers 252. Here the fibers run normal to the surface 201 and at 45° to the incident rays 214a, 214b (rather than the converse, i. e. at 45° to the surface and normal to the rays, as in FIG. 5).

Therefore a different set of ejections and acceptances applies in this case. Here the incident rays 214a, are introduced so that they cannot simply reflect to the detector; therefore in this case the ridges are left to appear dark at the detector. It is a relatively large number of the ridge-backscattered rays 214a", 217—and 255, 217—which the fibers are oriented to accept into their ducting mode, to form the optical signal.

Here therefore the data take the form of information that a ridge is present adjacent to the illumination-carrying fiber. By comparison most of the FTIR groove-reflected rays 214b', 216 are ejected laterally from the system as waste light—with the important exception of certain rays 214b" to be discussed momentarily.

Because traditionally the ridges are regarded as the structure of interest (due to taking of fingerprints as inked imprints, on paper, of the raised ridges), in this case the data-carrying light corresponds directly with that historically recognized structure. This structure, however, appears against a dark "background" or "field"—giving rise to the nomenclature "dark-field system".

Except for the possibility of dirty or very shallow grooves, or backscattering due to excessive liquids 256 in the thumbprint structure, there is relatively very little noise in this system. Hence in general a dark-field configuration tends to provide somewhat better contrast than a bright-field system.

As FIG. 8 shows, however, there is an important undesired phenomenon in this rectangular dark-field system. Rays 214b" derived from the specularly reflected component 214b' can propagate diffusely toward the detector by multiple reflections at the fiber interfaces. These rays 214b" constitute, or are analogous to, a form of stray light diffusing toward the detector.

This propagation does not proceed by ducting of the rays 214b" within the fibers 251, but rather by the previously discussed fiber-crossing diffusion process that is used initially to inject the illumination to the thumb-contacting terminations. FIG. 8 shows that, as with rays 14*d*' and 14*d*" in FIG. 4, in the diffusion process the specular-reflection-derived rays 214*b*" maintain the magnitude of their angle of inclination to the fibers 251 while being offset laterally—and even reversed in direction relative to the transverse dimension of the prism—from their initial trajectories.

Although much or most of the stray rays 214*b*', 214*b*" eventually leave the prism through its side faces, a significant fraction of those rays 214*b*" can diffuse to the detector unless prevented from doing so. Since the specular-reflected component is very strong, the aggregate of such stray light 214*b*" reaching the detector would equal or exceed the intensity of the signal rays 214*a*", 217.

Such specular-reflection-derived rays would form a diffuse fog over the signal rays—raising the shot noise without raising the signal, and also tending to saturate the detector. Such fogging would be very undesirable.

One way to avoid this effect would be to separate the detector from the second end of the prism, and transfer the signal-ray 214*a*", 217 image from that end to the detector by a lens. This solution is workable, but undesirable by reason of the objections to lens systems discussed earlier. A preferable approach is to absorb the stray light with suitably placed EMA material of proper numerical aperture.

Turning to the macroscopic view of FIG. 9, as can be seen the prism 210 is rectangular and considerably more massive than those of FIG. 6 (although the length need not be quite as great as shown). Of course the relatively greater mass in itself is a drawback for the most miniaturization-sensitive applications of the invention—particularly personal weapons, portable telephones and the like.

In addition the illustrated auxiliary coupling prisms 205 add considerable undesired size and weight to the assembly. The function of these prisms is to avoid three problems: high reflection losses, low Lambertian (cosine law) flux through each side face 203 of the main prism 210, and difficult source-to-prism alignment.

All three would arise from direct approach of illumination 214 at a very shallow angle, and narrow aspect of only a few millimeters, outside the side faces 203. Antireflection coatings would address only the first problem (reflection loss) and at such grazing incidence would be minimally effective.

This adverse effect, however, can be mitigated without adding such large coupling prisms 205. Mitigation is attainable through substitution of a number of smaller prisms, side by side. While it is possible to use a large number of tiny molded facets similar to those of a Fresnel lens, an ideal number is probably small, as for example between two and five prisms.

Tending to offset the drawbacks of greater mass apparent in the main prism 210 of FIG. 9—as compared with FIGS. 5 through 7—are higher contrast and also the improved uniformity of illumination discussed in section 2(*a*) above. Because lighting can be applied from both sides some evening-out of the illumination is possible, and the overall profile becomes relatively uniform as shown by the right side of Table 3.

With opposed lighting the illumination from each side provides half the intensity at the midplane or centerline 219. When these are combined, for instance in the $1/e^2$ case (see Table 3) total midplane intensity adds to about fourteen percent of the intensity incident at each side—just matching the minimum far-side intensity in the preferred unidirectional-lighting case mentioned above.

In view of the binary character of the FTIR detection process this total midplane intensity (for the $1/e^2$ case) is sufficiently close to initial intensity for marginal operation. Beyond that point the intensity continues to fall off exponentially, so that the intensity fraction which reaches the far side of the prism is the square of the fraction which reaches the midplane (for instance $1/e^2$ and $1/e$ respectively).

Thus the principal condition of interest is the projection of light to the midplane. As can be seen directly from the common scale of FIGS. 6 and 9, and the way in which these drawings are juxtaposed, the illumination path length $x_M$ to the midplane in FIG. 9 is exactly the same as the comparable distance $x_F$ of FIG. 6.

Light is supplied from twice as many directions—but only half as much light from each direction. Consequently a derivation of numerical-aperture constraints for crosslighting of the FIG. 9 system proceeds to the same algebraic results, except for substitution of the midplane notation $x_M$ for the far-side notation $x_F$.

If desired, it is theoretically possible to halve the amount of light required in this system—by omitting the inboard half of each source 204. Such a change would also enable use of half-size couplers 205.

Also enabled in turn by this hypothetical modification would be a half-length main prism 210, since the second end 202 could be moved nearly to the point of impingement of those rays 214 shown in FIG. 9 as coming from the centers of the sources 204. Such a modification thus would very greatly relieve the size, weight and cost drawbacks of the FIG. 9 system.

These benefits, however, would be obtained at the sacrifice of the beneficial uniformity of illumination discussed just above and in earlier section 2(*a*) of this Detailed Description. The illumination uniformity would still be reasonably good, equal to that for unidirectional illumination as represented in the left half of Table 3.

A possible difficulty with this modification would be alignment of the two converging beam edges at the midplane. First considering these beam edges as sharply defined: if the two beams overlap slightly, a very sizable intensity step arises at the two sides of the overlap region; but if they do not quite meet, then information is lost for an unilluminated strip of thumb area which is at the critically important center of the thumbprint pattern.

The two beam edges, however, are not really sharply defined but grade into shadow in ways that can be manipulated to some extent by placement and orientation of lamps, couplers, diffusers etc. It is likely that the graded edges of the two beams can be feathered together in such a way as to overcome the possible overlap-or-gap difficulty described in the preceding paragraph.

The main prism 210 is rectangular not only in the plane of FIG. 9 but also in the width dimension that runs in and out of the plane of the paper, analogously to the relation shown in FIG. 2. Therefore, unlike the prior-art geometry, the light-entry side faces 203 are at least as wide (not shown) as the thumb-contacting first end 201.

Detector-size concerns mentioned above in connection with the FIG. 6 bright-field apparatus are even more troublesome here, due to the larger cross-section, by the factor $\sqrt{2}$, of the FIG. 9 rectangular dark-field prism (particularly at its second end 202). They may be addressed by use of a taper 258 as suggested in FIG. 10, but the taper dimensions too are larger, by at least the factor $\sqrt{2}$, than the analogous bright-field taper of FIG. 7.

The theoretical length- and weight-saving benefits of omitting half the source 204 widths, discussed above in relation to FIG. 9, apply equally to FIG. 10—but only to the main rectangular prism (210 in FIG. 9) and couplers 205, not to the taper 258. Dimensions of the taper are set by the main-prism unchanged widths, both in the plane of the drawings and out of that plane, not by the main-prism reduced length.

FIG. 9 also shows the previously mentioned stray-light rays 214b" derived from the specular reflection 216 and diffusely propagating toward the detector—transversely to the fibers, through myriad reflections at the fiber interfaces. These are captured and absorbed by a short section, just before the second end 32, of fibers 251' that have EMA material.

The short EMA section 251' can be either a separately manufactured prism block or unitary with the main fiber block 251, as preferred. It is desirable that the numerical aperture of the EMA section 251' be about the same as the main block 251: if the EMA section 251' has higher numerical aperture, it will accept and transmit much or all of the stray light—thus defeating the purpose of the absorbing section 251'. If the numerical aperture of the EMA section 251' is lower than that of the main block 251, then some signal rays 217 will be undesirably discarded.

As FIG. 10 suggests, the EMA section 251' need not be long—but again it must not have higher numerical aperture than the main block. Thus in particular the taper 258, 259 alone would fail to serve the purpose of intercepting the specularly-derived rays, and would instead—by virtue of its much higher angular acceptance—transmit a large fraction of that stray light to the detector.

(d) Dark-field Partial-reflector Systems

In the microscopic view of FIG. 11 again the thumb-contacting surface 301, contours of the thumb 11, and incident light rays 315a, 315b are exactly as in FIGS. 5 and 8. The fibers 351, however, are in yet a third orientation relative to the incident rays 315a, 315b.

Here the fibers 351 are parallel to the incident rays 315a, 315b—rather than at 90° as in FIG. 5, or 45° as in FIG. 8. In fact, here the fibers 351 carry the incident illuminating rays to the surface 301.

Although here crosslighting is employed, it does not occur next to the thumb-contacting surface as in FIGS. 5 and 8 but rather at a partial reflector 306 (FIG. 12) which is adjacent to an opposite end of the thumb-contacting prism. This system will thus be recognized as closely related to the configuration first introduced in FIG. 1.

(In addition to their orientation parallel to the incident rays 314a, 314b, the fibers 351 in FIG. 11 run at +45° to the surface normals rather than at −45° as in FIG. 5, or 0° as in FIG. 8. As suggested by the discussion of FIG. 5, however, this seeming difference relative to FIG. 5 is only an artifact of the drawings. The sign of the angle is an arbitrary choice, and a simple mirror-image change of viewpoint produces an exchange of orientations of the fibers and the incident rays.)

On account of the different fiber orientation relative to the incident rays 315a, 315b, a different selection of the directly and indirectly backscattered rays 315a", 355 at a ridge-adjacent normal 354 will be able to enter the ducted mode of the corresponding fiber and travel toward the detector as signal or data 317. Generally speaking the backscattered rays which could be collected in FIG. 8 are too steep for ducting and instead become waste light 316 in FIG. 11, as can be seen by a detailed comparison of the rays shown in common in these drawings.

In a generic sense, however, the ducted backscatter in FIG. 11 is equivalent and proportional to that in FIG. 8. It therefore on reaching the detector produces substantially proportional or equivalent electrical signals—but smaller, for reasons to be discusssed momentarily.

At a thumbprint groove 353 in FIG. 11, internally reflected light 315b', 315b" is ejected from the system as waste light 316 at even steeper angles than the corresponding rays 214b', 214b" in FIG. 8. Therefore the optical signal-to-noise relation as evaluated at this thumb-contacting end of the FIG. 11 dark-field system is closely comparable to that of FIG. 8, and perhaps better.

Figure 12:
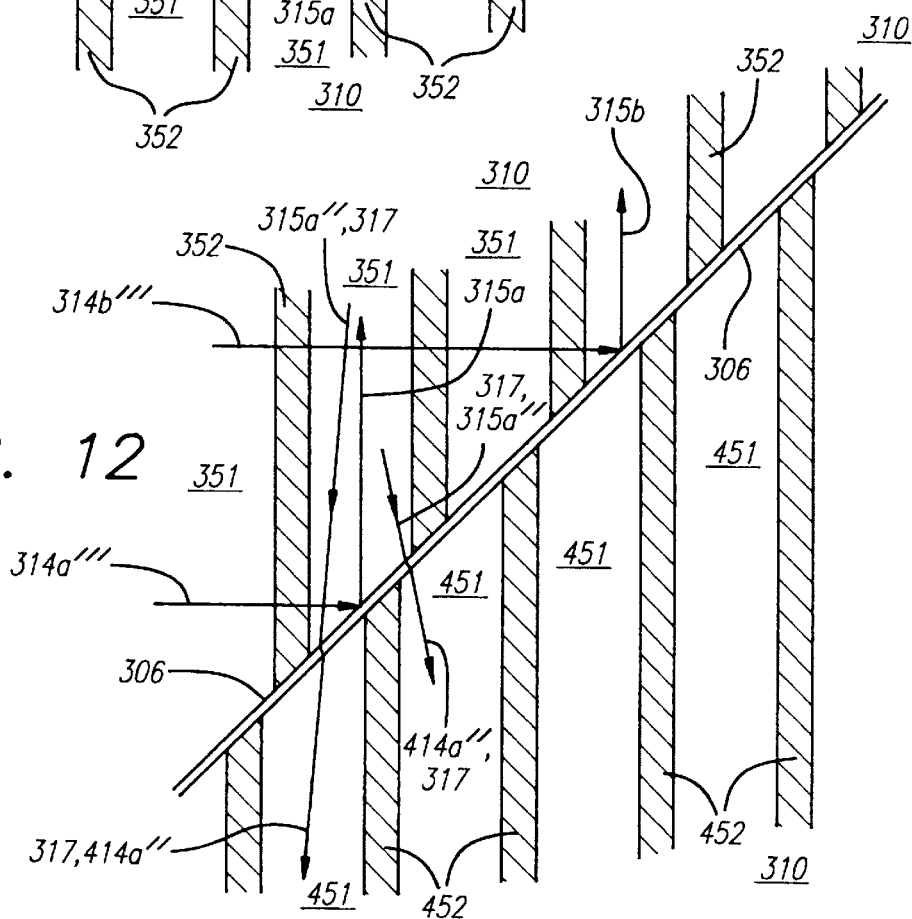
FIG. 12 supplements FIG. 11 in showing how light is injected into the FIG. 11 system.

Differences do arise, however, at the other end of the thumb-contacting prism—shown in FIG. 12. Here entering illumination 314a", 314b" is incident, in the crosslighting mode, on a partial reflector 306—which by reflection forms ducted illumination rays 315a, 315b propagating toward the thumb end of the prism. A significant fraction of the initial illumination energy is lost in the process, though considerably less than half if the incident light is polarized in the plane of the reflections.

At this same interface, some of the returned backscatter 315a", 317 passes through the partial reflector 306. This process too is subject to loss, roughly half.

The overall loss in two passes at the reflector 306 leads to lower optical-signal intensity—and thereby lower signal-to-noise ratio on account of increased significance of shot noise—at the detector. Merely as an example, if intensity is lowered by an overall factor of 2½ in the two passes at the reflector, then signal-to-noise falls by the square root of this number: a factor of roughly 1.6.

If a coupling prism, taper or polarization filter is present, the radiation passing through the reflector 306 forms continuing rays 414a", 317 within the fibers 451 of that element. In any event the through-radiation eventually enters a detector 7 as in FIG. 1—or, turning now to the macroscopic views—307 as in FIG. 13, or 307' as in FIG. 14.

It will be noted that in FIGS. 12 and 13 the thumb-contacting first end 301 is shown at opposite ±45° orientations, relative to the fibers 351, 451—but also relative to the interface and reflector 306. This latter relationship is more meaningful, corresponding to different overall shapes of the thumb-contacting prism: either a triangle as in FIG. 13, or a parallelogram generally as in FIG. 17 (or FIG. 6, but of course with illumination geometry different from that in FIG. 6).

These two overall shapes are functionally equivalent, as far as image formation at the detector is concerned. One or the other, however, may be distinctly preferred for mechanical accommodation of the prism means in any given practical device.

In one preferred embodiment, of FIG. 13, the detector 307 is disposed at right angles to the fiber axis and ducted optical data 317. This system is moderately compact, but is subject to image anamorphism as discussed earlier in connection with FIG. 6.

Correction may be obtained through use of one alternative 45° detector placement 307" that is drawn in the phantom line, in FIG. 13. This alternative is subject to almost as much fogging as the FIG. 1 configuration, by incident source light 314 passing through the partial reflector 306, but also is amenable to several different cures.

One such cure is the same one proposed relative to FIG. 1, i. e. installation of a polarization filter (not shown)—which here may be provided at either side of the narrow fiber-optic spacer section 410". Other cures for incident-illumination 314 fogging of the detector 307" include lengthening of that spacer section, or making it with EMA material or high-numerical-aperture material as prescribed earlier for the taper sections—or any combinations of these several tactics.

In general, use of EMA material is preferred for the second-stage element 410, 410", regardless of the shape of that element—although this preference is much more important for narrow-slice spacers 410" as suggested just above.

If the first-stage prism section is formed as a parallelogram, a possibility mentioned above, then the anamorphism-correcting alternative detector placement 307" and thin spacer section 410" of FIG. 13 may simply follow the opposite 45° orientation of the second end 302 and reflector 306—in much the same way that the illustrated detector and spacer 307", 410" follow the illustrated second end 302 and reflector 306.

If preferred, however, the spacer may be made with the same triangular shape as the main prism—so that the remote face 302' (the second end of the overall prism means 310) is laid over toward the right, in a 45° orientation (not shown) parallel to the first end 301. This orientation too will eliminate the anamorphism of the detector placement 307 shown in the solid line in FIG. 14. In this case it is the entire dual-element prism means, rather than only the first-stage prism considered alone, that is shaped as a parallelogram; such a configuration is relatively long.

Now as to the crosslighting and numerical-aperture constraints required in any of these variants of the system of FIGS. 11 through 13, the maximum illumination path length appears in FIGS. 13 and 14 as the longest illumination-ray arrow 314. Once again the common scale and orientation of the thumb-contacting first end in FIGS. 6, 9 and 13 enables visual confirmation that the maximum illumination path length $x_F'$ identified in FIG. 13 is exactly the same distance as in the two embodiments discussed earlier—namely $x_F' = L_T/\sqrt{2}$. Therefore the previously introduced calculations and tabulations apply equally well to FIG. 13 and its variants.

As with the bright- and dark-field embodiments of FIGS. 5 through 10, to the extent that detector cost is an obstacle some relief may be obtained through use of a taper 358 (FIG. 14). Because the FIG. 13 first-stage prism does not present a second-end face that is perpendicular to the fiber axis, however, the taper 358 in this case is particularly long, making the overall assembly somewhat unwieldy as seen in FIG. 14.

The added length may be alleviated by a variant (not shown) in which the crosslit low-numerical-aperture element is at the narrow end of the taper instead of the broad end. An interface between the two elements may then be cut off square, and the angled partial reflector placed at the other end (i. e., remote from the taper) of the crosslit element.

In such a variant the finger-contacting end of the assembly may be continuous with the broad end of the taper, and of the same high-numerical-aperture material since the crosslighting is done at the narrow end. The detector is coupled to the crosslit segment, either through an intermediate spacer (which may be either triangular or thin-slice-shaped, analogously to the prism 410 and spacer 410" in FIG. 13) or directly behind the reflector/filter as described earlier in conjunction with FIG. 1.

In this variant, as in the rectangular-prism configurations of FIGS. 8 through 10, it is essential to control lateral diffusion of the signal rays transferring from the high-numerical-aperture taper to the low-numerical-aperture cross-lighting section. Because of the much narrower acceptance angle of the crosslighting section, a significant fraction of the signal will be rejected from the ducting mode in that section.

This rejected light, however, will continue into that section by transverse diffusion, and if not controlled will fog the image at the detector. This can be prevented by use of EMA material in the final section—the stage between the angled partial reflector and the detector. Although in this case some signal is sacrificed in the EMA material, the EMA material is desired anyway—and needed if the final section is a thin-slice spacer—to prevent diffusion toward the detector of the initial input illumination.

The variant under discussion is shorter than the FIG. 14 embodiment, because the taper is shortened by the length of the illumination entry face 303'—and this saving is only partially compensated by the length taken up by the equivalent diagonal with its associated entry face (not shown) in the smaller-cross-section crosslit element. The diagonal across this smaller crosslit element is shorter by a factor equal to the demagnification M in the taper, so that the overall assembly can be shortened by the distance $(1-M) \cdot x_F'$.

3. DETECTION (a) Geometry and Mechanical Arrangements

In principle, the image produced by the crosslit fiber prism can be detected by using a lens to directly image the output face of the prism onto a self-scanned detector array. Such a detector array, an array of photosensitive cells, converts the light distribution into a corresponding distribution of photoelectrons, which are then read out in series by some means of scanning the photosites in the array.

Although the present invention can be thus practiced using a conventional imaging system, its preferred use is in an all-solid nonimaging fiber-optic system in which the detector is affixed by means of transparent optical means— epoxy cements, or index-matching oils with mechanical attachment—to the output face of a solid fiber-optic element. In order to prevent pattern interference and moire patterns, the size of the photosites should be substantially different (preferably larger) than the optical fibers, at least by a factor of two and preferably more.

(b) Cost Tradeoffs with Taper

The present price of even a relatively small detector 107 such as shown in the solid line of FIGS. 6 and 13, if implemented as a conventional charge-coupled detector (CCD) array, is high enough to constitute the major cost element in apparatus according to the invention.

This is the motivation for considering tapers 158, 258, 358 even though a taper in turn disadvantageously adds to the weight, size and cost of the apparatus. At this writing, however, the CCD cost advantage in provision of a taper 158 in many cases is more than offset by the incremental cost of the taper—even without considering the weight and size penalty.

It is not possible to predict reliably whether eventual cost relief should be expected in the detector or in the taper, or in neither.

(c) Detector Types

Various possible developments could relieve the tension discussed above. The price of conventional crystalline-silicon CCD arrays in this size range may fall—perhaps partially in response to competition for usage in apparatus according to the present invention. An alternative optical detector, such as for instance a self-scanned diode ("SSD") array or the thin-film (noncrystalline) photosensor array mentioned earlier, may become available at significantly lower cost.

If both CCD and taper prices remain elevated, and alternative detector devices are not commercialized, the result is to limit the personal-equipment applicability of the invention to the high end of the market for such equipment—e. g., for personal weapons, the market for personal weapons costing perhaps $500 to $1,000 in 1995 terms. Regrettably, this may price the resulting products out of,the range of consumers of modest means.

On the other hand, it may well create a new market among consumers of the economic middle class who are unwilling to own weapons that are potentially harmful to themselves and that small children may misuse, etc. It is believed that such consumers are willing to pay a premium price for a self-protective article that is not subject to these problems.

This document has mentioned various techniques for correction of prism anamorphism. An additional way to correct such imaging asymmetry is to use a detector with complementarily asymmetrical pixels.

Some relatively inexpensive CCD arrays happen to be available with rectangular pixels, e. g. the Texas Instruments Model TC211, in which each pixel is 13¾ by 16 microns. Unfortunately the ratio of these sides is 1.16, not very close to the needed ratio of √2=1.41.

We know of no commercially available unit that provides the desired √2 ratio—but as will be clear such arrays can be readily manufactured as high-volume demand appears, and presumably manufactured in the same small size as the TC211 and at very favorable costs, comparable to that of the present TC211. Such made-to-order detectors would correct anamorphism and under present market conditions would be less expensive than full-size CCDs, even taking into account necessary added cost of matching tapers—and therefore are the most highly preferred detectors for use as part of the present invention.

Detectors that can be used are primarily CCDs (charge-coupled devices), CIDs (charge-injection devices), and SSDs (self-scanned diodes). All of these are made in two-dimensional arrays by many manufacturers: Texas instruments, Fairchild. Tektronics, Kodak, Dalsa, Phillips, Thomson, Sony, Hitachi and so on—and in a large variety of sizes, and costs.

Smaller and cheaper devices include the Texas Instruments TC211, with 192 by 165 pixels, measuring 13¾ by 16 microns as mentioned above (for overall dimensions 2.64 mm square); and the TC255 with 243 by 336 pixels measuring 10 by 10 microns (overall 2.4 by 3.4 mm). These are made for mass-produced consumer items and cost less than $25.

They are applicable, and because they are so economical are preferred, for the configurations using a fiber-optic taper with high demagnification; these are second in preferability behind the custom-sized units already discussed. Most detector arrays now available are 8.8 by 6.6 mm; these could be used but are currently about $100—and also still call for a taper.

Larger 512-by-512 (and greater) CCDs and large-pixel SSDs are applicable and preferred for the direct-transfer configurations; they are third in preference, behind the high-volume units mentioned in the preceding paragraph. If cost becomes comparable, however, they could become more preferable—in view of the overall compactness which they would confer on the system, by virtue of needing no taper.

A Kodak Model 4000, which has a 4096-by-4096-element area, is big enough to use without a taper, though at present far too costly. Although the CCDs are extremely expensive in these large sizes, the SSDs can be made with inexpensive materials such as amorphous silicon and may enable lower overall system cost.

4. PERSONAL-WEAPON IMPLEMENTATIONS (a) Mechanical Arrangements and Function

A personal weapon according to preferred embodiments of the present invention may take the form of a pistol (FIGS. 15 and 16) having a barrel 41 and a firing chamber 43 for holding a bullet 44 in firing position.

A generally conventional magazine 45 within the pistol handle 46 stores a number of additional bullets 44' for feeding into that firing position in sequence as the bullets are used. A trigger 42 is provided for generally conventional operation by a user, but as will be seen the action of the trigger 42 upon the functioning of the pistol is preferably not conventional.

Exposed at upper left on the handle 46 are a thumb rest 61 and, embedded in the thumb rest, the first end 101 of a prism means 110'. The prism means 110' are held within the left side of the handle and comprise, in addition to the prism-means first end 101, a taper 158 generally as in FIG. 7. Shown schematically within the handle 46 are a CCD array 107', circuit boards 63 and electrical batteries 64 for powering the lamps and electronic system of the invention.

Figure 17:
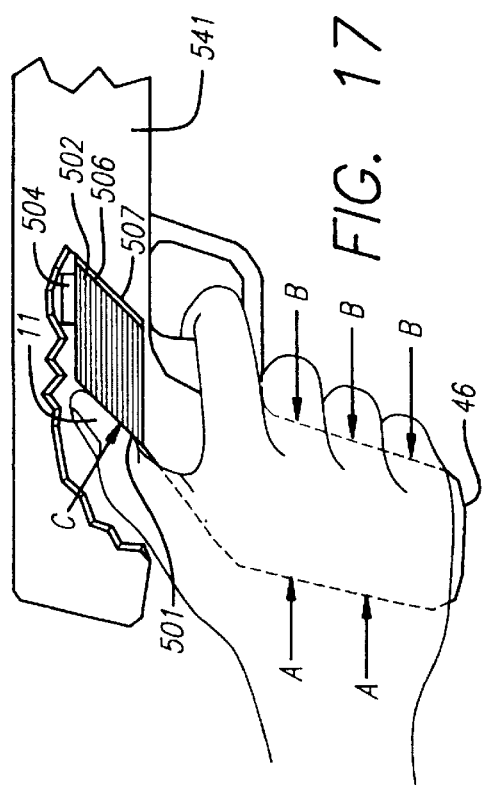
FIG. 17 is a right elevation of a variant of the FIGS. 15 and 16 embodiment, drawn partly broken away to show portions of the left side too, and in the interior schematically a fingerprint-acquisition optical element as in the embodiment of FIGS. 11 and 12.

FIG. 17, while showing a variant 501–507 of the prism means and detector, primarily illustrates a novel ergonomic placement of the prism, which makes fingerprints acquired with the apparatus significantly more distinct and much more reproducible.

As will be recalled from the Prior Art section of this document, the only currently known prior representation of a fingerprint-controlled personal weapon indicates pictorially that prints are to be taken from some finger or fingers other than the thumb, and by means of finger pressure where the finger is wrapped around the handle. That prior disclosure makes no provision for reproducible positioning, orientation, or pressuring of the finger against the weapon handle—or for circumventing the user's failures in this regard.

Many of the otherwise well-elaborated inventions in the automated fingerprint-acquisition art, apart from personal-weapon control, are similarly lax. As pointed out earlier, the resulting inconsistencies in input data lead to demands for greater processing complexity and more time, to obtain any specified level of identification certainty.

From study of FIG. 17 it will be clear that the illustrated gripping arrangement greatly reduces these reproducibility problems. Natural grasping forces A and B of a user's palm and fingers, respectively, against the handle 46 cooperate with instinctively applied force C of the user's thumb against the prism first end 501, to brace the thumb 11 against the prism.

This bracing action places the thumb within a very narrowly constrained range of positions and orientations—and also stabilizes the thumb 11 in this position and orientation against the prism surface 501. In addition this gripping geometry and bracing tend to make the degree of pressure of the thumb 11 on the prism relatively consistent: an important refinement of the invention.

Figure 18:
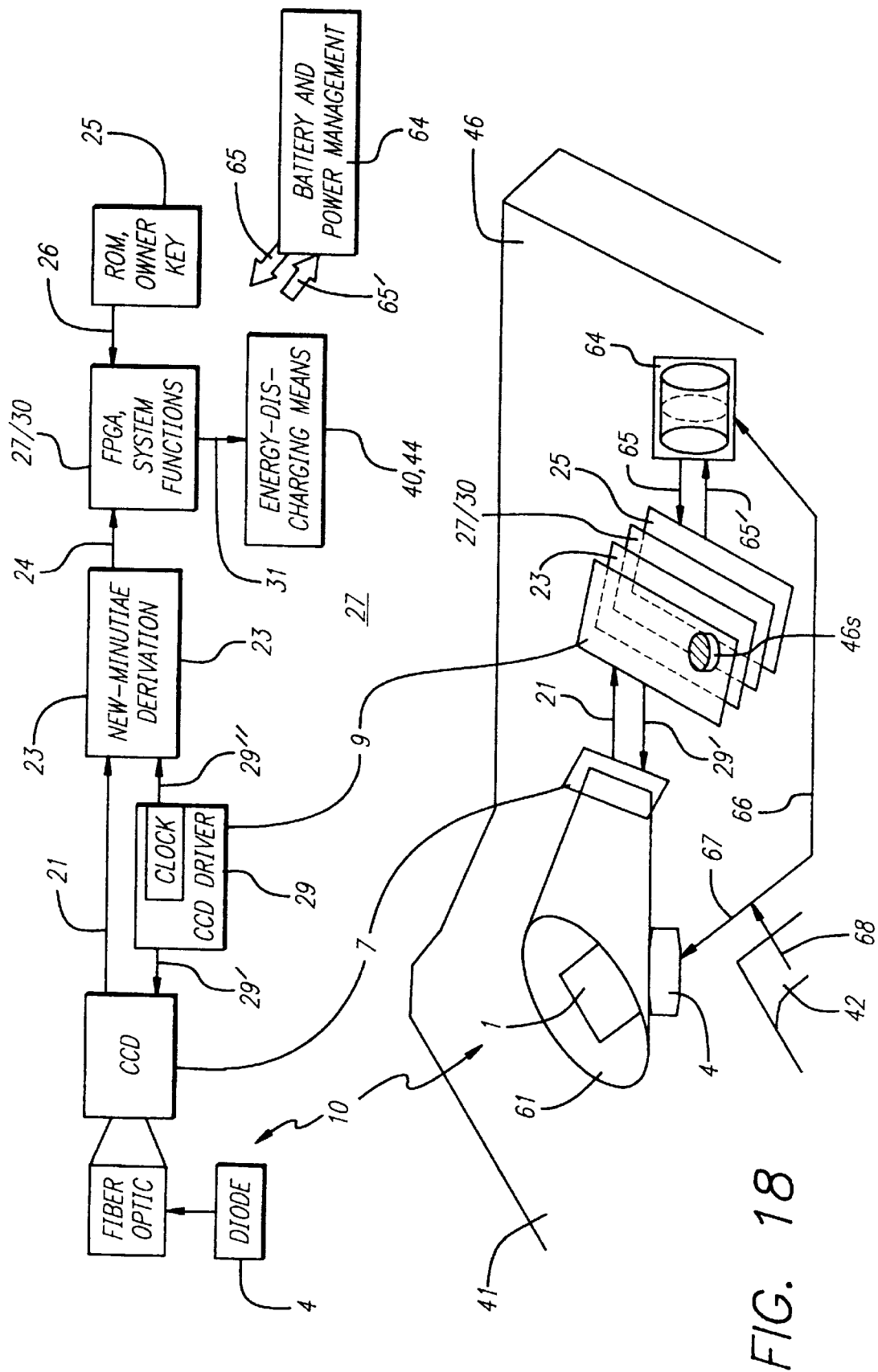
FIG. 18 is a functional block diagram of the FIG. 15 weapon.

FIG. 18 indicates the functionality of the items in the mechanical layout of FIGS. 16 and 17. Preferably the trigger 42 when depressed 68 turns on 66 the battery 64 connections 65 to the system, enabling 67 illumination of the sensing face 1 by the diode array 4.

Concurrently, powering up the system provides timed excitation 29' from the CCD driver 9, 29 to the CCD 7, and strobe pulses 29" which meet the CCD data 21 in the firmware-controlled processing stage—particularly to enable new-minutiae derivation 23. Resulting minutiae data 24 proceed to the FPGA/system block 27/30, for comparison with stored 25 authorizing (or deauthorizing) identification 26.

The FPGA/system block 27/30 in turn controls 31 the energy-discharging means 40—here taking the form of the bullets 44. Advantageously part of the battery system 64 is a power-management function, which receives fed-back information 65' about power consumption, electrical shorts etc. and applies this information to limit or modulate power to the rest of the apparatus.

(b) Unitary Processor/actuator Module

A system such as shown in the general block diagram FIG. 1 is particularly vulnerable to tampering or bypassing at two points. One is the evaluating-means output 28 to the access-control block 30, and the other is the access-control-block output 31 to the utilization means 40.

At these points an entirely straightforward system design would provide relatively simple "go/no-go" control signals. Knowledgeable but unauthorized individuals wishing to defeat the identification provisions in the comparison means 22 may seek to interrupt the circuit at such points. For example such an individual may wish to substitute always "go" control signals and so enable use of the weapon (or other secured system) without authorization.

FIG. 20 shows schematically a modification of the FIG. 1 system that can deter, though not absolutely preclude, such unauthorized use. It will be understood that a person having adequate resources, persistence and information about the control system cannot be absolutely precluded from using the weapon—regardless of what deterrence is built in—but the the present invention serves its purposes if such use is made very slow, troublesome and generally uneconomic.

The FIG. 20 system attempts to eliminate the points of vulnerability, by linking the successive adjacent blocks at the two sides of the vulnerable points. The evaluating means 27 are linked with the access-control block 30, and the access-control block 30 in turn is linked with the utilization means 40. The originally vulnerable points are buried within the linkage functions, inaccessible or at least extremely resistant to tampering.

The linking may be accomplished physically, as by building all or portions of the two blocks 27, 30 as a physically inseparable and unitary module; or functionally as by so intertwining the operations of the two blocks 30, 40 that neither can function without the other; or both. In the case of the utilization means 40, since it is natural to make these physically separate objects—partially projectiles, in fact—it appears necessary to rely upon functional interdependence exclusively.

FIGS. 19 through 21 show somewhat schematically how a hybrid physical/functional linking of adjacent blocks may be provided. For economy, the bulk of the new-minutiae deriving means 23 and other hardware of the invention may be housed or mounted straightforwardly in conventionally populated printed-circuit boards 63.

The output stage of the evaluating means and at least the input stage of the access-control block 30 (or that entire block, as illustrated) are fabricated as a unitary article, preferably a unitary integrated-circuit chip 62', on a single, preferably very small printed-circuit board 62 (FIG. 21). This board 62 of FIG. 21 (together with its chip 62') constitutes the unitary processor/actuator module 62 of FIG. 20.

The evaluating means "go/no-go" output 28 is advantageously buried deep within the multiple layers of the chip 62'. Perhaps that vulnerable output point 28 is accessible to high-technology reverse engineering that strips away and reads each layer of the chip in turn. That analytical mode, however, destroys the chip used for the analysis.

The resulting information cannot be used to preserve and restore operability of the individual chip which is thus dissected, but only for use in capturing the design— preparatory to fabricating identical chips. Even a later-fabricated identical chip is of little use to the would-be misappropriator, particularly if it is completely identical, and the reference minutiae storage 25 is included within it but only part of the operating firmware is present on it.

A full-blown and extremely difficult circuit analysis, based on the dissection process, is required to determine what parts of the device represent the reference minutiae, and how to change them. Determining how to bypass the comparison process might be even more difficult.

To enhance the effectiveness of these obstacles to tampering and reverse engineering, in principle it would be ideal to manufacture the chip 62' with a very distinctive and compound shape. Failing this the printed-circuit board 62 is made with such a shape.

The point here is to employ simple mechanical means to place even further difficulties in the way of preparing a substitute device that can be dropped into place in the apparatus for security-bypassing purposes. The exemplary circuit board 62 has a slot 66 that allows motion of a tab extended from the trigger—so that the trigger can be pulled.

Immediately adjacent to this slot is a rather fine horizontal projection that carries a necessary electrical contact 65 for actuating the bullet 44 in the firing chamber 43. Thus it is awkward, though of course possible, to fashion a substitute or dummy processor/actuator module that clears the trigger tab but makes the necessary contact.

Still further, the circuit board 62 intercommunicates with the rest of the circuitry. Such communication preferably is not through one or two electrical lines, carrying simple "go/no-go" signals in one direction, but rather a bus 68 of multiple finely and irregularly spaced contacts that engage wiping contact fingers on the mating board 63 and carry a complex of elaborately modulated signals in both directions. Such a contact structure is physically difficult to make, and even more difficult to analyze to determine which lines may carry critical information or instructions.

Signals passing bidirectionally and concurrently across this interface enable the processor/actuator 62 to operate only if the mating board is connected, and conversely— somewhat deterring an operational, run-time analysis of circuit operation. Some of these signals may be actually part of the fingerprint-data evaluating functions of the system, as the interface 68 of FIG. 21 corresponds to the dashed dogleg line passing through the evaluating-means block 27 in FIG. 20.

Other dummy or placebo signals may be included simply to confirm at both sides of the interface that the contacts continue to be connected, or to confuse would-be analysts, or both. Emulation of such operation by a would-be tamperer is extremely difficult if not practically impossible. In event either side of the circuit fails to receive suitable acknowledgement signals from the other side, the side recognizing such failure of acknowledgement automatically shuts down, or locks itself against further operation without a key input, or takes other tamper-defeating action appropriate to the particular acknowledgement that is absent.

Further (although slight) deterrence may be provided by recessing the receiving contacts within the mating board 63, so that attachment of probes while the boards are interconnected is difficult; and by a somewhat elaborate compound shape 69 etc. (FIG. 21).

Some additional active circuitry (not shown) is preferably positioned on the trigger tab, communicating with the processor/actuator 62 through an additional set of wiping contacts 67 recessed within the board, and mating contacts on the trigger tab. This arrangement enables operation of the circuit but only when the trigger is pulled.

Preferably such provisions are in two stages, one set of contacts 67 connected so that detonation can occur only when the trigger is fully pulled, and another set (not shown) connected so that the fingerprint-evaluating elements of the apparatus work when the trigger is partly pulled. Alternatively for the latter function a separate power-on switch (not shown) in the handle may be actuated by simply grasping the handle.

The processor/actuator-module 62 of FIG. 20 thus make the measures required to breach the security system at the evaluation output 28 uneconomic, at least unless the necessary effort, education and resources needed are justified by access to a large number of misappropriated weapons.

As mentioned earlier in this section, such physical interfabrication does not appear practical at the second vulnerable point, the access-control output 31. This point is discussed in the following subsection (c).

Other options include temporary disabling of the unitary processor/actuator module 62 if an unauthorized person attempts to open the battery compartment cover 46c (FIG. 16) or other working-parts compartment of the weapon. For this purpose advantageously a sensor switch 46s is mounted directly to one of the circuit boards 63, to provide the circuit with information about the compartment-cover 46c position. In designing such an arrangement it is necessary to deal with the possibility that the batteries 64 may be exhausted.

Such a dead-battery condition renders the circuit incapable of testing whether the person opening the battery compartment 46c is authorized to do so. This consideration may suggest programming the system to hold the compartment door 46c closed, in the absence of an authorized fingerprint, as long as power is available—e. g., with a battery-energized actuator latch 46a that is "normally open" (unlatched if there is no power).

Such a system is fail safe in the particular sense that it prevents loss of use of the weapon by an owner; it permits anyone to open the compartment 46c if the batteries 64 are dead. This operating mode, however, would enable the tamperer to prevail merely by setting the system aside for a period of time sufficient to be sure that the batteries are dead.

A better approach, though perhaps slightly more costly, may be to mechanically keep the compartment locked if there is no battery power—by means of an alternative actuator latch 46a that is "normally closed" (latched if there is no power). This system instead holds the compartment cover closed, in the absence of an authorized fingerprint, unless power is available.

In this case it is necessary to provide an auxiliary-power jack or connection point (not shown)—for supply of temporary power to operate the fingerprint-testing and lock-release circuits, just until the compartment can be opened and fresh batteries installed. The auxiliary jack must be suitably guarded against application of damaging high voltages, so that they do not result in opening of the compartment cover 46c.

(c) Complementary-detonator Projectile

Physically unitary construction may not be an available tactic at the detonation point 31 (or, more generally for other types of energy-discharging means, the access-control output 31). Nevertheless functional interdependence can be employed to impede unauthorized detonation.

The general principle of this strategy has already been described in the preceding section, in regard to modulated signals passing bidirectionally across the interfaces 67, 68 of the processor/actuator board 62. In the case now under discussion, the pertinent interface 65 (FIG. 21) is between that circuit board 62 and a detonator circuit 49 (FIGS. 19 and 22) within the casing of the bullet 44, via detonation contacts 43' that pass through the wall 43 of the firing chamber and mating contacts 49' that pass through the wall of the shell.

The detonator circuit 49 is preferably a very simple microprocessor and programmable read-only memory ("PROM") unit, capable of holding certain codes and performing certain functions outlined below.

To maintain reasonable economy in the manufacture of bullets 44, 44', the number of contacts passing through the shell casing is preferably held to a minimum. Hence the opportunities for testing of circuit integrity at both sides of the interface are more restricted.

Nevertheless the detonation signals to the bullets can be made reasonably difficult to emulate—at least within a short time after a weapon has been misappropriated. One way to help in this effort is to make each bullet responsive to just one of a moderately large number (for example, thirty-two) of control codes, and to make each weapon supply only one such code to the detonator.

The authorized user may select one of the codes for entry into the storage memory 25 of the weapon, perhaps together with reference-minutiae data, and should personally memorize the code—but should not mark this information onto the weapon.

Correspondingly an authorized user can be certain to obtain bullets usable in that user's weapon, but can then conceal from a would-be misappropriator of the weapon and bullets what code is needed to fire the bullets. For instance the control code for each package of such bullets may be marked on a disposable outside wrapping of the package, but not on the bullets themselves.

Alternatively the bullets may be sold in general form, and subject to code entry after purchase by use of an electronic appliance that writes to the PROM in each detonator. The programming appliance preferably requires a user to manually supply the desired code each time the appliance is used, so that theft of the appliance from a user's home or office does not reveal the code which resides in the memory of that user's weapon.

In either event, the coding system makes the likelihood of a misappropriator's happening to use the correct code rather small—though in the system described so far it can eventually be found by testing, on average, a dozen or two differently coded bullets in the weapon. As will be appreciated such efforts at least are unlikely to be completed (and a correctly substitute-coded security-bypassing module 62 installed in the weapon) during, for example, the course of an initial scuffle over the weapon—or during the course of its theft from a home.

In this scenario the authorized user's module 62 prevents the misappropriator from operating the weapon with bullets that are already in it; and the unknown code that is in the bullets deters prompt substitution and use of a bypass module. Nevertheless at least one added layer of security is advantageously included in the system.

One such provision is that before supplying a detonation signal the weapon circuitry interrogates the detonator for its code. In event the detonation code returned is not correct, the weapon circuit 62 or preferably 63 disables itself by writing a disabling notation to a nonvolatile memory element.

If desired, the system may be programmed so that the weapon can be reenabled by writing a converse code into that memory element. To perform such reenabling, the programming should require (1) a factory technician with secret access data, and/or (2) the physical presence of an authorized person whose thumbprint is stored in the weapon. Further complexity may be introduced through, for example, variable encryption of the detonator code.

Such systems deny the misappropriator of the weapon more than one single chance to guess what code is in use, before the weapon becomes unusable. Similarly—but more expensively—each bullet detonator circuit 49 can be programmed to permanently disable itself upon receiving an incorrect detonation code, so that misappropriated ammunition too becomes unusable.

Provisions that make individual bullets relatively expensive are not necessarily adverse to successful commercial practice of the present invention. Most legitimate private users do not often fire large numbers of bullets; and in the professional context, as for example with law-enforcement personnel, the improved security should be deemed adequate justification for target practice with relatively expensive bullets. In any event the self-disabling bullets may be offered as an option at slightly greater cost.

Another provision for an added layer of security is to incorporate into the weapon the necessary added circuitry and manual controls to function as the code-writing appliance mentioned earlier in this section—but only when operated by the authorized user. Furthermore, the code that is written into each detonator PROM is not merely, e. g., an arbitrary five-bit code (one of thirty-two possible combinations) as before.

Rather it includes an encrypted version of a portion of the stored reference minutiae data 25. With this refinement, the bullets as well as the weapon are completely personalized to the user.

At any rate the several antitampering features discussed in this section serve to provide the functional integration 64 of weapon circuitry and bullet circuitry. Those skilled in the art will recognize that the details of the invention as disclosed in this section are straightforwardly adapted to utilization means 40 and energy-discharging means 44 (FIG. 18) of types other than bullets.

(d) More-severe Self-disabling Features

As pointed out above, the unitary actuator/processor module advantageously has the capability of disabling itself by writing a suitable code to a permanent memory element. This arrangement may be subject to reenabling as described above.

Programming the system in such ways may be seen as the least severe in a spectrum of measures that may be taken to deny use of the weapon to an unauthorized person. They are moderate measures by two criteria: they preserve the utility of the weapon for the authorized user, and do no harm to the would-be tamperer.

Such arrangements accordingly may be the most appropriate for a consumer whose major concerns are, for example, (1) attempts by a child to fire the weapon or take it apart to see what is inside, and (2) the possibility of being injured with the consumer's own weapon, in event of confronting a burglar or robber who wrestles the weapon from the owner. In this case the design philosophy is simply to avoid injury to the child, the owner, and anyone else who may be nearby—as long as the owner is not holding the weapon.

If the robber or burglar takes the weapon away, or the weapon is otherwise stolen, even though the thief may eventually find some way to reenable the weapon the consumer's primary objectives are met. Such reenabling will be of questionable economics from the thief's point of view (tending to deter a practical thief from carrying the weapon away); and almost surely will occur somewhere far from the site of the theft, so that injury to the owner and the owner's family are correspondingly more-remote possibilities.

At the other end of the spectrum of severe measures are programming and physical elements that permanently disable or destroy essentially the entire weapon, and that—in the process—incur a slight possibiity of serious injury to a careless thief or would-be tamperer.

Deliberately programming such an apparatus to inflict serious injury upon the thief is likely to fall under long-established law dealing with trapguns and the like—and accordingly to be illegal. Doing so is not a part of the teachings of this document.

It may be legally acceptable, however, to provide an interior movable barrel segment 43b (FIG. 19) that is biased by a spring (not shown) to deploy 43d automatically and permanently in front of the firing chamber. When so deployed the segment 43b thereby becomes a barrel block 43b'—shown in the phantom line.

The system is programmed to operate the block-actuator latch 43a through electrical connections (not shown) from the circuit boards 63. When so programmed, the system automatically initiates the deployment 43b if any unauthorized person attempts to open the battery compartment 46c or other working-parts compartment of the weapon.

The exclusive purpose of this arrangement is to prevent unauthorized use of the weapon. If, however, a tamperer somehow manages to detonate a bullet 44 in the firing chamber after such deployment, the weapon may explode or otherwise injure the tamperer.

Therefore it is necessary to provide and carefully test out a mechanical design that minimizes this possibility—but also to provide reasonable warnings. It will be understood that the configuration illustrated very schematically in FIG. 19 is not such a design, but only provides a representative means of permanently disabling the weapon.

It appears essential that the weapon at least carry clearly lettered on its exterior a plainly worded warning of this arrangement, and particularly of the possibility of injury if a bullet is subsequently fired against the block. Also advisable in addition is a recorded audibly spoken warning, actuated in response to initial efforts to open such a compartment.

Specialized effort to determine the legality of such measures is a necessary preliminary step to engaging in any such manufacture. It is important to make clear in advertising and at point of sale that a weapon incorporating these more-severe antitampering measures is for sale only to a consumer who is in a position, and who intends, to safeguard the weapon against misuse by children etc.—and that weapons with the less-severe measures are alternatively available.

In providing these maximum-severity measures, the philosophy is basically to sacrifice the weapon once in unauthorized hands, so as to permanently deny all possible profit from the effort and thereby deter future misappropriation. The power source in the weapon is available for this purpose.

Intermediate on the scale of severity are measures that permanently disable or destroy selected necessary parts of the weapon, and that may perhaps inflict very minor injury to the hands of a person trying to use the gun or open a compartment. In this case too, warnings are essential.

Possible options for such measures include:

applying an overload current to fuse a circuit element (not shown) within the unitary processor/actuator module 62 (FIGS. 20 and 21), so that this module becomes permanently inoperative and a factory replacement is required to reenable the weapon; and applying an overload current to fuse one or both of the detonation connections 43' (FIG. 19) through the firing chamber/barrel wall 43, so that even "hot wiring" the contacts outside the chamber with a somehow-generated correct ignition code cannot apply a detonation signal to the projectile detonator.

Here too it is important to make clear to potential buyers just what level of antitampering provisions are built into the weapon, and what alternatives are available.

5. SIGNAL PROCESSING

Except as otherwise indicated the methods described here, for use with data developed with the present invention, are generally conventional; they are presented primarily to further facilitate practice of the present invention by persons of ordinary skill in the art. Other methods for analyzing fingerprint image data, once collected, may be substituted as desired.

At this writing, development of signal processing for the invention is incomplete; as will be seen, some speculations remain in parts of the discussion. At present the generally conventional methods described are susceptible to refinement as other workers have refined them, or in new ways, or both.

Complete discussion of methods for fingerprint data processing necessarily entail some resort to higher mathematics. In the interest of preserving enabling access to the invention, for the person of ordinary skill in this field, such tools are minimized throughout this document.

In the programming art, however, it is nowadays well known to invoke certain advanced mathematical procedures that are available as prepackaged algorithms. Thus a person of ordinary skill in the programming arts is able to use these advanced mathematical procedures without the necessity of understanding the advanced mathematics behind them.

Therefore, as the present section of this document is in essence directed to a person of ordinary but senior skill in the programming arts, this section makes use freely of such functions as integrals, fast Fourier transforms, gradients, filters and the like. Clarification as to use or meaning of these functions should not be needed, but if clarification is desired by particular personnel it should be readily available from a mathematician or design engineer.

(a) Use of Minutiae

In the fingerprint field, the term "minutiae" means small details of a fingerprint, including endings and bifurcations, islands, spurs and so on. The term is used, however, to refer to such characteristics in any of at least four forms, corresponding to the method and particularly the stages of analysis.

In one form, the minutiae are simply the physical objects just enumerated. In a second, they are individual geometrical points or pixel locations, in the data grid, where the objects are.

In still a third form, the minutiae are a list of numbers—the coordinates of the data-grid locations. Finally, they take the form of a list of much more abstract numbers, in which the coordinates have been converted or transformed so as to describe the positions of the physical objects relative to one another, or relative to some central or otherwise standardized feature.

Here the term "feature" means a relatively large structure (loop, whorl, axis, ridges etc.), used to define a coordinate system in which to interpret the minutiae. Such features can be perceived and manipulated almost independently of the coordinate system used.

Classically, then, the abstract form of the minutiae is constructed by reference to such topological near-invariants as the number of ridges between the physical minutiae. We refer to them as "near-invariants" because the number of ridges between two ridge endings, for example, does not ordinarily vary with grip, angle, translation, twist etc.—but interpretation of, e. g., a question such as "which of ten nearby ridge endings is which" may indeed vary with such factors. This interpretation in turn can greatly affect a resulting identity verification.

(b) Preprocessing to Develop a Direction Map

Each of the real-time print imagers described above each has some form of detector 7 (FIGS. 23 and 1), which provides the FTIR-obtained fingerprint data 21 to the new-minutiae deriving means 23. These data 21 are relatively ragged and noisy.

Figure 23:
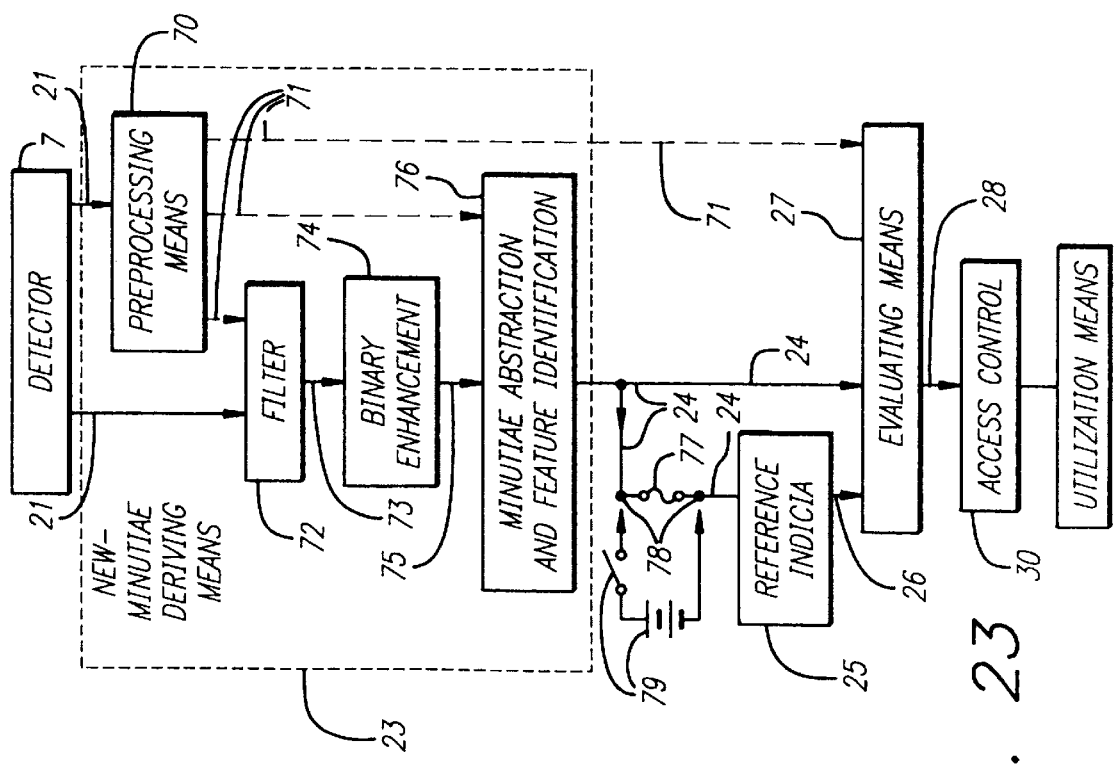
FIG. 23 is a functional block diagram, or flow chart, primarily showing a second level of detail within the "new-minutiae deriving means" of FIG. 1, and thus representing firmware which is a preferred embodiment of the processing aspects of the invention, for any of the same systems as in the earlier figures, including actuation of the personal weapon or other utilization means.
Figure 24:
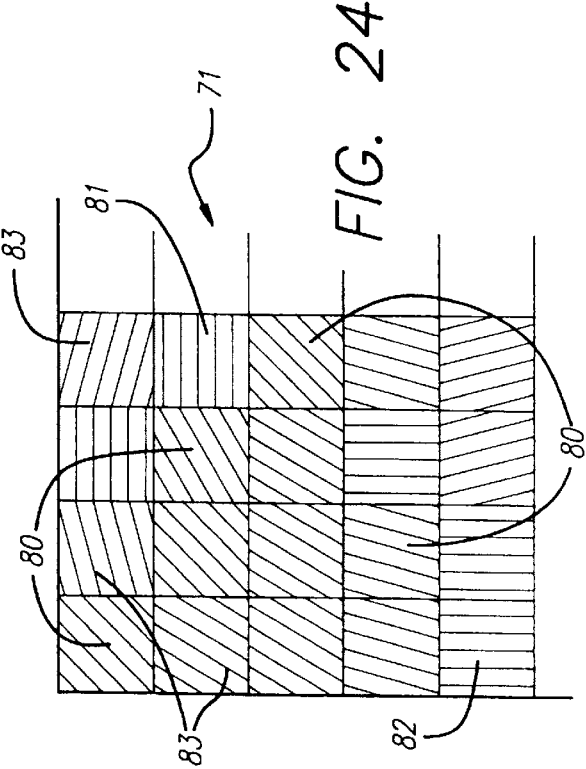
FIG. 24 is a schematic representation of part of a direction map as used in the FIG. 23 embodiment of the invention.

Within the new-minutiae deriving means 23, preprocessing means 70 perform the first step in cleaning up the data: extraction of a direction map 71 (FIGS. 24 and 23). This term refers to a systematic subdivision of the data into regions or so-called "subpatches", for example rectangular or (for simplicity) preferably square pixel groupings 80 analogous to the individual checks or squares in a checkerboard.

Associated with each square 80 is a direction—e. g. horizontal 81, vertical 82, and all possible intermediate orientations 83—representing the average direction of the fingerprint ridge-and-groove structure within that square respectively. Such a map is then used to guide the orientation of a matched filter 72 for obtaining refined information 73, 75, 24, 28 about the fingerprint ridges.

A direction map 71 has further usefulness in that it enables determination of the fingerprint axis. This information optionally (as suggested by the dashed lines 71 in FIG. 23), but preferably, can be used in later stages 76, 27 of the processing to alleviate a major difficulty in print recognition, due to the plasticity of the skin over the bone of the finger:

When the thumb is pressed down on a surface, the skin makes contact first; then the bone inside moves to its location almost independently. Even though the pressure may be applied at exactly the same point each time the grip is clasped, the skin may not be at the same point.

Its location depends on how the motion of gripping or pressing is done—that is, how the hand approaches the grip and its relative orientation. Thus the core of the print can be displaced, and the medial axis can rotate or take on an "S"-shaped distortion.

Knowledge of the first-order displacements (in other words the main displacements, roughly quantified) that occur in this process can be very helpful to gauge how this kind of distortion affects the algorithms, and what ranges of geometric change must therefore be accommodated. A starting point for this later processing step 76 will be determination of the center and the axis of the direction map.

(For testing apparatus according to the present invention, an optical breadboard is preferably made in such a way as to enable watching of the distortions as they take place—while the hand grip changes on the stabilizing surfaces, and as the finger presses down.)

For construction 70 of a direction map, four methods have been considered, of which three work about equally well. The methods are: FFT detection, mean-gradient, and the projective Radon transform—and the less-successful method, the Hough transform (which will not be discussed further).

The candidate methods were implemented using commercial software (Matlab®) in a desktop computer, to determine how well the methods work. As different code (firmware) and processor would be used in eventual products, speed of operation in these tests is not directly relevant.

(i) FFT Detection—In this approach, the two-dimensional fast Fourier transform of each subpatch area 80 is searched for the maximum energy in the expected frequency band, f, where the location of the examined pixels is on the circle defined by $$x_i = \mathrm{round}(f \cdot \cos \theta_i)$$

and $y_i$=round($f$·sin θ$_i$), where $x_i$ identifies the ith pixel along the circle with respect to the horizontal direction (column number), $y_i$ identifies the same pixel with respect to the vertical direction (row number) respectively, and θ$_i$ is the corresponding angle about the circle center.

The direction of this maximum is then taken as the direction of the ridges in the subpatch. Work on the present invention has experimented with subpatch sizes varying from thirty-two to sixteen pixels along each side.

In the prototype work to-date the period of the ridges is about eight pixels, and the ridge and groove widths are unequal. The major source of noise in the print (other than the white noise of dry skin flakes) typically is sweat glands that pepper the image periodically.

These are two-pixel round dots spaced at about eight to ten pixels apart along the ridges. Their presence tends to break up the ridge lines, and also creates an orthogonal-pattern noise.

This method was ineffective because very few angles can be observed with small subpatches: the angular sensitivity with a subpatch size of sixteen, for example, is about 30°. A number of measures might be tried to improve the method, such as padding to improve frequency discrimination.

(ii) Gradient method—In this method, the gradient of the subpatch is determined by calculating small differences or differentials Δ$s_x$, Δ$s_y$ between values of the intensity-signal S, in two directions x and y respectively—x being the horizontal direction (column number) and y the vertical (row number). For pixels i,j in generalized column i and row j, and correspondingly generalized nearby pixels i–1,j (offset one column leftward) and i,j–1 (offset one row upward), the differences are defined by:

$$\Delta s_x|_{i,j} = S_{i,j} - S_{i,j-1}$$

and $$\Delta s_y|_{i,j} = S_{i-1,j} - S_{i,j}.$$

Next these numbers are used to obtain for the desired gradient a magnitude $$w = (\Delta s_x^2 + \Delta s_y^2)^{1/2}$$

and a direction. The direction is found by taking the function "angle(Δ$s_x$,Δ$s_y$)" of the differentials, where the Matlab® function "angle" returns the arctangent, over the range of 0 to 2π.

A ridge has two sides, and the angles of the gradients of these sides are in opposite directions. It is also desired to obtain the average angle. As the direction of such a ridge, or line, can only be defined over a span of 0 to 180°, an indirect technique can be used—defining the gradient as a complex number:

$$q_{i,j} = w_{i,j} \cdot \exp[2i \cdot \text{angle}(\Delta s_x, \Delta s_y)].$$

The factor of two simply maps the larger angles, which are 180° from the smaller angles on the opposite side of the ridge, onto the smaller values. The average angle is found by averaging the complex values and dividing by two, thus $$\theta_{ridge} = \tfrac{1}{2}\pi - \tfrac{1}{2} \cdot \text{angle}\{\text{imag}[(q_{i,j})_{avg.}], \text{real}[(q_{1,j})_{avg.}]\}.$$

where the functions "imag" and "real" are respectively the imaginary an d real parts of the averaged argument $(q_{i,j})_{avg.}$; and the ½ π term is introduced because the gradients are at right angles to the actual ridge lines.

In general this works better than the other direction-finding algorithms, and it works for very small subpatches, where the FFT method loses sensitivity. It fails in areas of the prints where all of the other methods fail—where the noise from light contact, sweat glands, and cuts make it hard to decide on a direction even by eye.

(iii) Radon Transform—This is a built-in function of the commercial MatLab® analytical-mathematics software package. It is a projective algorithm, which integrates an image along a direction to yield a plot of the projection at an angle.

Next a one-dimensional fast Fourier transform is taken along the projection direction, at each angle. The direction is found by scanning over the angle direction at the desired ridge frequency to find a maximum.

Whereas the FFT approach entails scanning around a ring to find a maximum, this Radon algorithm after preliminary steps enables scanning along a line to find a maximum.

(c) Applying the Direction Map to Orient a Tuned Filter

After obtaining a direction map 71, a tuned filter 72 is applied to the print image 21. The filter is asymmetric: it consists of a half-cycle cosine rolloff in the direction of the ridges, and a zero-mean 1½-period, symmetric filter in the normal direction.

In algebraic notation the values of this filter 72, when it is not rotated, are—

$$F(x) = \cos[\pi(x - x_{center})/\text{width}],$$

along the filter, where the variable "width" is one parameter that is set for the filter, based upon expected print characteristics, and $$F(y)_0 = \cos[\pi(y - y_{center})/W_{ridge}]$$

if $$|y - y_{center}| < \tfrac{1}{2} W_{ridge}$$

or $$F(y)_b = b \cdot \cos[\pi(y - y_{center})/W_{ridge}] \text{ otherwise.}$$

Here $W_{ridge}$ is a preestimated value for the ridge width—and also for the groove width, which in this method is assumed to be the same for ridges as for grooves.

The parameter b is evaluated in such a way as to make the integral over the area of the filter zero, after rotation (this to satisfy the condition that the filter be a "zero mean" filter). The parameter b is in other words evaluated so that after rotation:

$$\int_{-w/2}^{w/2} F_0 \, dx \, dy = \int_{-width}^{-W/2} F_b \, dx \, dy + \int_{W/2}^{width} F_b \, dx \, dy.$$

Experiment suggests that filter performance would be better if the ridge and groove widths could be adjusted independently.

In a laboratory it is feasible to custom-analyze individual fingerprints of a particular authorized individual, in other words actually determine these variables for that individual, and then set the weapon firmware accordingly. It is not yet clear whether such individualized determination can be automated for field conditions such as might be desired (e.g., setting up the weapon in a dealer salesroom).

Customized analysis and setting would be extremely helpful, as the difference in results between data processed with correct and incorrect direction maps (and therefore filter orientations) is dramatic. When the direction is correct, all of the small trash in the image is gone, and the minutiae and features are clear.

When the direction is incorrect (usually 90° off due to pores and cuts, along with lighter pressure at the edges of the contact area) the result is very messy, and fictional. In the absence of techniques for reliably establishing the correct direction, some improvement may be obtained through making the filter 72 longer.

An 11-by-11 matrix has been used to generate the rotated filter and then parse it down to a 9-by-9 neighborhood after rotation. This filter, set at one selected angle throughout each 16-by-16 or 32-by-32 block respectively, multiplies the brightness values 21 of the area around each pixel by the corresponding filter values. The sum of these products is then applied to the respective pixel.

This application of the mean angle over the full subblock or subpatch 80 is inadequate in some areas, where the mean angle changes drastically from block to block—as for example at a whorl in the fingerprint. It appears that in such regions an angular interpolation should be used from each block center to the adjacent block center. This refinement would also reduce the effects of gross direction errors.

The result of successful filtering 72 as described above is usually a very smooth image with all of the features and minutiae clearly showing, and all of the image noise gone.

(d) Enhancing Binary Character of the Image Information

Since the previous filter 72 (disussed above) is a zero-mean filter, reduction 74 of the image to a binary one is straight-forward: a threshold of zero can be applied. The result is a clear black-and-white representation.

Such a representation in turn can be reduced to lines by the application of dilation and erosion algorithms, such as those found in the Matlab® "Image Processing Toolbox". The result of dilation is to replace each ridge by a thin black line.

The overall product of the binarization, erosion and dilation is an output image 75 in which thin black lines appear in place of the ridges.

(e) Abstracting Topological Near-invariants from the Image Data

Once dilated, the image 75 is submitted to a further processing module 76 for locating minutiae and identifying features—and then preferably creating an abstract of the minutiae, in which their locations relative to one another are expressed with reference to the features (as distinguished from data-grid locations). The minutiae thus abstracted are collected in a tabulation 24 for use in a later evaluative comparison 27.

To locate the minutiae, the image 75 can be searched for ends by applying an end filter—which searches for a line ending identified as a connected pixel group that has a center pixel, one pixel in contact and no others. If the same processing is repeated using an inverted binary image, the ridge bifurcations are found.

Each ridge island can then be found by identifying very short ridges—i. e., counting ridge pixels from end to end, and applying an arbitrary length criterion—and each very short groove ("lake" or "puddle") by similarly counting groove pixels.

Each such minutia found is pretabulated, categorized by type, as for example a location in the data grid. Next the tabulation of locations is subjected to some counting scheme to find the number of ridges separating each relatively closely-spaced grouping (e. g., pair or triad) of minutiae, and the angle or angles at which the members of the grouping are disposed relative to one another.

As will be apparent, a great variety of such counting schemes may be devised for selecting the groupings and finding the spacings and angles. If there is no error, the number of ridges of separation should be independent of both the scheme employed and the finger orientation, twisting due to grip approach etc., leading to the image acquisition.

The angular data, however, typically will vary within some ranges, such as for instance ten to thirty degrees, that are characteristic of the apparatus and the subject person.

(f) Evaluation Against Near-invariant Minutiae Abstracted for the Authorized Person The abstract minutiae 24 next proceed to evaluating means 27 for comparison against analogous data 26, from reference-indicia storage 25, for the person or people authorized to use the weapon (or other device). In this part of the process it is essential to make proper allowance for the above-mentioned range of variation in angular data, or other variable data; in making this allowance it is helpful to use an actual range of variation measured for the authorized person.

All the above-described processes work very well as long as -once again- there is no mistake in the direction of the ridges. When there is an error in even one block, spurious ridge endings pop up all around the area of that block.

Such an appearance is a telltale signal of error to a trained human observer, but might be hard to train an automatic system to discern. As will be seen in the following discussion, nonrandom pattern noise creates these errors.

At present it seems that a strategy based on the expected, authorized person's fingerprint pattern would be most effective in overriding them. An analogous observation has already been made just above in relation to the range of variation of measured angles, and earlier in relation to customizing the parameters of the filter 72.

Most of the fingerprints taken in work on the present invention have been taken quickly, in imitation of what the situation might be after a person has grasped a personal weapon or other small portable implement. There cannot be delay in the process; it might be deadly.

Such a condition is not conducive to getting the best prints, or stable images that a process might more easily rely on. As a result the system must be designed to render such negative artifacts insignificant.

The idea of being eventually able to actually process a fingerprint from practically any finger that is presented—to get something usful out of any print no matter how bad—is at the outset very appealing. In the present work, however, it has been found that this approach has an instability: no one instance can be used as a template against all other instances.

This instability makes itself felt in many different ways (some have been pointed out earlier), all leading toward the importance of conditioning operation on the finger characteristics of the known authorized user. When this approach is taken, at least that person's print should be optimally recorded and readily recognized—allowing identity verification with a high level of certainty for that person.

Even though another person's fingerprint may not produce a truly readable or processable image, or certainly may not produce a print that is readable at a high certainty level, the apparatus may be programmed to—in effect—use this fact itself, the fact of high uncertainty, as a disqualifying parameter. In this approach, a carefully constructed master set of instructions is used to gauge the presence of a match and authorization.

In particular it now appears that the direction map used should be the ideal direction map of the authorized user, not a map derived from the presented print. If the direction map agrees everywhere, a good binary image will result. If it does not, as is most likely to be the case if the print is the wrong one, then the result will have errors and the chances of rejection will be greater.

(g) Acquiring Data for the Authorized User or Users

An authorized user's characteristic data ideally would be laboratory acquired. This may have the drawback of different measurement conditions than in operation of the weapon, but may also provide some important benefits.

For example, steps may be taken to ensure that the direction map 71 found for an authorized user is clear and essentially correct. Also the full direction map thus acquired and used may be made larger than the area of the presented print: doing so would allow for the possibility that an acquired print in one instance includes certain peripheral areas, and in another instance includes others.

The full direction map can be shifted about to coincide with, for example, a high-pressure-point sample of directions of the trial print. Then the full, ideal direction map can be used to guide the filter over the trial input.

The shifting of the filter 72 may then be used if desired to form the basis in the abstraction-and-identification module 76, both for starting the minutiae/feature associations and as a first step in establishing tabulation of invariants, such as ridge counts or the like as desired.

Laboratory acquisition may also enable use of measurement techniques to optimize the filter 72 periodicity, and ratio of ridge to groove widths, and also perhaps to set the analytical apparatus 72–76 within the weapon optimally to take into account whether the user's skin is characteristically dry etc.

Nevertheless some benefits of simplicity and efficiency, as well as identicality of measurement conditions, do accrue from using the weapon (or other utilization means 40) itself as a primary apparatus for acquiring the authorized user's print data. Some of the same special optimizations described in the preceding paragraphs may yet be applied even when the weapon is so used.

If desired the weapon may be attached, for this purpose, by an electrical umbilicus to laboratory equipment (not shown)—for a more complete analysis of print characteristics. Results of this analysis may then be written into various parts 70, 72, 25 of the electronic memory in the weapon.

An alternative approach is to use the apparatus of the weapon as the exclusive means of acquiring needed data, but perhaps in a more-protracted acquisition mode that takes several different sets of data under different conditions (e. g., filter periodicities) and compares perhaps the prebinarization contrast, or the postprocessing reproducibility, to select best settings.

FIG. 23 shows this alternative approach. Initially the unitary processor/actuator module of FIGS. 20 and 21 is hard-wired so that the abstracted minutiae 24 from the new-minutiae deriving means 23 flow not only to the evaluating means 27 but also into storage 25 for the reference indicia.

When a weapon is first sold, it is operated to collect data from whoever shall be authorized to use the weapon. Preferably data sets for as many as several different trials are collected in the reference-indicia memory 25.

The evaluating means 27 are then operated to compare the several data sets, and store condensed information about the comparisons. In particular the evaluating means determine both the variability between sets (a measure of the variance that should be accepted by the device during actual use later) and the best set.

It may be found that some minutiae groupings are reproducible among a first two or three data sets but not others, and other minutiae groupings are found to be reproducible among two or three of the "other" sets but not the first two. Such a case may perhaps correspond to a situation in which a user habitually uses either of plural different ways of gripping the handle 46 and thumbrest 1, 61 of the weapon.

In this case the apparatus may be programmed to store condensed information about a hybrid of two or more such data sets, or to store set-priority data indicating which of the data sets are encountered more frequently or matched more definitely. Such data may be used later to create suboptions for matching a presented print, or to select the order in which the apparatus brings up the different data sets to try for a match.

When adequate image data and abstracted data sets have been collected, a fusible link 77 in the weapon may be severed, to prevent later flow of new-minutiae data 24 into the reference-indicia storage 25. (This may be done for example by applying a correct external voltage 79 to connection points 78 across the link.) Equivalently a disable notation may be written into a suitable operating part of the circuit memory or firmware, to block such later data flow.

The reference-indicia and evaluating-means modules 25, 27 then do not accept or process, respectively, any new user data—but can only operate to compare a would-be user's submitted fingerprint image against the reference indicia, for generation of a positive or negative actuating signal 28 to the access-control module 30.

As to the "disable notation" mentioned just above, if desired the apparatus may be programmed to allow overriding (and overwriting) of such a notation—as for example if the weapon changes ownership. The apparatus may be programmed for example to enter such an override mode (1) only in the physical presence of an authorized user, or (2) only by a qualified technician having necessary access codes, or (3) both—or, preferably, (4) any one of these three choices at the option of the person acquiring the weapon.

(h) Practical Recommendations, and Preferences for Refinement

Even though the objective is automatic equipment that can extract useful print information from a finger -perhaps any finger- that is presented, an opposite approach is advisable for initially orienting oneself to the vagaries of fingerprint-analysis equipment. A particularly troublesome part of developing the present invention has been recognizing what a large variety of finger-surface types the automatic apparatus must be able to manage.

Hence it is helpful to use preliminary prototype apparatus to accumulate—and simply look at, and ponder—a library of print images for many individuals of different age, size, gender, and body chemistry. Such direct visual examination reveals a number of features other than the expected whorls and lines.

For example in a bright-field system the grooves appear as white as the untouched prism illumination. The dark areas, caused by the absorption of the contacting ridges, are complex and are seen to include many small white dots and to be subject to a large variability of the degree of darkness.

In such observations it is readily apparent that the darkness level is not repeatable, even though the artifacts in the ridges are quite stationary. In addition to the variability of the dark regions, there are two other noise-like phenomena.

First, the fiber-optic prism has some structure and this is visible in some resulting prints as a banding parallel to the optical fibers, particularly along an edge where the prism is thin—and especially if the finger contact there is not firm. The second phenomenon, leading to a banding that is at right angles to the ridge pattern as mentioned earlier, is caused by the pore structure.

When the skin is particularly dry this transverse fibrousness can be very strong, and can reduce ridge lines to mere banded clumps. This is observed most often in older subjects.

FFT filtering for the ridge frequency—which is globally symmetric—tends to emphasize this adverse characteristic and thereby badly aggravate the ridge-line discontinuity. This is particularly evident after so-called "top hat" FFT filtering in which all the frequencies above the characteristic ridge frequencies have been removed.

The result is a fingerprint-reader's disaster, as all of the ridge details have become clumped and the continuity is gone and smudged. This observation too suggests the desirability of using a locally adaptive asymmetric filter, which can suppress the clumping characteristic that otherwise makes it impossible to determine the minutiae and features in the prints.

Since the clumping is caused by the sweat glands and local moisture, the outcome of using linear FFT processing may be expected to become very dependent on subtle variations in the amount of sweat present—and hence on the stress in the user. In the context of personal-weapon user verification, such a relationship has obvious drawbacks.

In a typical example of direction-map application, clumping is completely gone and the ridge s are clearly delineated over more than three-quarters or even nine-tenths of the area. Some failures do still occur in regions where there are strong transverse patterns caused by the pores.

The effect of direction-map errors is easily seen—by eye, if not by algorithm—where the dilation of the binary pattern produces, for example, odd rings and spotty areas (not present in the original fingerprint). Such areas have many more seeming endings and bifurcations than the normal and good parts of the fingerprint.

Therefore if they were to remain after the data operations they would heavily weigh down the classification process. Also since they are somewhat random, and driven by sweat, dirt, pressure etc., they would lead to excessive rejections.

It will be understood that the foregoing disclosure is intended to be merely exemplary, and not to limit the scope of the invention—which is to be determined by reference to the appended claims.

What is claimed is:

1. A personal weapon subject to access control based upon surface-relief data from a human user's finger; said weapon comprising:
    means for discharging an energy-transmitting agency to influence an adversary, said agency-discharging means requiring enablement for its operation; and
    means for developing an electronic signal representing a determination of whether a human user's fingerprint data which are presented to the weapon are a particular authorized user's fingerprint data, and for applying the electronic signal to control enablement of the agency-discharging means;
    at least a part of said discharging means and at least a part of said developing-and-applying means being physically formed together as a substantially unitary electronic module to deter unauthorized bypassing of said fingerprint-data access control.

2. The weapon of claim 1, wherein:
    at least a part of said discharging means and at least a part of said developing-and-applying means are physically formed together as a substantially unitary electronic integrated circuit.

3. The weapon of claim 1, wherein:
    the substantially unitary electronic module comprises a shape that matches and is required by an electronic-module receptacle of the weapon;
    said shape including electrodes for contacting elements of the weapon to effect said discharging.

4. The weapon of claim 3, wherein:
    said shape includes complicated contours.

5. The weapon of claim 1, wherein:
    said at least a part of said discharging means comprises means for providing a specifically controlled electrical impulse to effect said discharging; and
    the energy-discharging agency is manufactured to respond exclusively to said specifically controlled electrical impulse.

6. The weapon of claim 5, wherein:
    the energy-discharging agency is a bullet having therein a charge of explosive powder and an electrical detonator to ignite the explosive charge; and
    the detonator is manufactured to respond exclusively to said specifically controlled electrical impulse.

7. The weapon of claim 6, wherein:
    the detonator is manufactured to respond exclusively to an electrical impulse whose duration is in a relatively narrow range.

8. The weapon of claim 6, wherein:
    the detonator is manufactured to respond exclusively to an electrical impulse whose voltage is in a relatively narrow range.

9. The weapon of claim 6, wherein:
    the detonator is manufactured to respond exclusively to an electrical impulse having a particular waveform.

10. The weapon of claim 1, wherein: the developing-and-applying means comprise a crosslit optic-fiber prism with numerical aperture not exceeding one-half, for collecting fingerprint data by frustrated total internal reflection.

11. A personal weapon subject to access control based upon surface-relief data from a human user's finger; said weapon comprising:
    means for discharging an energy-transmitting agency to influence an adversary, said agency-discharging means being manufactured to respond exclusively to a specifically controlled electrical impulse; and
    means for developing an electronic signal representing a determination of whether a human user's fingerprint data which are presented to the weapon are a particular authorized user's fingerprint data, and for applying the electronic signal to control enablement of the agency-discharging means;
    said discharging means comprises means for providing a specifically controlled electrical impulse to actuate said energy-transmitting agency.

12. The weapon of claim 11, wherein:
    the energy-transmitting agency is a bullet having therein a charge of explosive powder and an electrical detonator to ignite the explosive charge; and
    the detonator is manufactured to respond exclusively to said specifically controlled electrical impulse.

13. The weapon of claim 12, wherein:
    the detonator is manufactured to respond exclusively to an electrical impulse whose duration is in a relatively narrow range.

14. The weapon of claim 12, wherein:
    the detonator is manufactured to respond exclusively to an electrical impulse whose voltage is in a relatively narrow range.

15. The weapon of claim 12, wherein:
    the detonator is manufactured to respond exclusively to an electrical impulse having a particular waveform.

16. The weapon of claim 11, wherein:

the developing-and-applying means comprise a crosslit optic-fiber prism with numerical aperture not exceeding one-half, for collecting fingerprint data by frustrated total internal reflection.

17. A personal weapon subject to access control based upon surface-relief data from a human user's finger; said weapon comprising:

means for discharging an energy-transmitting agency to influence an adversary, said agency-discharging means requiring enablement for its operation;

first means for developing an electronic signal representing a determination of whether a human user's fingerprint data which are presented to the weapon are a particular authorized user's fingerprint data, and for applying the electronic signal to control enablement of the agency-discharging means;

means for providing entry to working parts of the weapon;

second means for applying the electronic signal to control enablement of the entry-providing means;

means for determining when entry to working parts of the weapon is gained without operation of the second means;

means responsive to the entry-determining means for substantially permanently disabling the weapon when entry to working parts of the weapon is gained without operation of the second means.

\* \* \* \* \*